US011665676B2

(12) United States Patent
Nezou et al.

(10) Patent No.: US 11,665,676 B2
(45) Date of Patent: May 30, 2023

(54) RESOURCE UNITS FOR UNASSOCIATED STATIONS AND GROUPED MULTI-USER TRANSMISSIONS IN 802.11AX NETWORKS

(71) Applicant: CANON KABUSHIKI KAISHA, Tokyo (JP)

(72) Inventors: Patrice Nezou, Liffre (FR); Pascal Viger, Janze (FR); Stéphane Baron, Le Rheu (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/816,971

(22) Filed: Aug. 2, 2022

(65) Prior Publication Data

US 2022/0369311 A1 Nov. 17, 2022

Related U.S. Application Data

(63) Continuation of application No. 16/606,676, filed as application No. PCT/EP2018/060250 on Apr. 20, 2018, now Pat. No. 11,438,889.

(30) Foreign Application Priority Data

Apr. 21, 2017 (GB) ..................................... 1706408
Apr. 21, 2017 (GB) ..................................... 1706409

(Continued)

(51) Int. Cl.
*H04W 72/04* (2023.01)
*H04W 72/12* (2023.01)
(Continued)

(52) U.S. Cl.
CPC ....... *H04W 72/0446* (2013.01); *H04W 72/21* (2023.01); *H04W 72/23* (2023.01);
(Continued)

(58) Field of Classification Search
CPC ......... H04W 72/0446; H04W 72/0413; H04W 72/042; H04W 72/1257; H04W 74/0816; H04W 84/12

See application file for complete search history.

(56) References Cited

U.S. PATENT DOCUMENTS 10,237,891 B1 * 3/2019 Chu ....................... H04W 48/16
2016/0323879 A1 * 11/2016 Ghosh ............... H04W 74/0833

FOREIGN PATENT DOCUMENTS

WO 2016/191558 A1 12/2016

OTHER PUBLICATIONS

Association Exchange using Contention based UL OFDMA by Ming Gan et al., 802.11-17/0396 r3 (Mar. 2017) ("Gan") (Year: 2017).*

* cited by examiner

*Primary Examiner* — Joshua L Schwartz
(74) *Attorney, Agent, or Firm* — Canon U.S.A., Inc. IP Division

(57) ABSTRACT

The invention relates to improve use of resource units in MU transmissions of an 802.11ax network. An un-associated station may receive data frames over a downlink resource unit, RU, assigned to an AID, e.g. 2045, reserved for stations not associated with the AP, The AP may use a downlink RU sharing an allocation scheme feature of an uplink RU previously used by the un-associated station. The AP may also aggregated data frames addressed to several stations within the same downlink RU, for instance to acknowledge frames previously received from the stations. The aggregated data frames may signal which respective response RUs the addressee stations should use for a next multi-user uplink transmission to respond to the AP. These approaches particularly applies to the exchange of management frames (Continued)

for instance to speed up the association procedure of un-associated stations.

15 Claims, 26 Drawing Sheets

(30) Foreign Application Priority Data

| | | | |
|---|---|---|---|
| Oct. 13, 2017 | (GB) | ...................................... | 1716873 |
| Nov. 8, 2017 | (GB) | ...................................... | 1718496 |
| Feb. 22, 2018 | (GB) | ...................................... | 1802907 |
| Apr. 16, 2018 | (GB) | ...................................... | 1806210 |

(51) Int. Cl.
*H04W 74/08* (2009.01)
*H04W 84/12* (2009.01)
*H04W 72/0446* (2023.01)
*H04W 72/21* (2023.01)
*H04W 72/23* (2023.01)
*H04W 72/50* (2023.01)

(52) U.S. Cl.
CPC ..... *H04W 72/535* (2023.01); *H04W 74/0816* (2013.01); *H04W 84/12* (2013.01)

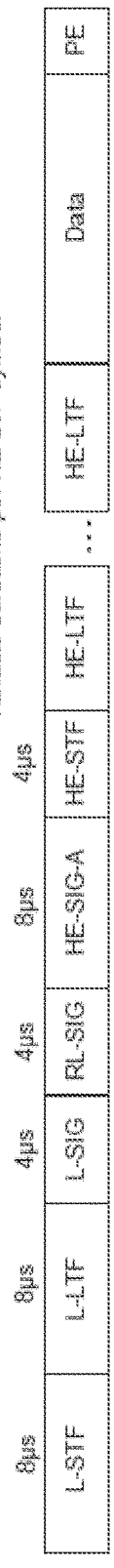
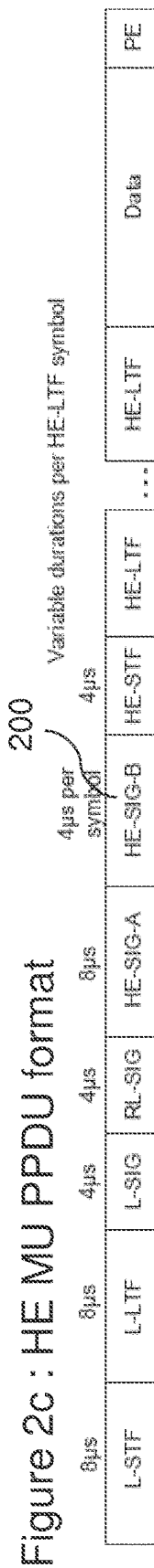
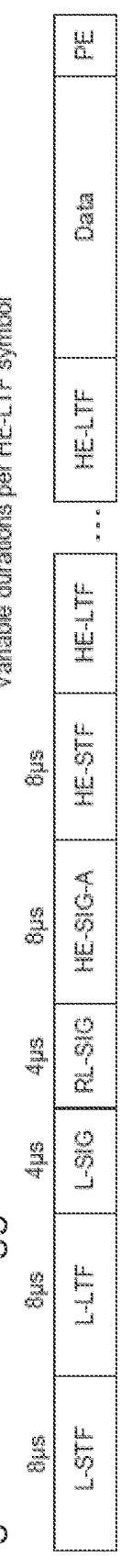
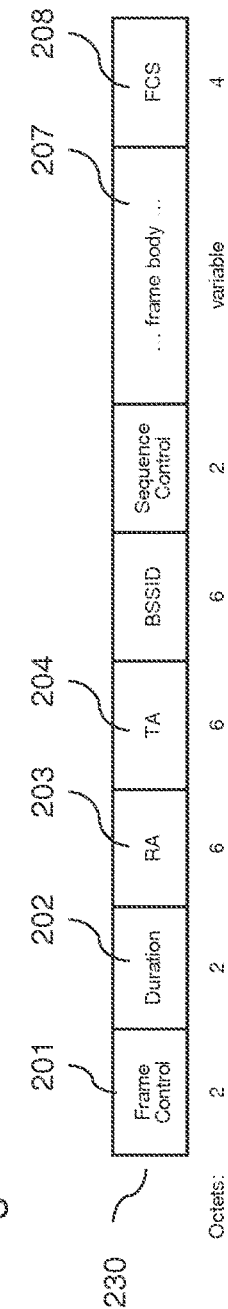

Figure 2e

Diagram: Common Block | User 1 Specific | ... | User n Specific (labels 200, 220, 230, 240)

| Subfield | Number of bits | Description |
|---|---|---|
| RU Allocation | N × 8 | Indicates the RU assignment in the frequency domain. It also indicates the number of user fields in each RU. For RUs of size greater than or equal to 106-tones that support MU-MIMO, it indicates the number of users multiplexed using MU-MIMO. N = 1 for a 20 MHz and a 40 MHz HE MU PPDU. N = 2 for an 80 MHz HE MU PPDU. N = 4 for a 160 MHz or 80+80 MHz HE MU PPDU |
| Center 26-tone RU | 1 | This field is present only for full bandwidth 80 MHz, 160 MHz and 80+80 MHz. For full bandwidth 80 MHz: Set to 1 to indicate that the center 26-tone RU is allocated in the Common Block fields of both HE-SIG-B content channels with the same value. Set to 0, otherwise. For full bandwidth 160 MHz or 80+80 MHz: Set to 1 to indicate that the center 26-tone RU is allocated for one individual 80 MHz in the Common Block fields of both HE-SIG-B content channels. Set to 0, otherwise. |
| CRC | 4 | See 28.3.10.7.3 (CRC computation) |
| Tail | 6 | Used to terminate the trellis of the convolutional decoder. Set to 0 |

| Bit | Field | Number of bits | Description |
|---|---|---|---|
| B0-B10 | STA-ID | 11 | The STA-ID refers to the AID described in 9.4.1.8 (AID field). The 11 LSBs of the AID field are used to address STAs in this field. |
| B11-B14 | Spatial Configuration | 4 | Indication for the number of spatial streams for a STA in an MU-MIMO allocation. See Table 28-24 (Spatial Configuration subfield encoding). |
| B15-B18 | MCS | 4 | Modulation and coding scheme. Set to n for MCSn, where n = 0, 1, 2,....11 Values 12 to 15 are reserved |
| B19 | DCM | 1 | Indicates whether or not dual carrier modulation is used. Set to 1 to indicate that the payload of the HE MU PPDU is modulated with dual carrier modulation for the MCS. Set to 0 indicates that the payload of the PPDU is not modulated with dual carrier modulation for the MCS. |
| B20 | Coding | 1 | Indicates whether BCC or LDPC is used. Set to 0 for BCC Set to 1 for LDPC |

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 26 | 52 | | 26 | 26 | 26 | 26 | 1 |
| 00000101 | 26 | 26 | 26 | 52 | | 26 | 26 | 52 | | 1 |
| 00000110 | 26 | 26 | 26 | 52 | | 52 | | 26 | 26 | 1 |
| 00000111 | 26 | 26 | 26 | 52 | | 52 | | 52 | | 1 |
| 00001000 | 52 | | 52 | | 26 | 26 | 26 | 26 | 26 | 1 |
| 00001001 | 52 | | 52 | | 26 | 26 | 26 | 52 | | 1 |
| 00001010 | 52 | | 52 | | 26 | 52 | | 26 | 26 | 1 |
| 00001011 | 52 | | 52 | | 26 | 52 | | 52 | | 1 |
| 00001100 | 52 | | 52 | | - | 52 | | 52 | | 1 |
| 00001101 | 52 | | 52 | | - | 52 | | 52 | | 1 |
| 00001110 | 26 | 26 | 26 | 26 | 26 | 26 | 106 | | | 8 |
| 00001111 | 52 | | 26 | 26 | 26 | 26 | 106 | | | 8 |
| 00010$y_2y_1y_0$ | 52 | | 52 | | 26 | 26 | 106 | | | 8 |
| 00011$y_2y_1y_0$ | | | 106 | | | 26 | 106 | | | 8 |
| 00100$y_2y_1y_0$ | 26 | 26 | 26 | 26 | 26 | 52 | | 106 | | 8 |
| 00101$y_2y_1y_0$ | 52 | | 26 | 26 | 26 | 52 | | 106 | | 8 |
| 00110$y_2y_1y_0$ | 52 | | 52 | | 26 | 52 | | 106 | | 8 |
| 00111$y_2y_1y_0$ | 52 | | 52 | | 26 | 52 | | 106 | | 8 |
| 01000$y_2y_1y_0$ | | | 106 | | 26 | 26 | 26 | 26 | 26 | 8 |
| 01001$y_2y_1y_0$ | | | 106 | | 26 | 26 | 26 | 52 | | 8 |
| 01010$y_2y_1y_0$ | | | 106 | | 26 | 52 | | 26 | 26 | 8 |
| 01011$y_2y_1y_0$ | | | 106 | | 26 | 52 | | 52 | | 8 |
| 0110$y_1y_0z_1z_0$ | | | 106 | | - | | | 106 | | 16 |
| 01110000 | 52 | 52 | 52 | | - | | | | | 1 |
| 01110001 | colspan: 242-tone RU empty | | | | | | | | | 1 |
| 01110010 | 484-tone RU with zero HE-SIG-B User Specific field in the corresponding HE-SIG-B Content Channel | | | | | | | | | 1 |
| 01110011 | 996-tone RU with zero HE-SIG-B User Specific field in the corresponding HE-SIG-B Content Channel | | | | | | | | | 1 |
| 011101$x_1x_0$ | Reserved | | | | | | | | | 4 |
| 011111$x_1x_0$ | Reserved | | | | | | | | | 8 |
| 10$y_2y_1y_0z_2z_1z_0$ | | | 106 | | 26 | | | 106 | | 64 |
| 11000$y_2y_1y_0$ | 242 | | | | | | | | | 8 |
| 11001$y_2y_1y_0$ | 484 | | | | | | | | | 8 |
| 11010$y_2y_1y_0$ | 996 | | | | | | | | | 8 |
| 11011$y_2y_1y_0$ | 2×996 | | | | | | | | | 8 |
| 111$x_4x_3x_2x_1x_0$ | Reserved | | | | | | | | | 32 |

Figure 2f $y_2y_1y_0$ = 000-111 indicates number of STAs multiplexed in the only 106-tone RU or the left 106-tone RU if there are two 106-tone RUs. The binary vector $y_2y_1y_0$ is indexed as [y[3]y[2]y[1]] indicates $2^2 \times y[3] + 2^1 \times y[2] + y[1] + 1$ STAs multiplexed in the RU.

$z_2z_1z_0$ = 000-111 indicates number of STAs multiplexed in the right 106-tone RU if there are two 106-tone RUs. The binary vector $z_2z_1z_0$ is indexed as [z[3]z[2]z[1]] indicates $2^2 \times z[3] + 2^1 \times z[2] + z[1] + 1$ STAs multiplexed in the RU.

Similarly, $y_1y_0$ = 00-11 indicates number of STAs multiplexed in the left 106-tone RU. The binary vector $y_1y_0$ is indexed as [y[2]y[1]] indicates $2^1 \times y[2] + y[1] + 1$ STAs multiplexed in the RU.

Similarly, $z_1z_0$ = 00-11 indicates the number of STAs multiplexed in the right 106-tone RU. The binary vector $z_1z_0$ is indexed as [z[2]z[1]] indicates $2^1 \times z[2] + z[1] + 1$ STAs multiplexed in the RU.

1 to #9 (from left to the right) is ordered in increasing order of the absolute frequency.

$x_1x_0$ = 00-11, $x_4x_3x_2x_1x_0$ = 00000-11111.

'-' means no STA in that RU.

Figure 2f (contd.)

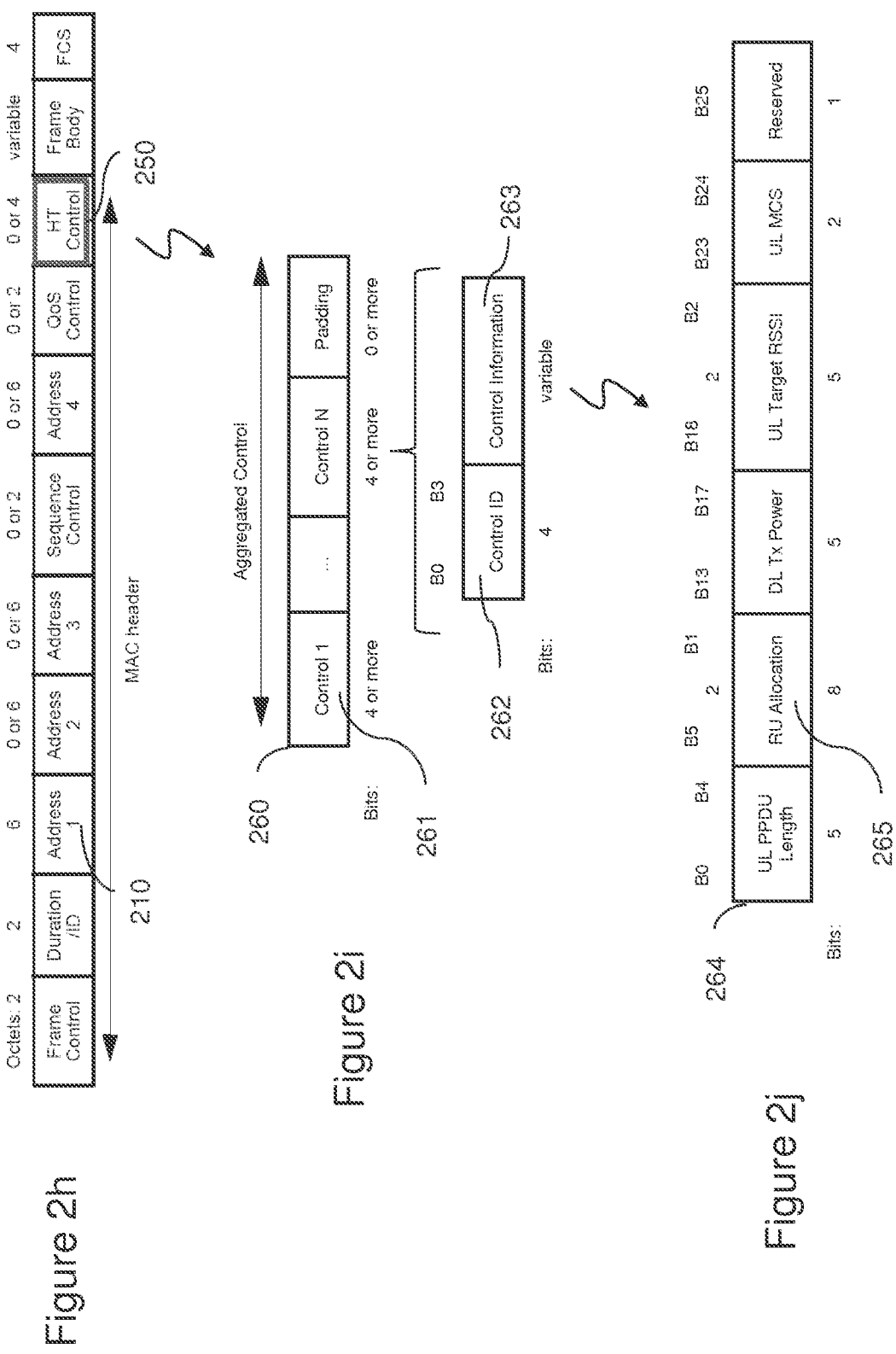

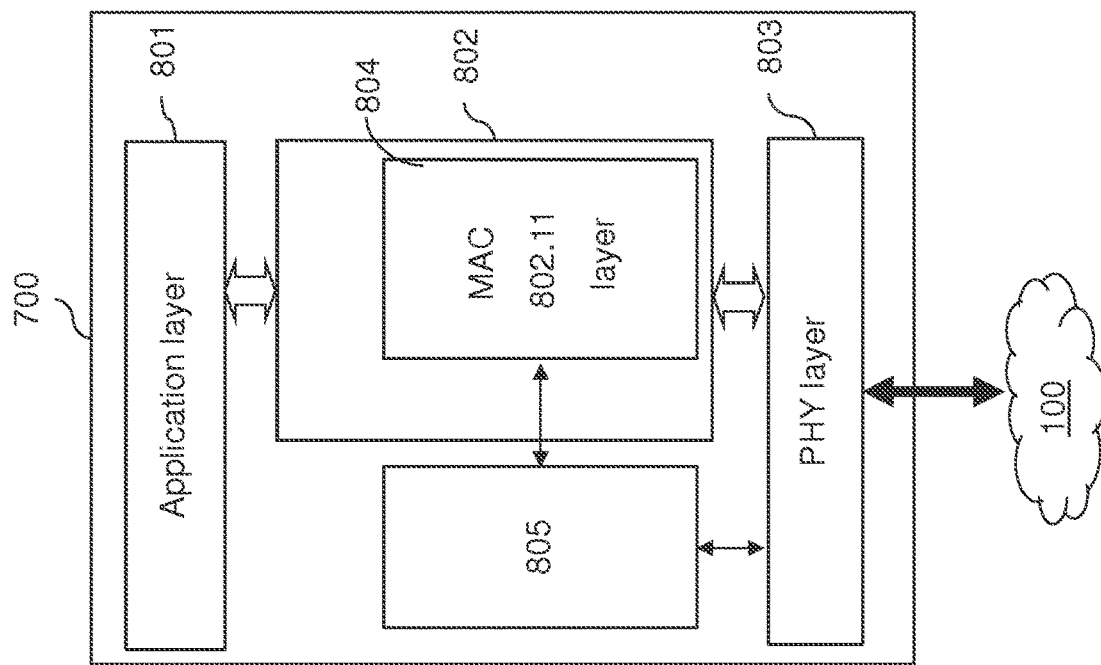
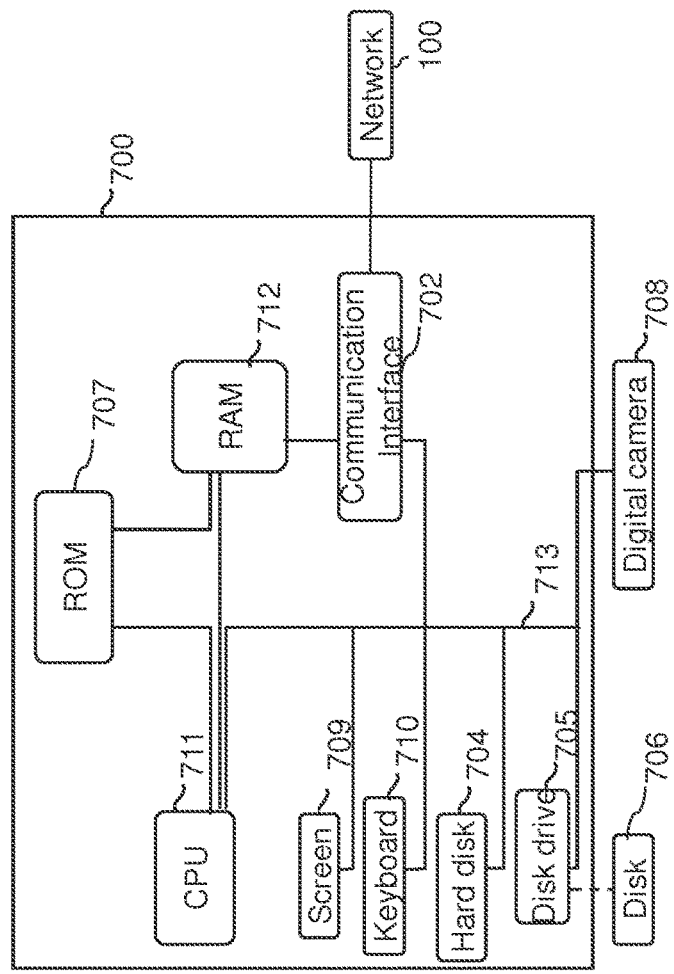
Figure 8
Figure 7

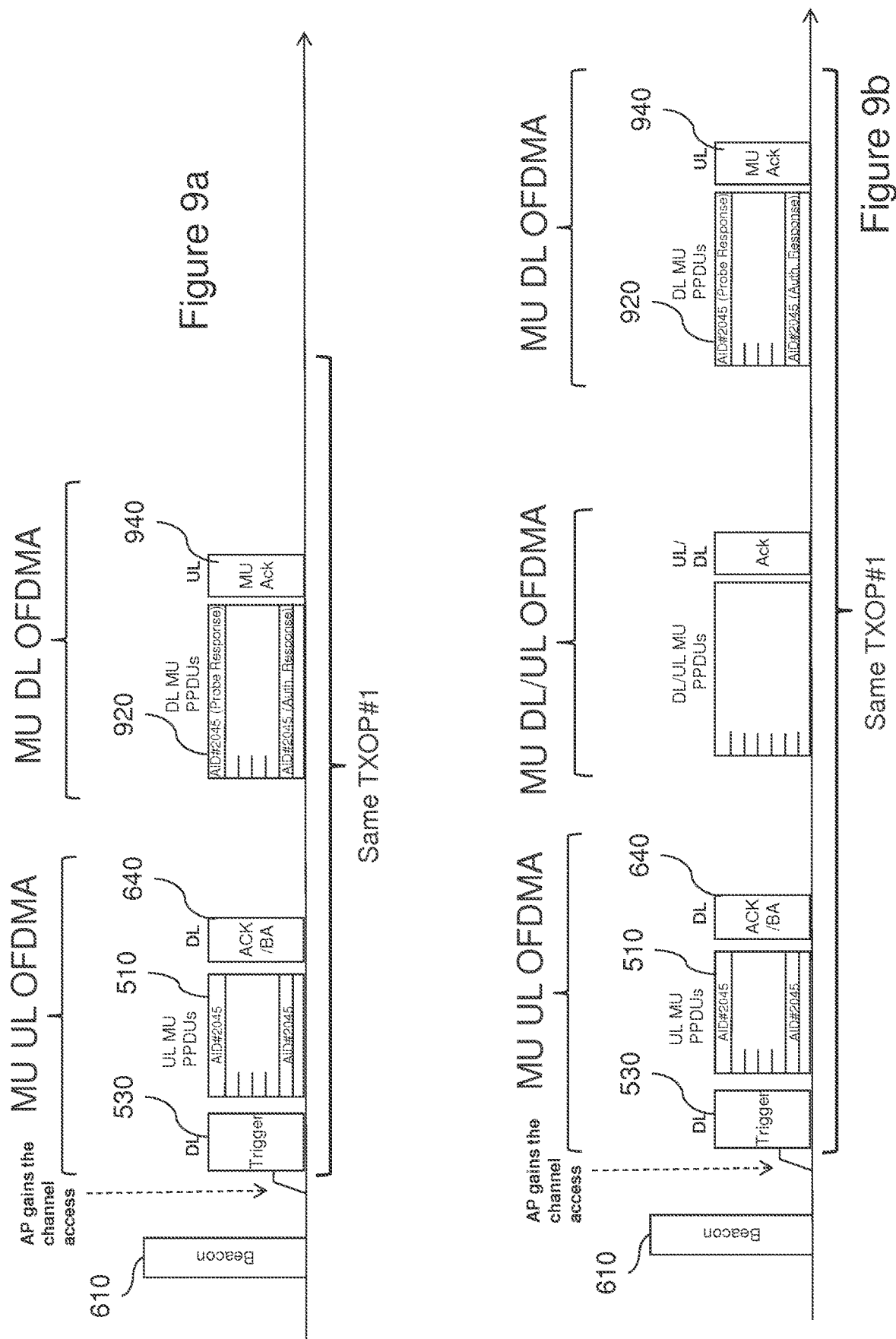

RESOURCE UNITS FOR UNASSOCIATED STATIONS AND GROUPED MULTI-USER TRANSMISSIONS IN 802.11AX NETWORKS

CROSS-REFERENCE TO RELATED APPLICATIONS

This application is a continuation of U.S. patent application Ser. No. 16/606,676, filed on Oct. 18, 2019, which is the National Phase application of PCT Application No. PCT/EP2018/060250, filed on Apr. 20, 2018 and titled "RESOURCE UNITS FOR UNASSOCIATED STATIONS AND GROUPED MULTI-USER TRANSMISSIONS IN 802.11AX NETWORKS". This application claims the benefit under 35 U.S.C. § 119(a)-(d) of United Kingdom Patent Application No. 1706409.8, filed on Apr. 21, 2017, United Kingdom Patent Application No. 1706408.0, filed on Apr. 21, 2017, United Kingdom Patent Application No. 1716873.3, filed on Oct. 13, 2017, United Kingdom Patent Application No. 1718496.1, filed on Nov. 8, 2017, United Kingdom Patent Application No. 1802907.4, filed on Feb. 22, 2018, and United Kingdom Patent Application No. 1806210.9, filed on Apr. 16, 2018. The above cited patent applications are incorporated herein by reference in their entirety.

FIELD OF THE INVENTION

The present invention relates generally to wireless communication networks comprising an access point (AP) and stations and more specifically to the transmission of data frames and/or acknowledgement thereof within a transmission opportunity made of sub-channels or Resource Units, and corresponding devices.

The invention finds application in wireless communication networks, in particular to the access of an 802.11ax composite channel and of OFDMA Resource Units forming for instance an 802.11ax composite channel for Downlink communication from the access point to the stations. One application of the method regards wireless data communication over a wireless communication network using Carrier Sense Multiple Access with Collision Avoidance (CSMA/CA), the network being accessible by a plurality of station devices.

BACKGROUND OF THE INVENTION

The IEEE 802.11 MAC family of standards (a/b/g/n/ac/etc.) defines a way wireless local area networks (WLANs) work at the physical and medium access control (MAC) level. Typically, the 802.11 MAC (Medium Access Control) operating mode implements the well-known Distributed Coordination Function (DCF) which relies on a contention-based mechanism based on the so-called "*Carrier Sense Multiple Access with Collision Avoidance*" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices (or stations) used in dense deployment scenarios.

In this context, multi-user (MU) transmission has been considered to allow multiple simultaneous transmissions to/from different stations (i.e. users) registered with the AP, in both downlink (DL) and uplink (UL) directions from/to the AP, during a transmission opportunity granted to the AP over a 20 MHz (or more) communication channel.

In the uplink, multi-user transmissions are used to mitigate the collision probability. This is because multiple non-AP stations are allowed to transmit simultaneously.

To actually perform such multi-user transmission, it has been proposed to split a granted communication channel (or transmission opportunity granted to the AP) into sub-channels, also referred to as resource units (RUs), that are usually shared in the frequency domain between multiple users (non-AP stations/nodes), based for instance on Orthogonal Frequency Division Multiple Access (OFDMA) technique.

Both multi-user Downlink OFDMA and Uplink OFDMA mechanisms offer overhead reduction as key benefit.

To perform multi-user (MU) Downlink OFDMA transmission, the AP sends an MU packet over the whole granted communication channel, meaning that, from an RU point-of-view, the same preamble is transmitted. Next, RU-dependent payload is sent by the AP, meaning the payload varies from one RU to the other, within the whole granted communication channel. The assignment of the RUs to the stations is signalled at the beginning of the MU Downlink frame, by providing an association identifier (AID) of a station for each RU defined in the transmission opportunity.

Such an AID is individually obtained by each station when registering or associating with the AP during an association procedure, that is to say when the station joins the group of stations managed by the AR During the association procedure, the not-yet-associated station or "unassociated station" and the AP exchange a series of single user (SU) 802.11 management frames in order to enter into an authenticated and associated state for the station. A result of the association procedure is that an AID is assigned to the station, enabling it to use MU communications (resource units).

An AID is usually formed by the 11 least significant bits of a 12-bit identifier.

One station is thus registered or associated with the AP and has an AID, or is not yet registered or unassociated with the AP and has no AID until registration is completed.

A group of stations together with the access point is known as a Basic Service Set (BSS). To be noted that the range of available AIDs has to be shared between the several groups of stations (i.e. several BSSs) that could be handled by the same physical access point which instantiates virtual access points for respective BSSs.

The stations receiving the MU Downlink frames within respective assigned RUs may have to acknowledge receipt thereof during a multi-user (MU) Uplink OFDMA transmission that follows the MU Downlink OFDMA transmission within the same transmission opportunity.

To perform multi-user (MU) Uplink OFDMA transmission, the AP sends a control frame, known as Trigger Frame (TF), to the stations prior they can access one RU assigned to them. The assignment of the RUs to the stations is signalled in a similar way as above (for Downlink transmission using AIDS), but in the payload of the TF packet.

As a station is usually provided with a single transceiver, assignment of multiple RUs to one and the same station shall not be allowed in 802.11ax, for both multi-user Downlink and Uplink transmissions. Of course a station with multiple transceivers could be assigned multiple RUs.

Thus, at most one RU is assigned to a station in the 802.11ax context, with all the stations being offered the same RU length. This has several implications.

In the specific case of MU Downlink acknowledgment through an MU Uplink transmission, the AP does not use a separate trigger frame. Rather, the AP directly indicates, in the data frames sent over each RU of the MU Downlink transmission, which RU the receiving station must use in the following MU Uplink OFDMA transmission to acknowledge the data frames. This specific indication is carried by a so-called UMRS field (standing for UL MU Response Scheduling) provided in at least one data frame of each MU Downlink RU.

With respect to the multi-user Uplink OFDMA transmission, the AP does not know how much data each station has to transmit. 802.11ax thus requires that the AP provides, in the Trigger Frame to the stations, an indication on the size of the requested (and granted) transmission opportunity, i.e. how long each station can transmit data in its allocated RU.

With respect to the multi-user Downlink OFDMA transmission, the AP may have different amounts of data to transmit to the stations. The AP may thus have to add padding bits to the shortest packets, until the transmission opportunity ends.

Padding should be avoided as it is a waste of bandwidth.

Also, the association procedure introduced above appears to be bandwidth consuming. This is mainly because the SU management frame are transmitted at low bit rate (usually the lowest supported data rate) over the 20 MHz channel, in order for legacy stations (i.e. not implementing 802.11 ax) to be able to understand the common 802.11 preamble. This is also because each SU management frame requires a specific access to the medium by the station, and thus requires for the station to wait until being granted a new medium access. As the number of BSSs increases in the same area and/or as the number of stations within a BSS substantially increases, more channel bandwidth is lost due to such SU signaling, and the cost to access the medium by the stations increases.

Recently, the 802.11ax task group has proposed a mechanism for the AP to reserve one or more RUs of a multi-user Uplink OFDMA transmission for not-yet-associated or "unassociated" stations (which are 802.11ax compliant). This is for these stations to speed up their registration to the AP, by transmitting request management frames over such reserved RUs (in MU Uplink OFDMA mode). The proposed mechanism relies on the use of a predefined AID value equal to 2045 to indicate the random RUs the not-yet-associated stations can access through contention.

Even with this new mechanism, the response management frames from the AP are performed using low bit rate SU signaling. This is because, by failing to have an own AID, these not-yet-associated stations cannot be assigned with RUs in a MU Downlink transmission. It remains that channel bandwidth is still wasted.

In addition, 802.11 does not provide mechanisms for multicast traffic, while the AP may receive multicast frames from an upper OSI layer, e.g. the link layer implementing Ethernet multicast. In that case, the AP has to generate a plurality of data frames including payload of the received multicast frame, to be each individually addressed to a respective one of the addressee stations (of the multicast frame). Next, each data frame is transmitted in a dedicated RU of the multi-user Downlink OFDMA transmission, thereby resulting in duplicating several times the same payload data over several RUs. Again, channel bandwidth is wasted.

The current operating mode of the 802.11ax multi-user feature is thus not fully satisfactory, for at least the above downsides regarding the padding bits, the SU signaling for registration and the frame duplication for multicast traffic.

SUMMARY OF INVENTION

It is a broad objective of the present invention to efficiently improve this situation, i.e. to overcome some or all of the foregoing limitations. In particular, the present invention seeks to provide a more efficient usage of the MU Downlink transmission from the AP.

The Multi-User Downlink communication protocol may be enhanced to allow stations to efficiently identify their RUs in the MU Downlink transmission from the AP where no AID can be used. This is for instance the case for not-yet-associated or unassociated stations.

This approach proposes enhanced wireless communication methods in a wireless network comprising an access point and stations.

In embodiments, any station registering or associating with the access point being associated with or assigned a unique association identifier used by the access point to assign, to the station, a resource unit in a transmission opportunity granted to the access point, and the method comprises the following steps, at one of the stations:

determining a downlink resource unit assigned to an association identifier reserved for stations not associated with the access point (meaning the AID is at least not associated with a specific station), from a plurality of downlink resource units comprised in a multi-user downlink transmission from the access point within a transmission opportunity granted to the access point; and receiving a (one or more) frame from the access point on the determined downlink resource unit.

In other embodiments, the method comprises the following steps, at one of the stations:

sending a frame to the access point using an uplink resource unit of a plurality of uplink resource units provided in a multi-user uplink transmission towards the access point within a transmission opportunity granted to the access point, wherein the plurality of uplink resource units are distributed according to an allocation scheme;

determining, based on at least one allocation scheme feature of the uplink resource unit, a downlink resource unit from a plurality of downlink resource units comprised in a multi-user downlink transmission from the access point within a transmission opportunity granted to the access point; and receiving a (one or more) frame from the access point on the determined downlink resource unit.

From the AP perspective, an enhanced wireless communication method in a wireless network comprising an access point and stations is also proposed.

In embodiments, any station registering or associating with the access point being associated with or is assigned a unique association identifier used by the access point to assign, to the station, a resource unit in a transmission opportunity granted to the access point, and the method comprises the following steps, at the access point:

building a plurality of downlink resource units in a multi-user downlink transmission from the access point within a transmission opportunity granted to the access point, the plurality of downlink resource units comprising a downlink resource unit assigned to an association identifier reserved for stations not associated with the access point (meaning the AID is at least not associated with a specific station); and sending a frame to a station on the downlink resource unit assigned to an association identifier reserved for stations not associated with the access point.

In other embodiments, the method comprises the following steps, at the access point:

receiving a frame from a station on an uplink resource unit of a plurality of uplink resource units comprised in a multi-user uplink transmission towards the access point within a transmission opportunity granted to the access point, wherein the plurality of uplink resource units are distributed according to an allocation scheme;

building a plurality of downlink resource units in a multi-user downlink transmission from the access point within a transmission opportunity granted to the access point, the plurality of downlink resource units comprising a downlink resource unit having at least one matching allocation scheme feature with the uplink resource unit; and sending a frame (usually a response to the frame received on the uplink RU) to the station on the downlink resource unit.

802.11ax already proposes a prefixed number of RU allocation schemes for a 20 MHz channel, that each defines a specific distribution of RUs (e.g. in terms of RU size, frequency band, RU positions along the frequency direction in 802.11ax) within the 20 MHz channel. The RU allocation scheme is for instance declared in the HE-SIG-B field of the MU Downlink frame or in an equivalent field of a trigger frame.

Different RU allocation schemes may be used for each 20 MHz channel forming a composite channel of 40 MHz or 80 MHz or 160 MHz width.

By using a downlink RU that matches, according to some RU allocation scheme criteria/features, an uplink RU already used, AID is no longer needed for the station to identify, in a Downlink transmission, which downlink RU to listen to. This is particularly advantageous for communication with stations which have not yet been associated with the AP (i.e. which have no AID).

In the other embodiments, by using AID not associated with stations during MU Downlink transmissions, the proposed method offers the AP with the opportunity to address stations deprived of AID, such as stations not associated with the AP. The AID not associated with specific stations may then be reserved for stations not associated with the AP for particular embodiments. Again, such stations may easily identify, in a Downlink transmission, which downlink RU to listen to.

As extensively described below, these approaches may be implemented during the association procedure for such not-yet-associated stations. As a result, medium occupancy and global latency for the association procedure are substantially reduced in an 802.11ax network.

MU Downlink transmission is thus significantly improved compared to known 802.11ax current requirements.

Also, there is provided a wireless communication device forming station in a wireless network comprising an access point and stations.

In embodiments, any station registering or associating with the access point being associated with or is assigned a unique association identifier used by the access point to assign, to the station, a resource unit in a transmission opportunity granted to the access point, and the device forming station comprises at least one microprocessor configured for carrying out the steps of:

determining a downlink resource unit assigned to an association identifier reserved for stations not associated with the access point (meaning the AID is at least not associated with a specific station), from a plurality of downlink resource units comprised in a multi-user downlink transmission from the access point within a transmission opportunity granted to the access point; and receiving a frame from the access point on the determined downlink resource unit.

In other embodiments, the device forming station comprising at least one microprocessor configured for carrying out the steps of:

sending a frame to the access point using an uplink resource unit of a plurality of uplink resource units provided in a multi-user uplink transmission towards the access point within a transmission opportunity granted to the access point, wherein the plurality of uplink resource units are distributed according to an allocation scheme;

determining, based on at least one allocation scheme feature of the uplink resource unit, a downlink resource unit from a plurality of downlink resource units comprised in a multi-user downlink transmission from the access point within a transmission opportunity granted to the access point; and receiving a frame from the access point on the determined downlink resource unit.

Also, there is provided a wireless communication device forming access point in a wireless network comprising an access point and stations.

In embodiments, any station associating with the access point is assigned a unique association identifier used by the access point to assign, to the station, a resource unit in a transmission opportunity granted to the access point, and the device forming access point comprises at least one microprocessor configured for carrying out the steps of:

building a plurality of downlink resource units in a multi-user downlink transmission from the access point within a transmission opportunity granted to the access point, the downlink plurality of resource units comprising a downlink resource unit assigned to an association identifier reserved for stations not associated with the access point (meaning the AID is at least not associated with a specific station); and sending a frame to a station on the downlink resource unit assigned to an association identifier reserved for stations not associated with the access point.

In other embodiments, the device forming access point comprising at least one microprocessor configured for carrying out the steps of:

receiving a frame from a station on an uplink resource unit of a plurality of uplink resource units comprised in a multi-user uplink transmission towards the access point within a transmission opportunity granted to the access point, wherein the plurality of uplink resource units are distributed according to an allocation scheme;

building a plurality of downlink resource units in a multi-user downlink transmission from the access point within a transmission opportunity granted to the access point, the plurality of downlink resource units comprising a downlink resource unit having at least one matching allocation scheme feature with the uplink resource unit; and sending a frame (usually a response to the frame received on the uplink RU) to the station on the downlink resource unit.

Optional features of these embodiments are defined in the appended claims with reference to methods. Of course, same features can be transposed into system features dedicated to any device according to the embodiments of the invention.

In embodiments for the station, a plurality of downlink resource units are determined at the determining step (it may be considered that there is an RU-based aggregation of the data frames over the plurality of downlink RUs), and wherein the method may further comprises retrieving one or more data frames from one of the plurality of determined downlink resource units.

In embodiments for the station, the method may further comprises, at the station, sending a frame to the access point using an uplink resource unit of a plurality of uplink resource units provided in a multi-user uplink transmission towards the access point within a transmission opportunity granted to the access point, wherein the plurality of uplink resource units are distributed according to an allocation scheme. In that case, determining the downlink resource unit assigned to an association identifier not associated with a specific station, and in particular reserved for stations not associated with the access point, may also be based on at least one allocation scheme feature of the uplink resource unit.

Conversely for the AP, the method may further comprises, at the access point, receiving a frame from a station on an uplink resource unit of a plurality of uplink resource units provided in a multi-user uplink transmission towards the access point within a transmission opportunity granted to the access point, wherein the resource units of the plurality of uplink resource units are distributed according to an allocation scheme. In that case, the downlink resource unit assigned to an association identifier not associated with a specific station, and in particular reserved for stations not associated with the access point, in the built plurality of downlink resource units may have at least one matching allocation scheme feature with the uplink resource unit.

In some embodiments, determining the downlink resource unit is based on a number of downlink resource units assigned to the association identifier reserved for stations not associated with the access point, in the multi-user downlink transmission.

In one implementation, if the number of downlink resource units is one, the single downlink resource unit assigned to the association identifier reserved for stations not associated with the access point is selected as being the determined downlink resource unit for receiving the frame.

In one implementation, if the number of downlink resource units is more than one, one downlink resource unit assigned to the association identifier reserved for stations not associated with the access point is selected as being the determined downlink resource unit for receiving the frame, wherein the selecting is based on at least one allocation scheme feature of an uplink resource unit used by the station to send a frame to the access point. The uplink resource unit may be one among a plurality of uplink resource units provided in a multi-user uplink transmission towards the access point within a transmission opportunity granted to the access point, and wherein the plurality of uplink resource units are distributed according to an allocation scheme.

In some embodiments, and preferably (but not only) when it is determined the multi-user downlink transmission comprises a single determined downlink resource unit assigned to the association identifier reserved for stations not associated with the access point, the station may further comprise checking whether the frame received in the determined downlink resource unit is addressed to the station, prior to decoding the frame. It means the station further comprises checking whether the determined downlink resource unit contains a frame addressed to the station, so to trigger the receiving, and subsequent decoding, of the frame in case of a positive checking. This approach is to discard a frame if it is not addressed to the station.

In embodiments related to the association procedure of stations with the AP, the station is not associated with the access point, and the frame in the uplink resource unit is a request management frame in a process of associating the station with the access point, while the frame in the downlink resource unit is a response management frame in response to the request management frame. In this context, the embodiments substantially improve the global latency for the association procedure.

In some embodiments, the allocation scheme feature includes a position of the resource unit in the corresponding plurality of resource units, according to the allocation scheme. For instance, if the uplink resource unit corresponds to RU at position #3 in the RU allocation scheme (as indicated in a trigger frame triggering the MU Uplink transmission), the downlink resource unit for downlink transmission may be the one at position #3 in the plurality of downlink RUs. This may be regardless of whether the two RUs share the same frequency range (or range of tones) or not.

This feature or criterion is easily identified by the AP and the station, while requiring little information to temporarily store from the uplink RU in order to build the downlink RU.

In variants, the allocation scheme feature includes a frequency band of the resource unit in the corresponding plurality of resource units distributed in the frequency domain according to the allocation scheme. This may be regardless of whether the two RUs share the same position in their respective plurality of RUs. For instance the downlink RU has exactly the same tones as the uplink RU, within the considered 20 MHz channels. Also, it may be contemplated having the downlink RU starting at or ending with exactly the same tone as the uplink RU (even if their RU sizes are different).

This feature or criterion is easily identified by the AP and the station, while requiring little information to temporarily store from the uplink RU in order to build the downlink RU.

In other variants, the allocation scheme feature includes a size of the resource unit in the corresponding plurality of resource units, according to the allocation scheme. For instance, if the uplink RU is 52-tones width, the downlink RU can be identified as being one (or the one) being also 52-tones width. It may be noted that one or more other criteria may be used to identify the right downlink RU from amongst several candidates (for instance if several 52-tones width RUs are defined in the plurality of downlink RUs). An exemplary other criterion is a predefined AID assigned to the downlink RU, as introduced below.

Of course, all or part of the position criterion, frequency band criterion and size criterion may be combined to determine or build the downlink RU relatively to the uplink RU.

In some embodiments, any station registering or associating with the access point is associated with or assigned a unique association identifier used by the access point to assign, to the station, a resource unit in a transmission opportunity granted to the access point, and the uplink and/or downlink resource units are assigned to a predefined association identifier not associated with a specific station, and in particular reserved for stations not associated with the access point. Although the predefined association identifier is not dedicated to a specific station, it makes it possible for the stations (e.g. not-yet-associated stations) to quickly identify an uplink RU according to these embodiments and to verify the allocation scheme feature on few RUs to find the appropriate downlink RU. This reduces processing at the station.

In specific embodiments, the uplink and downlink resource units are assigned to the same predefined association identifier not associated with a specific station, in particular reserved for stations not associated with the access point. This is to simplify the processing at both the AP and the stations.

According to a specific feature, the association identifier not associated with a specific station is an 11-bit identifier equal to 2045. In a particular case, this association identifier is reserved for stations not associated with the access point.

In some embodiments, the pluralities of uplink and downlink resource units belong to the same transmission opportunity granted to the access point. This approach reduces latency in a frame exchange initiated between the AP and the station (e.g. related to an association procedure).

In specific embodiments, the plurality of downlink resource units in the multi-user downlink transmission directly follows the plurality of uplink resource units comprised in the multi-user uplink transmission within the same transmission opportunity granted to the access point. This means without intermediary (downlink or uplink) resource units between them. This however does not exclude the presence of acknowledgment. This approach optimizes the latency.

In variants, the plurality of uplink resource units comprised in the multi-user uplink transmission and the plurality of downlink resource units in the multi-user downlink transmission are separated by at least one third plurality of resource units provided for a multi-user uplink or downlink transmission within the same transmission opportunity granted to the access point. It makes it possible for the AP to schedule intermediary MU Downlink or Uplink transmissions within the same TXOP, to improve exchanges with the stations.

In other variants, the pluralities of uplink and downlink resource units belong to different transmission opportunities granted to the access point. This may give to the AP enough time to prepare the responses to the not-yet-associated stations that have sent requests through a so-called "uplink RU" of an MU Uplink transmission.

In some embodiments, the resource units of each plurality are distributed in the frequency domain according to the respective allocation scheme. This applies to the RUs defined in 802.11ax.

In some embodiments, the plurality of uplink resource units provided in the multi-user uplink transmission is triggered in the transmission opportunity by a trigger frame sent by the access point. This particularly applies to 802.11ax networks.

The Multi-User Downlink communication protocol may also be enhanced to support a multiplicity of addressee stations for the same Downlink RU, including those stations which have not yet received an AID (i.e. not yet registered or associated with the AP).

This approach (referred below as the aggregation-based approach) proposes enhanced wireless communication methods in a wireless network comprising an access point and stations.

In embodiments, the method comprises the following steps, at one of the stations:
determining a resource unit dedicated to a plurality of stations, from amongst a plurality of resource units forming a multi-user downlink transmission opportunity granted to the access point for downlink communication to the stations;
receiving aggregated data frames over the determined resource unit; and
retrieving one or more data frames addressed to the station, from amongst the received aggregated data frames.

From the AP perspective, enhanced wireless communication methods in a wireless network comprising an access point and stations are also proposed.

In embodiments, the method comprises the following steps, at the access point:
aggregating data frames addressed to two or more stations; and
transmitting the aggregated data frames over a resource unit dedicated to a plurality of stations, from amongst a plurality of resource units forming a multi-user downlink transmission opportunity granted to the access point for downlink communication to the stations.

With these new RU-based transmission schemes, the inventors provide a communication mechanism that supports a multiplicity of addressee stations for the same Downlink RU, including those stations which have not yet received an AID (i.e. not yet registered or associated with the AP).

MU Downlink transmission is thus significantly improved compared to known 802.11ax current requirements. Indeed, by combining data frames to be addressed to several stations within the same dedicated RU, embodiments of the invention make it possible for the AP to efficiently target a large number of stations, thereby using more efficiently each RU (and thus reducing padding bits), avoiding duplicating the same payload over several RUs (in case of multicast) and/or efficiently (i.e. at a higher bit rate) providing response management frames to the not-yet-associated stations.

Such a RU dedicated to multiple addressee stations may be named "group" RU (or "multicast" RU) in comparison to classical "individual" RUs each of which being assigned to a single station.

In practice, such group RUs may be used to convey various types of data frames, including broadcast frames (the same frames intended to all stations), multicast frames (the same frames intended to multiple stations) or even multiple unicast frames (multiple frames, each intended to a single station).

Also, there is provided a wireless communication device forming station in a wireless network comprising an access point and stations.

In embodiments, the device forming station comprising at least one microprocessor configured for carrying out the steps of:
determining a resource unit dedicated to a plurality of stations, from amongst a plurality of resource units forming a multi-user downlink transmission opportunity granted to the access point for downlink communication to the stations;
receiving aggregated data frames over the determined resource unit; and
retrieving one or more data frames addressed to the station, from amongst the received aggregated data frames.

Also, there is provided a wireless communication device forming access point in a wireless network comprising an access point and stations.

In embodiments, the device forming access point comprising at least one microprocessor configured for carrying out the steps of:
aggregating data frames addressed to two or more stations; and
transmitting the aggregated data frames over a resource unit dedicated to a plurality of stations, from amongst a plurality of resource units forming a multi-user downlink transmission opportunity granted to the access point for downlink communication to the stations.

In this aggregation-based approach, an issue remains with respect to the frame acknowledgment for the group RUs.

Indeed, in the conventional 802.11ax acknowledgment mechanism, the acknowledgment of data frames received over an RU is made by the station to which the RU has been assigned over an RU in the following MU Uplink OFDMA transmission as indicated in the UMRS field (received in the Downlink RU). However, this mechanism cannot operate for group RUs, as no specific station is designated as the RU assignee. Furthermore, even if one station would be so designated, it should not be allowed to acknowledge the data frames addressed to other stations of the group RU.

Intuitively, other solutions are possible. However, they are not efficient.

For instance, the response frames (here acknowledgments) from the addressee stations of the group RU may be triggered later on by the AP. This can be performed by individual SU exchanges between the AP and each addressee station. However, SU exchanges are not efficient in term of bandwidth use: channel bandwidth is still wasted.

Alternatively, the AP may emit a following trigger frame to offer RUs for the addressee stations to acknowledge previous MU Downlink OFDMA transmission from the AP. However, by failing to have an own AID, not-yet-associated addressee stations cannot be offered scheduled RUs, and thus may rely on random RUs only which are subject to poor efficiency due to contention. Not-yet-associated addressee stations may thus not be in position to efficiently acknowledge data frames received within a group RU of a MU Downlink OFDMA transmission (here below a Downlink group RU or DL group RU). A consequence is that the AP will retransmit the not-acknowledged data frames: channel bandwidth is still wasted.

To overcome such drawbacks, enhanced methods and devices are proposed by the inventors with the aim of providing an efficient acknowledgment mechanism, from which better usage of the OFDMA MU transmission by the AP can be obtained.

In this context, an enhanced wireless communication method of the above aggregation-based approach is proposed that further comprises, at the access point, the step of signalling, in two aggregated data frames addressed to two respective stations, respective response resource unit information identifying a response resource unit to be used by the addressee station in a multi-user uplink transmission opportunity following the multi-user downlink transmission opportunity to provide a response to data frames to the access point.

Conversely, an enhanced aggregation-based method at the station further comprises the step of:

obtaining, from the retrieved data frames, response resource unit information identifying one response resource unit in the multi-user uplink transmission opportunity, and sending to the access point a response to the retrieved data frames over the identified response resource unit.

For instance, the response resource unit information is signalled in the Uplink Multi-user Response Scheduling (UMRS) control subfield of a data frame as defined in the 802.11ax, version 2.0, standard (officially known as Draft P802.11ax_D2.0, in particular section 9.2.4.6.4.2 "UMRS Control").

Contrary to the 802.11ax requirements limiting a single value of UMRS per RU, these enhanced methods allow the various addressee stations (via group RU) to efficiently acknowledge receipt of data frames.

As the AP is able to schedule more RUs in the MU Uplink OFDMA transmission than in the MU Downlink OFDMA transmission, it is possible to provide an opportunity for all the addressee stations (even if DL group RUs are used) to acknowledge their received data frames. Retransmission of data frames by the AP is this avoided, thereby saving channel bandwidth.

Also, this is the addressee station as specified in the RA field (MAC address) of the frame MAC header that can use the response RU indicated in the UMRS information of the same MAC header. As a consequence, even the addressee stations which are not yet associated with the AP can acknowledge data frames. The association procedure can thus be simplified for the stations (using random RU with AID=2045, receiving responses from the AP during MU Downlink transmission, and acknowledging the response during subsequent MU Uplink transmission). In other words, the UMRS control field can be used inside each MPDU (MAC Protocol Data Unit) of the A-MPDU (Aggregate MPDU) indicating which UL RU must be used by the unassociated station to acknowledge the MPDU(s).

Also, there is provided a wireless communication device forming station in a wireless network comprising an access point and stations. The device forming station comprises at least one microprocessor configured for carrying out the steps defined above for the enhanced aggregation-based method from station perspective.

Also, there is provided a wireless communication device forming access point in a wireless network comprising an access point and stations. The device forming access point comprises at least one microprocessor configured for carrying out the steps defined above for the enhanced aggregation-based method from AP perspective.

Optional features of these enhanced aggregation-based embodiments are defined in the appended claims with reference to methods. Of course, same features can be transposed into system features dedicated to any device according to the embodiments of the invention.

In some embodiments, the enhanced aggregation-based method further comprises, at the access point, the step of receiving responses from the addressee stations over resource units of the following multi-user uplink transmission opportunity, the response from an, preferably any, addressee station being received over the response resource unit identified in the response resource unit information (UMRS) signalled in a data frame addressed to said addressee station within the transmitted aggregated data frames. Of course, similar response RU information can be used for the stations addressed via individual RUs.

Preferably, the responses from the addressee stations include acknowledgments of data frames of the transmitted aggregated data frames.

In some embodiments, the multi-user uplink transmission opportunity and the multi-user downlink transmission opportunity belongs to the same transmission opportunity granted to the access point. A single contention to access the medium is thus required for the AP, thereby saving time and channel bandwidth.

In other embodiments, the enhanced aggregation-based method further comprises, at the access point, configuring the multi-user uplink transmission opportunity in such a way it includes a number of response resource units based on a number of stations addressed in the multi-user downlink transmission opportunity. This makes it possible for the AP to provide an opportunity for frame acknowledgment to desired addressed stations.

For instance, the enhanced aggregation-based method further comprises, at the access point, configuring the multi-user uplink transmission opportunity in such a way it includes a number of response resource units that is at least (preferably the same as) a number of stations that have to provide a response to data frames addressed to them over any resource unit of the multi-user downlink transmission opportunity. This makes it possible for all the stations to provide an acknowledgment to the AP.

For instance, stations that have to provide a response include those addressee stations for which a respective response resource unit information is signalled in the aggregated data frames. In fact, stations that have to provide a response may be those compliant with the UMRS signalling and/or those to which UMRS information is provided in the group or individual RUs of the MU Downlink transmission.

In some embodiments, aggregating data frames comprises aggregating data frames to be addressed to a number of stations in such a way a total number of stations addressed over the plurality of resource units forming the multi-user downlink transmission opportunity does not exceed a determined maximum number of stations. This configuration restricts the possibility for the AP to involve too many stations per group RU and thus in the whole MU Downlink transmission, in such a way not all of them will be able to acknowledge the data frames. As a consequence, data frame acknowledgment is efficiently conducted, reducing the risks for the AP to have to resend data frames correctly received (but not yet acknowledged).

In particular, the determined maximum number of stations may depend on (e.g. is equal to) a maximum number of elementary resource units that can be defined within the multi-user uplink transmission opportunity. The elementary resource units may be seen as the smallest RUs acceptable for instance by the 802.11ax standard. In the latter, each 20 MHz channel can be divided at most into nine elementary RU.

Optional features of the aggregation-based embodiments are also defined in the appended claims with reference to methods. Of course, same features can be transposed into system features dedicated to any device according to the embodiments of the invention.

This aggregation-based approach may be combined with the first approach previously presented, in particular when using AID not associated with stations during MU Downlink transmissions to offer the AP with the opportunity to address stations deprived of AID, such as stations not associated with the AP. In such combination where the station determines a resource unit assigned to an association identifier not associated with a specific station, the method may further comprise, at the station:

receiving aggregated data frames over the determined resource unit; and retrieving one or more data frames addressed to the station, from amongst the received aggregated data frames.

Correspondingly, at the access point, the method according to the first approach may further comprise:

aggregating data frames to be addressed to two or more stations; and transmitting the aggregated data frames over the resource unit assigned to an association identifier not associated with a specific station.

In embodiments, any station registering or associating with the access point is associated with or assigned a unique association identifier used by the access point to assign, to the station, a resource unit in a transmission opportunity granted to the access point, and the resource unit dedicated to a plurality of stations is assigned in the downlink transmission opportunity to a predefined association identifier not associated with a specific station. This may be seen as a "group AID" for a group of stations. All 802.11ax compliant stations may thus be aware of such predefined AID or AIDs, in order to scrutinize the relevant RU.

In some embodiments, the access point may set, in each data frame to be aggregated, a MAC address field to a MAC address of the addressee station. This is to allow the addressee stations to efficiently retrieve their own data frames. Indeed, from the station perspective, retrieving one or more data frames addressed to the station may thus include comparing a MAC address of each aggregated data frame with a MAC address of the station.

To avoid too much processing at the access point, the station may not acknowledge receipt of the retrieved data frames, to the access point. Thus all the data frames in the Downlink RU are not acknowledged.

In a variant, the station may send an acknowledgment of the retrieved data frames only if the retrieved data frames include the last received aggregated data frame. It means that only the last data frame is explicitly acknowledged by its corresponding receiving station, and the other data frames of the Downlink RU for the group of stations are thus implicitly acknowledged as soon as the acknowledgment for the last one is correctly received.

As introduced above, one application of this approach regards the management frames for the not-yet-associated (registered) stations to efficiently register with the access point. In this context, the station may, prior to determining a resource unit, send a management frame to the access point within a procedure of associating (i.e. registering) the station with the access point. In such case, determining a resource unit includes determining a resource unit assigned to stations not yet associated with the access point, to retrieve a response from the access point to the sent management frame. In other words, a resource unit in the Downlink OFDMA transmission is reserved for the not-yet-associated stations, from which RU they may obtain the responses to their request management frames.

This approach avoids using SU signalling even for the response management frames. Network bandwidth is thus saved.

From AP's perspective, it may mean that the access point, prior to the step of transmitting data frames, receives at least one management frame from a station willing to associate (i.e. register) with the access point, and the transmitted data frames include a response to the received management frame and are transmitted over a resource unit assigned to stations not yet associated with the access point.

To provide an enhanced association procedure, the management frame is sent in a prior resource unit forming part of an uplink transmission opportunity granted to the access point for uplink communication from the stations, the prior resource unit being assigned to stations not yet associated with the access point. Thus, both request and response management frames can be sent in (high bit rate) MU OFDMA RUs, thereby reducing medium occupancy.

In some embodiments, the determined resource unit and the prior resource unit are assigned in the downlink and uplink transmission opportunities respectively, to the same prefixed association identifier not associated with a specific station, for instance AID=2045 or an association identifier associated with a basic service set (provided by the AP), for instance equal to the basic service set identifier of the basic service set. This makes the management at the stations and the access point easier.

To further improve the association procedure, the station may send an acknowledgment of the retrieved data frames, in a next resource unit forming part of a next uplink transmission opportunity granted to the access point for uplink communication from the stations, the next resource unit being assigned to stations not yet associated with the access point. This is an efficient way to provide, at low cost, an opportunity to each not-yet-associated station willing to register, to acknowledge receipt of response management frames (i.e. without using SU signalling).

Another application of the present invention regards the management of multicast traffic or any residual traffic (i.e. small amounts of data that would require padding bits given the RU size).

In the case of multicast traffic, the access point receives a multicast frame (e.g. from an upper OSI layer) to be addressed to a plurality of addressee stations. Next, responsive to the multicast frame reception, the access point generates a plurality of data frames including payload of the multicast frame, to be each individually addressed to a respective one of the addressee stations. The aggregated data frames to be transmitted over the resource unit dedicated to a plurality of stations thus include the generated data frames including payload of the multicast frame.

For instance, the resource unit dedicated to a plurality of stations to transmit the aggregated data frames including the payload of the multicast frame may be assigned in the downlink transmission opportunity to a prefixed association identifier not associated with a specific station equal to 2042.

In the case of residual traffic, the access point may determine small data frames to be transmitted to stations, given a size of the downlink transmission opportunity (possibly the size of the RUs) and a size threshold. Thus, the determined small data frames are aggregated and transmitted over the resource unit dedicated to a plurality of stations, referred to as collecting resource unit. For instance, the collecting resource unit is signalled in the downlink transmission opportunity using a prefixed association identifier equal not associated with a specific station to 0.

From the station perspective, both multicast and residual traffic can be handled in the same way. For instance, the station may first scan through resource units assigned to individual stations to verify whether a resource unit of the plurality is individually assigned to the station or not, and in case of negative verification only, determining a resource unit dedicated to a plurality of stations from the not-yet scanned resource units of the plurality. In particular, determining a resource unit dedicated to a plurality of stations from the not-yet scanned resource units may comprise first scanning through resource units assigned to lists of stations to verify whether the station belongs to a list associated with one of the scanned resource units. The list may for instance correspond to a specific AID used as a group AID, each station being able to determine whether or not it belongs to such group (for instance through bit masking or with reference to group AID provided by the AP upon registration).

Thus, in case of positive verification, the determined resource unit (to retrieve the data frames) is the one assigned to a list that includes the station.

Also, in case of negative verification only, the determined resource unit is a collecting resource unit used to convey data frames for any station not assigned, individually or through a list, to another resource unit forming the downlink transmission opportunity.

These various approaches avoid duplicating the same data over several RUs and/or reduce the amount of padding data to be added in the RUs. Consequently, medium use is made more efficient.

To ensure efficient processing by the stations, embodiments provide that the downlink transmission opportunity includes an ordered signalling of assignments of resource units of the plurality to one or more stations, the ordered signalling first defining each assignment of a resource unit to an individual station, next defining each assignment of a resource unit to a group of stations, then defining an assignment of the collecting resource unit to any station not yet associated with a resource unit. Indeed, a station will thus first determine individual RUs, before (in case of negative verification) considering whether or not a group RU has been used. Thus, only if no RU has been identified for the station, the latter can scrutinize the collector RU (dedicated to any station) to possibly retrieve some data addressed to it.

Thanks to this approach, a station may advantageously disregard any further RU analysis in the same Downlink transmission opportunity, once it has found one RU (individual or group) addressed to it.

Embodiments of the present invention may be implemented in all 802.11ax compliant AP and non-AP stations. Alternatively, 802.11ax compliant AP and non-AP stations may optionally implement features of embodiments of the present invention.

In this context, and according to one implementation, there is provided a wireless communication method in a wireless network comprising an access point and stations, the method comprising the following steps, at the access point:

receiving a capability information from one or more stations, the capability information comprising the capability of a station to allow a data frame addressed to the station to be aggregated with one or more data frames addressed to one or more other stations;

aggregating data frames based on the received capability information; and transmitting the aggregated data frames to the one or more stations.

In a particular implementation, the transmitting is performed over a resource unit dedicated to a plurality of stations, from amongst a plurality of resource units forming a multi-user downlink transmission opportunity granted to the access point for downlink communication to the stations.

Preferably, the capability information is advertised in a management frame during association procedure of the one or more stations to the access point.

For example, the capability information is signalled in a subfield of the HE MAC Capability Information field as defined in the 802.11ax, version 2.1, standard.

In particular, if a station does not allow a data frame addressed to the station to be aggregated with one or more data frames addressed to one or more other stations, the aggregating comprising forming a data unit comprising one or more data frame addressed only the station.

Conversely, there is provided a wireless communication method in a wireless network comprising an access point and stations, the method comprising the following steps, at one of the stations:

transmitting a capability information to the access point, the capability information comprising the capability of the station to allow a data frame addressed to the station by the access point to be aggregated with one or more data frames addressed to one or more other stations;

receiving aggregating data frames based from the access point; and extracting data frames from the received aggregated data frames, wherein the extracting is based on the transmitted capability information.

In a variant, the method further comprising, a step of receiving a capability information from the access point, the capability information comprising the capability of the access point to aggregate data frames addressed to two or more stations.

Particularly, the extracting is further based on the capability information received from the access point.

In a particular implementation, the receiving is performed over a resource unit dedicated to a plurality of stations, from amongst a plurality of resource units forming a multi-user downlink transmission opportunity granted to the access point for downlink communication to the stations.

In particular, the capability information is advertised in a management frame during association procedure of the station to the access point. For example, the capability information is signalled in a subfield of the HE MAC Capability Information field as defined in the 802.11ax, version 2.1, standard.

The one implementation concerns also a wireless communication device forming access point in a wireless network comprising an access point and stations, and a wireless communication device forming station in the wireless network.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 2a to 2g present various formats of 802.11 frames according to the 802.11ax standard;

FIGS. 2h to 2j illustrate the UMRS Control field as defined in 802.11ax;

FIG. 7 shows a schematic representation a communication device in accordance with embodiments of the present invention;

FIG. 8 shows a schematic representation of a wireless communication device in accordance with embodiments of the present invention;

FIG. 9a illustrates the impact of embodiments of the present invention on the exemplary situation of FIG. 6 described above for not-yet-associated stations in the process of associating with the AP;

FIG. 9b illustrates an alternative to FIG. 9a;

DETAILED DESCRIPTION

The invention will now be described by means of specific non-limiting exemplary embodiments and by reference to the figures.

Figure 1:
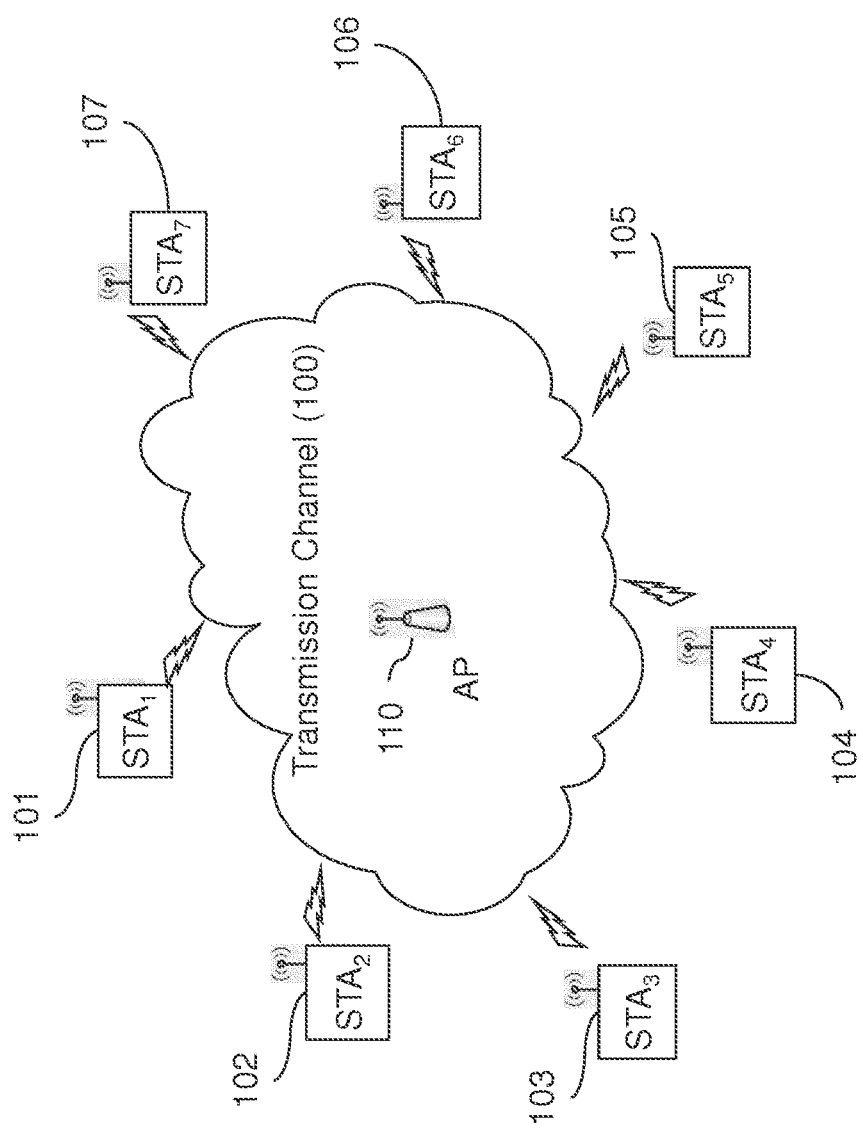
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

While the communication system of FIG. 1 shows a single physical access point 110, the AP 110 may support multiple BSSs (also called set of "virtual APs") and be configured to manage one or more WLANs (or BSSs), i.e. one or more groups of stations. Each BSS has to be uniquely identified by a specific basic service set identification, BSSID.

To achieve this configuration, the physical AP 110 may implement two (or more) virtual APs to manage two (or more) WLANs, for instance: virtual AP 1 VAP-1 (not shown) having MAC address MAC1 as specific BSSID to manage a first WLAN (BSS) with "guest" as SSID, and virtual AP 2 VAP-2 (not shown) having MAC address MAC2 as specific BSSID to manage a second WLAN (BSS) with "Employee" as SSID.

Some stations can register or "associate" with VAP-1 and thus join the first WLAN "guest", while other stations can simultaneously register with VAP-2 and thus join the second WLAN "Employee".

The security for each WLAN can be made different, i.e. WEP and WPA.

An AP device that supports multiple BSSIDs includes two types of virtual APs. The first one is referred to as "transmitted AP" or "representative AP". Its BSSID is referred to as transmitted BSSID. It takes the primary role to transmit Multiple BSSID elements in beacon and probe response frames. For a given physical AP, only one virtual AP is designated as transmitted AP.

The second type of virtual APs is referred to as "non-representative AP" or "non-transmitted AP". Its BSSID is referred to as non-transmitted BSSID. The non-representative APs correspond to other virtual APs which shall not broadcast beacon frames with Multiple BSSID elements. However they may broadcast beacon frames specific to its own BSS, i.e. without Multiple BSSID elements, in order to associate legacy STAs (stations not implementing IEEE 802.11v) with itself.

The same physical device can join two WLANs simultaneously only if it has two separate WLAN interfaces (e.g. Wi-Fi network cards). In that case, the device is considered as two stations in the network, each station being registered with only one WLAN at a time.

For the stations to be aware of available WLANs (or BSSs) and of the information defining them (for instance corresponding SSID or SSIDs, corresponding specific BSSID or BSSIDs, communication mode including Infrastructure or Ad-Hoc, protection security schemes used including Open, WEP, WPA-PSK or 802.1X, support transmission rates used, channel in operation, and any optional Information Elements), the AP sends some control or management frames, including beacon frames and probe response frames which have substantially the same content.

A probe response frame is emitted by the AP to a specific station in response to a probe request frame broadcast by the station. This takes place in an active discovery procedure where the station successively scans the 20 MHz channels and broadcast probe request frames therein. In the active discovery procedure, the station has to periodically remind its effective presence by sending new probe request frames.

On the other hand, a passive discovery procedure has been implemented where the AP voluntarily and periodically (e.g. each 100 ms) broadcasts a beacon frame to declare the WLAN to the stations.

Both beacon frames and probe response frames are used in any version of 802.11, meaning that they are sent at lowest bit rate using a non-HT (high throughput) PPDU (Physical layer (PHY) Protocol Data Unit) format as shown in FIG. 2a.

This format is simple as it contains a preamble made of three fields that can be understood by any station according to any version of 802.11: L-STF (Legacy Short Training Field), L-LTF (Legacy Long Training Field) and L-SIG (Legacy Signal Field) fields; followed by a Data field containing the payload data, here the information defining the WLAN to declare.

The repetition of the probe request/response frames or of the beacon frames preempts a non-negligible part of network bandwidth. This part substantially increases with multiple WLANs that must share the same communication channels, and also with multiple physical APs (possibly some implementing multiple BSSs), since multiple beacons are thus broadcast (one for each active BSS).

As a consequence, the stations have to process beacon frames more frequently and channel occupation due to management frames is increased. Increasing the beacon interval (to be more than 100 ms) so that the beacon frame of each BSS is sent less frequently and the station processing and channel occupation are reduced does not seem fully relevant. This is because the WLANs are less visible/detectable by the stations: some stations may not detect the beacon frame of a given BSS when scanning, and thus conclude a particular BSS (through its SSID) is not available; also stations may decide to emit probe request frames to find their networks, in an active manner, which thus results in having probe response frames broadcast by each neighborhood APs.

The discovery procedure (using beacon frames or probe response frames) may be the initial part of a more general association procedure during which a station registers or associates with an AP to join a corresponding WLAN.

Figure 3:
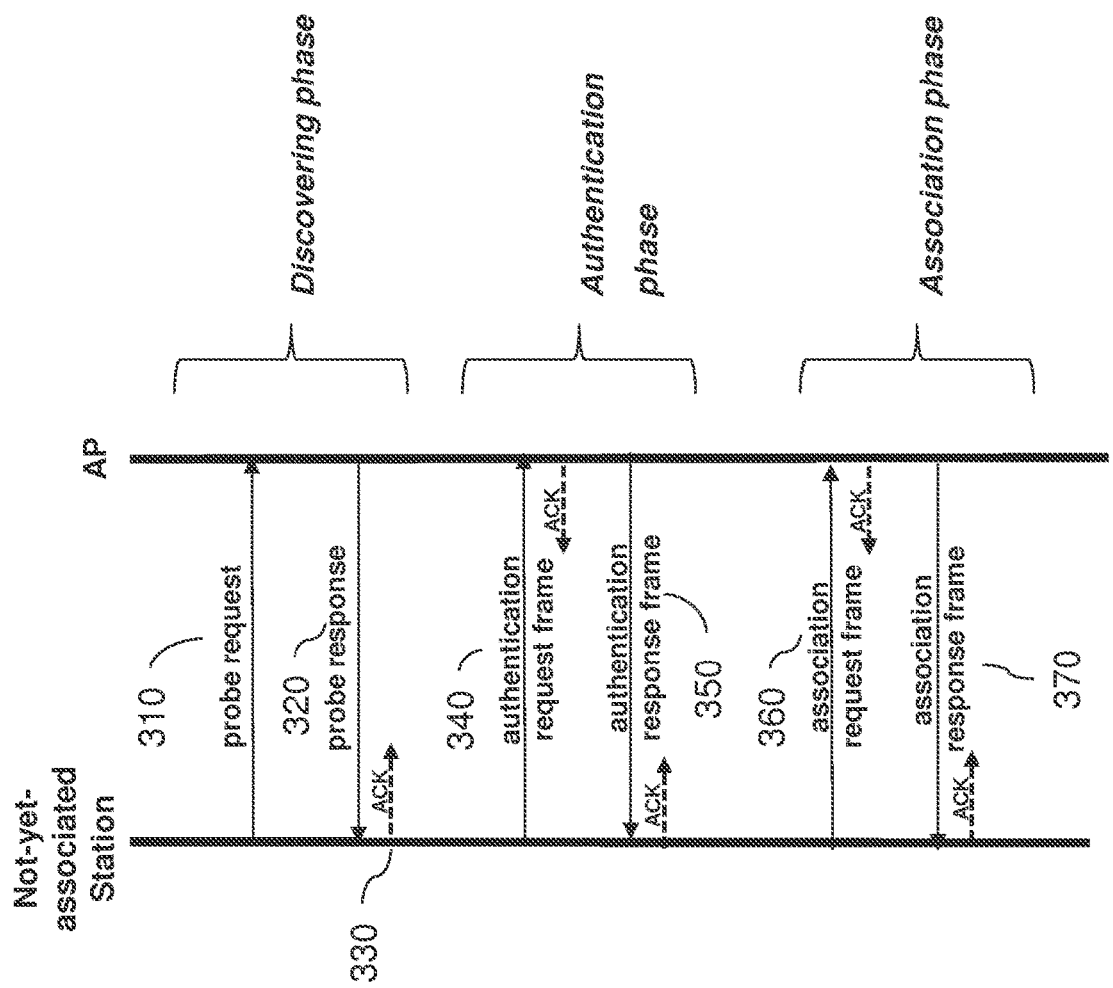
FIG. 3 illustrates an exemplary sequence of management frames allowing a not-yet-associated station to discover and register with a given Access Point.

FIG. 3 illustrates an exemplary sequence of management frames allowing a not-yet-associated station to discover and register/associate with a given Access Point. It comprises three phases: WLAN discovery, authentication and association, at the end of which the station enters into an authenticated and associated state with the AP. Note that the station may be currently associated with a first AP (i.e. belonging to a first WLAN) and willing to join a second WLAN.

802.11 networks make use of a number of options for the first phase of 802.11 probing or discovering. For instance, for an enterprise deployment, the search for a specific network may involve sending a probe request frame out on multiple channels that specifies the network name (SSID) and bit rates.

More generally, prior to association with the AP, the stations gather information about the APs by scanning the channels one by one either through passive scanning (passive discovery procedure introduced above) or active scanning (active discovery procedure introduced above).

In the passive scanning mode, the station scans through successively each 20 MHz channel and waits to listen for beacon frames (declaring SSID) on the scanned channel, regardless of whether the stations has already connected to a specific SSID before or not.

In the active scanning mode, the stations send out probe request frames 310 on each wireless 20 MHz channel. The probe request frames may contain the SSID of a specific WLAN that the station is looking for or the probe request frames may not contain a specific SSID meaning the station is looking for "any" SSID in the vicinity of the station.

In response to receiving a probe request frame, the AP checks whether the station has at least one common supported data rate or not. If there is a compatible data rate, the AP responds with a probe response frame 320, the content of which is similar to a beacon frame: advertising of the SSID (wireless network name), of supported data rates, of encryption types if required, and of other 802.11 capabilities of the AP.

An acknowledgment frame 330 may be sent by the station, in response to receiving the probe response frame 320.

It is also common for a station that is already associated with an AP to send probe request frames regularly onto other wireless channels to maintain an updated list of available WLANs with best signal strengths. Thanks to this list, when the station can no longer maintain a strong connection with the AP, it can roam to another AP with a better signal strength using the second and third phases of the association procedure.

The second phase is the 802.11 authentication once a WLAN to join has been chosen by the station. In particular, the station chooses a compatible WLAN from the probe response frames it receives.

802.11 was originally developed with two authentication mechanisms: the first authentication mechanism, called "open authentication", is fundamentally a NULL authentication where the station says "authenticate me" and the AP responds with "yes". This is the mechanism used in almost all 802.11 deployments; the second authentication mechanism, namely the WEP/WPA/WPA2, is a shared key mechanism that is widely used in home networks or small Wi-Fi deployments and provides security.

During the 802.11 authentication phase, the station sends a low-level 802.11 authentication request frame 340 to the selected AP setting, for instance, the authentication to open and a sequence to 0x0001. The AP receives the authentication request frame 340 and responds to the station with an authentication response frame 350 set to open indicating a sequence of 0x0002.

Note that some 802.11 capabilities allow a station to low-level authenticate to multiple APs without being associated with them (i.e. without belonging to corresponding WLANs). This speeds up the whole association procedure when the station moves between APs. Indeed, while a station can be 802.11 authenticated to multiple APs, it can only be actively associated and transferring data through a single AP at a time.

Next, the station has to perform actual association with the AP from the low level authentication step. This is the next phase of actual 802.11 association by which the station actually joins the WLAN cell. This stage finalizes the security and bit rate options and establishes the data link between the station and the AP. The purpose of this final exchange is for the station to obtain an Association Identifier (AID) to be used to access the medium and send data within the joined WLAN.

Note that the station may have joined a first network and may roam from one AP to another within the physical network. In that case, the association is called a re-association.

Once the station determines which AP (i.e. WLAN) it would like to be associated with, the station sends an association request frame 360 to the selected AP. The association request frame contains chosen encryption types if required and other compatible 802.11 capabilities.

If the elements in the association request frame match the capabilities of the AP, the AP creates an Association ID (AID) for the station and responds with an association response frame 370 with a success message granting network access to the station.

Now the station is successfully associated with the AP, data transfer can begin in the chosen WLAN using the physical medium.

Note that when an AP receives a data frame from a station that is authenticated but not yet associated, the AP responds with a disassociation frame placing the station into an authenticated but unassociated state. It results that the station must re-associate itself with the AP to join the corresponding W LAN.

The probe response frame 320, authentication request/response frames 340 and 350 and association request/response frames 360 and 370 are unicast management frames emitted in an 802.11 legacy format, known as a single user (SU) format. This is a format used for point-to-point communication (here between the AP and the station). Each of these unicast management frames is acknowledged by an ACK frame 330.

As indicated above, all the management frames (310, 320, 340, 350, 360, 370) and the ACK frames (330) use the lowest common rate supported by both the station and the AP (e.g. 24 mbps or less).

Figure 4:
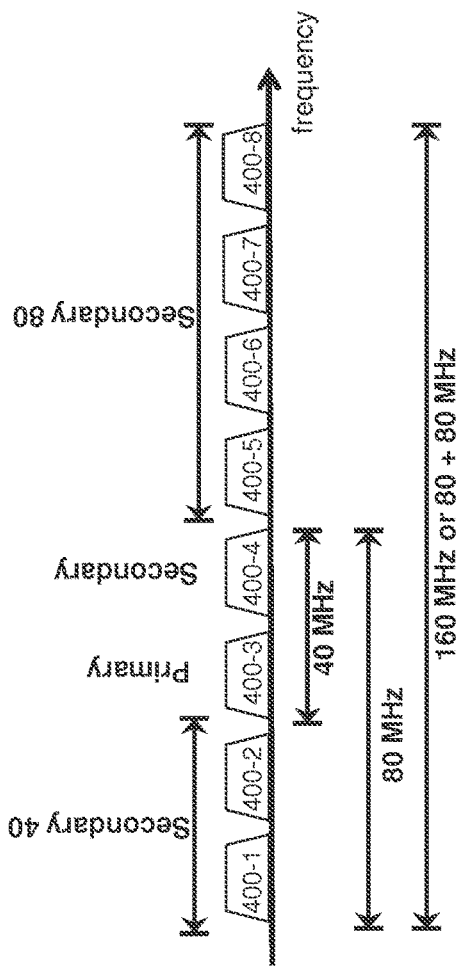
FIG. 4 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac and later versions (802.11ax for instance) implement larger bandwidth transmission through multi-channel operations. FIG. 4 illustrates an 802.11ac channel allocation that supports composite channel bandwidth of 20 MHz, 40 MHz, 80 MHz or 160 MHz.

IEEE 802.11ac introduced support of a restricted number of predefined subsets of 20 MHz channels to form the sole predefined composite channel configurations that are available for reservation by any 802.11 ac (or later) station on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 400-1 to 400-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively. However the present invention may have embodiments with either composition of the channel bandwidth, i.e. including only contiguous channels or formed of non-contiguous channels within the operating band.

A station (including the AP) is granted a transmission opportunity (TxOP) through the enhanced distributed channel access (EDCA) mechanism on the "primary channel" (400-3). Indeed, for each composite channel having a bandwidth, 802.11ac designates one channel as "primary" meaning that it is used for contending for access to the composite channel. The primary 20 MHz channel is common to all stations (STAs) belonging to the same BSS, i.e. managed by or registered with the same local Access Point (AP).

However, to make sure that no other legacy station (i.e. not belonging to the same set) uses the secondary channels, it is provided that the control frames (e.g. RTS frame/CTS frame or trigger frame described below) reserving the composite channel are duplicated over each 20 MHz channel of such composite channel.

Transmissions in such composite channels is made from one station to the other (including the AP) using HE single user (SU) PPDU, the format of which is shown in FIG. 2*b*. It comprises, in addition to the conventional preamble (L-STF, L-LTF, L-SIG) readable by any legacy station, RL-SIG, HE-SIG-A, HE-STF, HE-LTF, Data and PE fields.

The IEEE 802.11 ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to different users in both downlink (DL) and uplink (UL) directions, once a transmission opportunity has been reserved and granted to the AP. In the uplink, multi-user transmissions can be used to mitigate the collision probability by allowing multiple non-AP stations to simultaneously transmit to the AP.

To actually perform such multi-user transmission, it has been proposed to split a granted 20 MHz channel (400-1 to 400-4) into at least one sub-channel, but preferably into a plurality of sub-channels 310 (elementary sub-channels), also referred to as sub-carriers or resource units (RUs) or "traffic channels", that are shared in the frequency domain by multiple users, based for instance on Orthogonal Frequency Division Multiple Access (OFDMA) technique.

This is illustrated with reference to FIG. 5.

The multi-user feature of OFDMA allows the AP to assign different RUs to different stations in order to increase competition within a reserved transmission opportunity TXOP. This may help to reduce contention and collisions inside 802.11 networks.

In this example, each 20 MHz channel (400-1, 400-2, 400-3 or 400-4) is sub-divided in the frequency domain into four OFDMA sub-channels or RUs 510 of size 5 MHz. Of course the number of RUs splitting a 20 MHz channel may be different from four, and the RUs may have different sizes. For instance, between two to nine RUs may be provided (thus each having a size between 10 MHz and about 2 MHz). It is also possible to have a RU width greater than 20 MHz, when included inside a wider composite channel (e.g. 80 MHz).

Regarding the MU downlink transmission (from the AP to the stations), the AP can directly send multiple data to multiple stations in the RUs, by simply providing specific indications within the preamble header of the PPDU sent during the TXOP, and then sending data in the data field. RUs used in the downlink direction are known as downlink RUs, while RUs used in the uplink direction are known as uplink RUs.

FIG. 2*c* illustrates the HE MU (Multi-User) PPDU format (HE-MU) used in 802.11ax for transmissions to one or more stations, in particular for MU downlink transmissions from AP to a plurality of stations.

The HE-MU PPDU includes the same preamble as the non-HT PPDU (FIG. 2*a*) which is always transmitted at low bit rate. This is for all the devices, especially the legacy ones not implementing 802.11ac/ax, to be able to understand the preamble for any of the transmission modes.

Since multiple stations are intended recipients or addressees of the OFDMA downlink transmissions, the AP needs to tell the stations in which resource unit they will find their data. To achieve such signaling, 802.11ax provides the HE-SIG-B field 200 as shown in the Figure in which stations are assigned to RUs.

The SIG-B field 200 is only found in the downlink HE-MU-PPDU and contains two types of fields as shown in FIG. 2*e*: a single Common Block field 220 and one or more User Specific fields 230.

The single Common Block field 220 defines, through an RU allocation field, the RU distribution for the current transmission opportunity (the other fields are of less importance). The format substantially follows the same format as the downlink RU allocation provided in a Trigger Frame as introduced below.

802.11ax defines a set of predefined RU allocation schemes for 20 MHz channels as shown in FIG. 2*f*. The RU allocation field of Common Block field 220 thus references N 8-bit indexes pointing to entries of table of FIG. 2*f*.

Each such entry defines an RU allocation scheme, i.e. how the 20 MHz channel is split into consecutive downlink RUs. The entry gives precisely the position (according to frequency increasing order), the size in terms of tones and the frequency range of each RU inside an MU transmission.

For instance, the first entry (index=00000000) defines nine 26-tone-width downlink RUs at positions #1 to #9. The frequency band of downlink RU at position #i is thus from the $[26*(i-1)+1]^{th}$ tone to the $(26*i)^{th}$ tone of the considered 20 MHz channel. If the AP wants to define a plurality of downlink RUs having this specific distribution, the RU allocation field of Common Block field 220 is set to value 00000000.

The 12$^{th}$ entry (index=00001011) of the table of predefined RU allocation schemes defines for instance a first 52-tone-width downlink RU (position #1), followed by second, third and fourth downlink RUs with a 26-tones width (positions #2, #3 and #4), followed by fifth and sixth downlink RUs with a 52-tones width (position #5 and #6).

The User Specific fields 230 define information related to each downlink RU defined in the Common Block field, and are provided in the same order as the downlink RUs are successively defined in the Common Block field. For instance, the $n^{th}$ declared User Specific field 230 gives information about the $n^{th}$ downlink RU as defined in the Common Block field, i.e. downlink RU at position #n.

Each User Specific field 230 includes the AID of the addressee station ('STA-ID' field; provided by the AP during the association procedure of FIG. 3), and also other information such as modulation and coding schemes, spatial streams, etc., which are of less importance here.

As only a single downlink RU can be allocated to a given station, the signaling that enables a station to decode its data is carried in only one User Specific field (corresponding to the single RU).

Based on the resource distribution provided in the Common Block field and each corresponding User Specific field, a station can easily know which resource unit has been allocated to it and thus in which downlink RU it will receive its data from the AP.

The HE-SIG-B is encoded on a per-20 MHz basis using BCC and is sent on the station's preferred band so that the station's signaling information is sent on the same band as the payload.

Things are different for the MU uplink transmissions, because the AP must control when and how (in which RU) the stations must emit data.

Contrary to the MU downlink transmission, a trigger mechanism has been adopted for the AP to trigger MU uplink communications from various non-AP stations. This is for the AP to have such control on the stations.

To support a MU uplink transmission (during a TXOP pre-empted by the AP), the 802.11ax AP has to provide signalling information for both legacy stations (i.e. non-802.11ax stations) to set their NAV and for 802.11ax stations to determine the Resource Units allocation.

In the following description, the term legacy refers to non-802.11ax stations, meaning 802.11 stations of previous technologies that do not support OFDMA communications.

Figure 5:
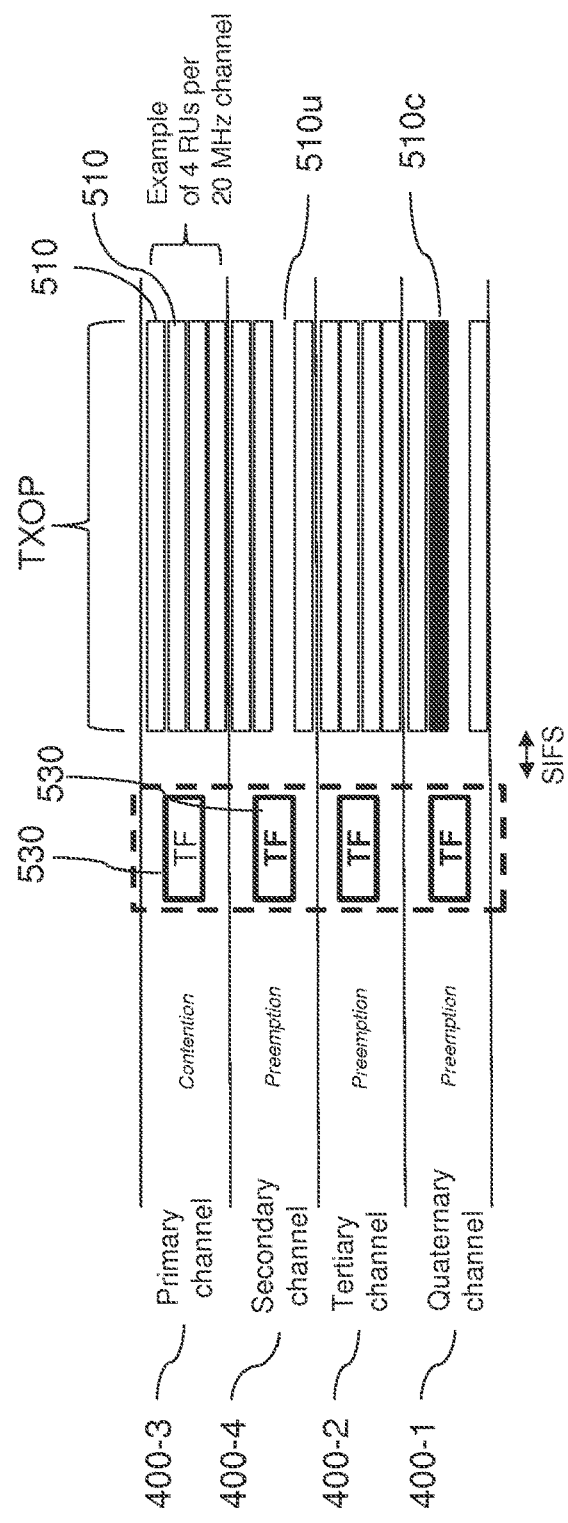
FIG. 5 illustrates an example of 802.11ax uplink OFDMA transmission scheme, wherein the AP issues a Trigger Frame for reserving a transmission opportunity of OFDMA subchannels (resource units) on an 80 MHz channel as known in the art.

As shown in the example of FIG. 5, the AP sends a trigger frame (TF) 530 to the targeted 802.11ax stations to reserve a transmission opportunity. The bandwidth or width of the targeted composite channel for the transmission opportunity is signalled in the TF frame, meaning that the 20, 40, 80 or 160 MHz value is signalled.

The TF frame is a control frame, according to the 802.11 legacy non-HT format shown in FIG. 2a, and is sent over the primary 20 MHz channel and duplicated (replicated) on each other 20 MHz channels forming the targeted composite channel. Due to the duplication of the control frames, it is expected that every nearby legacy station (non-HT or 802.11ac stations) receiving the TF on its primary channel, then sets its NAV to the value specified in the header of the TF frame. This prevents these legacy stations from accessing the channels of the targeted composite channel during the TXOP.

Based on an AP's decision, the trigger frame TF may define a plurality of uplink resource units (RUs) 510. The multi-user feature of OFDMA allows the AP to assign different RUs to different stations in order to increase competition. This may help to reduce contention and collisions inside 802.11 networks.

The information about the RU distribution in the requested transmission opportunity and about the assignment of stations to the uplink RUs is indicated in the payload of the MAC frame carried in the Data field (shown in FIG. 2a). Indeed, the MAC payload is basically empty for classical control frames (such as RTS or CTS frame), but is enhanced with an information structure for Trigger Frames: an RU allocation field defines the allocated uplink RUs (i.e. RU distribution in the TXOP) while one or more User Info fields indicates the information related to each respective uplink RU (in the same order as provided by the RU allocation info field). In particular, the Address field in each User Info field provides the AID of the station to which the corresponding uplink RU is assigned.

These various fields are similar to those (Common Block and User Specific) defined above with reference to FIGS. 2e and 2f.

The trigger frame 530 may define "Scheduled" uplink RUs, which may be reserved by the AP for certain stations in which case no contention for accessing such RUs is needed for these stations. Such scheduled RUs and their corresponding scheduled stations are indicated in the trigger frame (the Address field of the User Info field for the scheduled RU is set to the AID of the station). This explicitly indicates the station that is allowed to use each Scheduled RU. Such transmission mode competes with the conventional EDCA mechanism within the station to access the medium.

If a station finds that there is no User Info field for Scheduled RUs in the Trigger frame 530 carrying its AID in the Address field, then the station should not be allowed to transmit in a Scheduled RU of the TXOP triggered by the TF.

The trigger frame TF 530 may also designate "Random" uplink RUs (also referred to as "Random Access" (RA) RUs), in addition or in replacement of the "Scheduled" RUs. The Random RUs can be randomly accessed by stations. In other words, Random RUs designated or allocated by the AP in the TF may serve as basis for contention between stations willing to access the communication medium for sending data. A collision occurs when two or more stations attempt to transmit at the same time over the same random RU.

Such random RUs are signalled in the TF by using specific reserved AID in the Address field of the User Info field corresponding to the RU. For instance, an AID equal to 0 is used to identify random RUs available for contention by stations associated with the AP emitting the trigger frame (i.e. belonging to the same BSS). On the other hand, an AID equal to 2045 may be used to identify random uplink RUs available for contention by not-yet-associated or "associated" stations (i.e. not belonging to the same BSS as the AP sending the TF 530).

Note that several random RUs with AID=0 and/or with AID=2045 may be provided by the same TF.

A random allocation procedure may be considered for 802.11ax standard based on an additional backoff counter (OFDMA backoff counter, or OBO counter or RU counter) for random RU contention by the 802.11ax non-AP stations, i.e. to allow them performing contention between them to access and send data over a Random RU. The RU backoff counter is distinct from the classical EDCA backoff counters (as defined in 802.11e version). However data transmitted in an accessed OFDMA RUs 510 is assumed to be served from same EDCA traffic queues.

The RU random allocation procedure comprises, for a station of a plurality of 802.11ax stations having a positive RU backoff value (initially drawn inside an RU contention window range), a first step of determining, from a received trigger frame, the sub-channels or RUs of the communication medium available for contention (the so-called "random RUs", either identified by a value 0 for already-associated stations or a value 2045 for unassociated stations), a second step of verifying if the value of the RU backoff value local to the considered station is not greater than the number of detected-as-available random RUs, and then, in case of successful verification, a third step of randomly selecting a RU among the detected-as-available RUs to then send data. In case the second step is not verified, a fourth step (instead of the third) is performed in order to decrement the RU backoff counter by the number of detected-as-available random RUs.

As one can note, a station having no Scheduled RU is not guaranteed to perform OFDMA transmission over a random RU for each TF received. This is because at least the RU backoff counter is decremented upon each reception of a Trigger Frame by the number of proposed Random RUs, thereby deferring data transmission to a subsequent trigger frame (depending of the current value of the RU backoff number and of the number of random RUs offered by each of further received TFs).

Back to FIG. 5, it results from the various possible accesses to the uplink RUs that some of them are not used (510u) because no station with an RU backoff value less than the number of available random RUs has randomly selected one of these random RUs, whereas some other uplink RUs have collided (as example 510c) because at least two of these stations have randomly selected the same random RU. This shows that due to the random determination of random RUs to access, collision may occur over some uplink RUs, while other RUs may remain free.

The Uplink transmission of data by the stations in the RUs 510 is made using HE Trigger-Based PPDUs (HE_Trig) as shown in FIG. 2d in each uplink RU accessed by the stations. Each HE-Trig PPDU carries a single transmission (i.e. from one station to the AP) in response to the trigger frame 530. This HE-Trig PPDU frame format has a format quite similar to the one of HE SU PPDU, except the duration of the HE-STF field is 8 μs.

Once the stations have used the Scheduled and/or Random RUs to transmit data to the AP, the AP responds with a Multi-User acknowledgment (not shown in FIG. 5) to acknowledge the data received on each uplink RU.

FIG. 2g illustrates a typical format of a MAC frame 230 that may be carried in the Data field of the different PPDUs as shown in FIGS. 2a-2d, i.e. either in downlink direction by the AP or in uplink direction by the stations.

The illustrated MAC frame contains 24 octets of MAC header, 0 to 2312 octets of Frame Body 207, and 4 octets of Frame Check Sequence (FCS) 208. The MAC header includes among other fields: a frame control field 201, a duration field 202, a RA (Receiver or Destination Address) field 203 and a TA (Transmitter or Source Address) field 204.

In downlink direction for instance, the RA field 203 is set to the MAC address of the station to be destined (unicast MAC address) or to the broadcast value FF:FF:FF:FF:FF:FF if the MAC frame is destined to all stations (broadcast MAC address). The Frame Body is a field of variable length and e.g. its information may be a frame exchanged during the association process (e.g. as described below with reference to FIG. 6). For example, the MAC frame body 207 may encapsulate management frames sent by the AP during the association procedure (as explained above with reference to FIG. 3). The control field 201 in this case indicates that the MAC frame is a management frame.

In this disclosure a MAC frame and MAC Protocol Data Unit (MPDU) are synonyms and define the unit of data exchanged between MAC entities. An aggregate MAC PDU (A-MPDU) is a structure that contains one or more MPDUs and is transported in PHY Protocol Data Unit (PPDU). An A-MPDU may for example be carried in an HE SU PPDU, an HE MU PPDU or an HE trigger-based PPDU.

Figure 6:
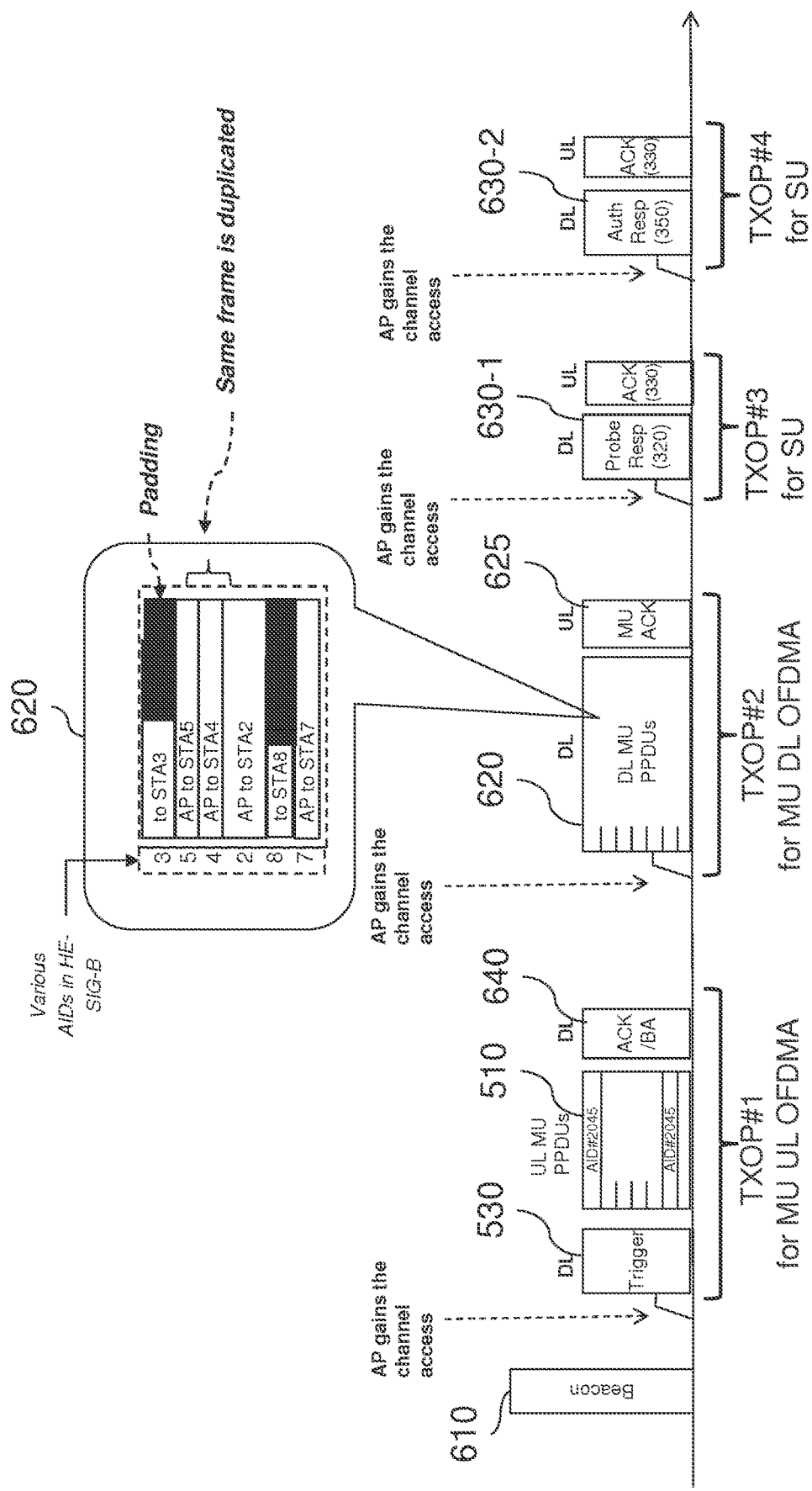
FIG. 6 illustrates, through an exemplary situation of data transmission in a WLAN, drawbacks of the current version of 802.11ax.

FIG. 6 illustrates, through an exemplary situation of data transmission in a WLAN, drawbacks of the current version of 802.11ax.

In this exemplary situation, the wireless network comprising a physical access point 110 and a plurality of associated stations STA2, STA3, STA4, STA5, STA7 and STA8 and a plurality of unassociated 802.11ax stations STA1 and STA6.

The AP 110 emits periodically a beacon frame 610, containing parameters of WLAN/BSS group(s).

All stations (including the AP) contend for an access to the wireless network using conventional EDCA scheme. The contention process (backoff counters) at each station starts or restarts each time the wireless network is detected as idle for a predefined time period (usually DIFS time period after the end of a previous TXOP, for instance after an acknowledgment from the AP or after end of a PPDU transmission).

When accessing to the medium, the AP 110 sends a trigger frame 530 to reserve a MU UL transmission opportunity (TXOP #1) on at least one communication channel of the wireless network. The trigger frame 530 defines resource units for the MU Uplink OFDMA transmission in TXOP #1, including one or more random RUs associated with AID=2045 (i.e. dedicated or reserved or assigned to unassociated stations like STA1 and STA6). This is for the not-yet-associated stations to speed up their association procedure, while reducing medium access and occupancy. In the example, two random RUs with AID=2045 are provided, the other RUs being Scheduled RUs and/or random RUs with AID=0 (i.e. dedicated or reserved or assigned to already-associated stations like STA2, STA3, STA4, STA5, STA7 and STA8).

In response to the TF 530, the AP receives data on the uplink RUs 510 from one or more stations during the MU Uplink OFDMA transmission time. This includes data transmitted over Scheduled RUs but also over Random RUs.

In particular, the AP may receive request management frames (e.g. 310, 340, 360) from not-yet-associated 802.11ax stations such as STA1 and STA6, over the Random RUs with AID=2045.

Upon receiving the data and management frames over the uplink RUs 510 forming the MU Uplink OFDMA transmission, the AP 110 responds with a Multi-STA BlockAck Frame 640 using a HE SU PPDU (having a "receiving address" RA field of the encapsulated MAC frame set with a broadcast address). Note that the AP acknowledges receipt to each sending station by providing, in the Multi-STA BlockAck Frame, the AID of the sending station for which data have been correctly received. As no AID has been associated with each not-yet-associated station, the Multi-STA BlockAck Frame is modified to receive the MAC address of each not-yet-associated station for which the requested management frame has been correctly received.

Next to TXOP #1, the AP 110 may again gain access to the medium for a new TXOP, referred to as TXOP #2, to perform a MU Downlink OFDMA transmission 620.

Several issues arise from this exemplary scenario, which are solved by several embodiments described below.

FIG. 7 schematically illustrates a communication device 700, either a non-AP station 101-107 or the access point 110, of the radio network 100, configured to implement at least one embodiment of the present invention. The communication device 700 may preferably be a device such as a micro-computer, a workstation or a light portable device. The communication device 700 comprises a communication bus 713 to which there are preferably connected:

a central processing unit 711, such as a microprocessor, denoted CPU;

a read only memory 707, denoted ROM, for storing computer programs for implementing the invention;

a random access memory 712, denoted RAM, for storing the executable code of methods according to embodiments of the invention as well as the registers adapted to record variables and parameters necessary for implementing methods according to embodiments of the invention; and at least one communication interface 702 connected to the radio communication network 100 over which digital data packets or frames or control frames are transmitted, for example a wireless communication network according to the 802.11ax protocol. The frames are written from a FIFO sending memory in RAM 712 to the network interface for transmission or are read from the network interface for reception and writing into a FIFO receiving memory in RAM 712 under the control of a software application running in the CPU 711.

Optionally, communication device 700 may also include the following components:

a data storage means 704 such as a hard disk, for storing computer programs for implementing methods according to one or more embodiments of the invention;

a disk drive 705 for a disk 706, the disk drive being adapted to read data from the disk 706 or to write data onto said disk;

a screen 709 for displaying decoded data and/or serving as a graphical interface with the user, by means of a keyboard 710 or any other pointing means.

The communication device 700 may be optionally connected to various peripherals, such as for example a digital camera 708, each being connected to an input/output card (not shown) so as to supply data to the communication device 700.

Preferably the communication bus provides communication and interoperability between the various elements included in the communication device 700 or connected to it. The representation of the bus is not limiting and in particular the central processing unit is operable to communicate instructions to any element of the communication device 700 directly or by means of another element of the communication device 700.

The disk 706 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 707, on the hard disk 704 or on a removable digital medium such as for example a disk 706 as described previously. According to an optional variant, the executable code of the programs can be received by means of the communication network 703, via the interface 702, in order to be stored in one of the storage means of the communication device 700, such as the hard disk 704, before being executed.

The central processing unit 711 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 704 or in the read only memory 707, are transferred into the random access memory 712, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

FIG. 8 is a block diagram schematically illustrating the architecture of the communication device 700, either the AP 110 or one of stations 101-107, adapted to carry out, at least partially, the invention. As illustrated, device 700 comprises a physical (PHY) layer block 803, a MAC layer block 802, and an application layer block 801.

The PHY layer block 803 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 530 (FIG. 5) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 802 preferably comprises a MAC 802.11 layer 804 implementing conventional 802.11ax MAC operations. The MAC layer block 802 may optionally be implemented in software, which software is loaded into RAM 712 and executed by CPU 711.

The device 700 further comprises an additional block 805 implementing the part of embodiments of the invention (either from station perspective or from AP perspective). The additional block 805 may be implemented at the MAC layer block 802 and/or the physical layer block 803, and thus may interact with both blocks. In one implementation, the additional block 805 receives formed MAC frames for encapsulation in MU DL frames.

MAC 802.11 layer 804, additional block 805 and PHY layer block 803 interact one with the other in order to process accurately communications over OFDMA according to embodiments of the invention.

On top of the Figure, application layer block 801 runs an application that generates and receives data packets, for example data packets of a video stream. Application layer block 801 represents all the stack layers above MAC layer according to ISO standardization.

Back to the several issues arisen from the scenario of FIG. 6, the RUs provided for the MU Downlink OFDMA transmission are assigned to specific stations using their AID. In the example shown, the RUs are successively assigned to STA3, STA5, STA4, STA2, STA8 and STAT.

For some stations, here STA3 and ST8, the amount of data to transmit is small regarding the size of the reserved RU. As a consequence, padding data (black portions) are added by the AP 110 to keep sufficient activity on the 20 MHz channel (for detection by legacy nodes in order to avoid unexpected access). The black portions of the RUs shown in the Figure illustrate how the padding wastes bandwidth of the network.

The AP 110 may also have received a multicast MAC frame from another network or from upper OSI layer, to be addressed to a plurality of addressee stations, here STA4 and STA5.

Multicast addressing can be used in the link layer, such as Ethernet multicast, and at the Internet layer (as example, IP protocol includes the addresses from 224.0.0.0 to 239.255.255.255 as a multicast range).

As 802.11ax does not provide any mechanism to allow multicast traffic in a MU Downlink OFDMA transmission, the AP has to duplicate the MAC frame into two HE-MU PPDUs to be transmitted over two separate RUs as shown in the Figure for the RUs assigned to STA5 and STA4. This also wastes bandwidth, in particular because of the costs of signalling two separate RUs.

Acknowledgment of the data frames sent during the MU Downlink OFDMA transmission may be performed by the receiving stations STA2-5 and STA7-8 during an MU ACK period 625 belonging to the same TXOP #2. MU ACK period 625 is for instance a subsequent MU Uplink OFDMA transmission immediately following the MU Downlink OFDMA transmission.

As such, MU ACK period 625 is made of a plurality of scheduled RUs (here below named "response" or "acknowledgement" or "ack" RU) which are defined in a dedicated MAC header portion of frames conveyed in the preceding MU Downlink OFDMA transmission.

The response RU to be used by each one of receiving stations STA2-5 and STA7-8 in MU ACK period 625 for frame acknowledgment is identified in response resource unit information provided by the AP in the sent data frames of the MU Downlink OFDMA transmission. Thanks to this identification, the response RUs are (indirectly) assigned to stations. The response RUs are thus scheduled RUs. Usually, the response RU is the same (i.e. same RU position) as the one used during MU Downlink OFDMA transmission.

The response resource unit information is signalled in a so-called Uplink Multi-user Response Scheduling (or UMRS) control subfield within one (or more) of the data frames addressed to the receiving station.

The UMRS subfield is defined in the 802.11ax, version 2.0, standard as described now with reference to FIGS. 2h to 2j.

FIG. 2h illustrates a MAC header of a MAC frame within an HE Multi-user PPDU conveyed over a MU DL transmission 620. The MAC frame (and thus MAC header) is conveyed in the Data field of an HE MU PPDU (see FIG. 2c).

As known, the MAC header includes a field "Address_1" 210 containing the Receive Address (RA) of the MAC frame, that is to say the MAC address of the addressee station to which the MPDU is addressed. In a particular case, the MAC address may be a broadcast address (e.g. FF:FF:FF:FF:FF:FF). This MAC header also includes an HT Control field 250. The latter can take several configurations depending on the 802.11 standard considered. The HE variant configuration corresponds to 802.11ax standard, in which case the HE variant HT Control field comprises an A-Control subfield 260 (standing for Aggregated Control fields) shown in FIG. 2i.

The A-Control subfield 260 aggregates several control fields, which is a sequence of one or more Control subfields 261. The length of the A-Control subfield 260 is equal to 30 bits. Each Control subfield 261 is composed of a Control ID 262 subfield indicating the type of information carried in the Control Information subfield 263 that follows. Padding bits are added to reach a 30-bit A-Control subfield if necessary.

Various type of information may thus be provided through the A-Control subfield 260. For instance, operating mode may be indicated in Control Information subfield 263 when Control ID 262 is 1. Also, power data may be indicated in Control Information subfield 263 when Control ID 262 is 4.

When Control ID 262 is 0, Control Information subfield 263 is an UL MU response scheduling (UMRS) information or Control subfield 264. A representation of the UMRS information 264 is shown in FIG. 2j. It comprises various subfields over 26 bits.

One of them is the 8-bit RU Allocation subfield 265. It indicates which response RU of MU Ack 625 to be used by the addressee station receiving the corresponding HE Multi-user MPDU to provide a response (HE Triggered-based PPDU, as shown in FIG. 2d) to the data frames to the access point.

The format of RU Allocation subfield 265 substantially follows the same format as the RU Allocation subfield provided in Common Block 220 of HE-SIG-B field 200 or the RU Allocation subfield provided in a Trigger Frame as introduced above.

One can note the UMRS information 264 does not need a subfield to indicate the AID of the station intended to emit the response, as this station is the addressee station receiving the HE DL MU frame containing the UMRS information 264 (i.e. the station to which the RU has been assigned).

If no valid UMRS information 264 is found, the addressee station shall not respond to the access point.

Usually, only one MPDU sent by the AP over the same RU includes the UMRS information 264. Of course, several MPDUs can include such information, in which case the UMRS Control fields 264 within MPDUs carried in an A-MPDU have the same value, i.e. all the occurrences of the UMRS information have the same value: The UMRS Control fields within MPDUs carried in an A-MPDU have the same value. This is to avoid conflict when determining the response RU to be used.

Back to FIG. 6, as the AP must assign an AID to a downlink RU of the MU Downlink OFDMA transmission, the AP cannot use the MU Downlink OFDMA transmission to provide response management frames (e.g. 320, 350, 370) to the unassociated stations, here STA1 and STA6. In the current version of 802.11ax, the MU Downlink OFDMA transmission is restricted to already-associated stations. It means that the response management frames (from the AP to the stations) are still to be conveyed using the legacy single user (SU) mode: for instance, the AP 110 waits until accessing again the medium for a new TXOP (here TXOP #3), during which the AP 110 sends for instance a probe response frame 320 to STA1 using an HE SU PPDU 630-1; and waits again until accessing again the medium for another TXOP (here TXOP #4), during which the AP 110 sends for instance an authentication response frame 350 to STA6 using an HE SU PPDU 630-2. In all cases, an acknowledgment ACK 330 may be received from the addressee station.

The need to use HE SU PPDUs for handling the response management frames is not satisfactory: on one hand, it introduces delays in the network management because the AP 110 has to contend for new accesses to the network; on the other hand, it inefficiently uses the medium for a long time, given the few data to be transmitted, because the HE SU PPDUs are send at low bit rate.

These various drawbacks of the current version of 802.11ax (illustrated through an exemplary situation of exchange of management frames, but which may concern any other type of frames) show that a more efficient usage of the MU Downlink transmission is sought.

A first approach to solve part of these drawbacks is introduced below and described with exemplary detailed embodiments with reference to FIGS. 9a-d to 12a-b.

Other approaches, based on aggregation, that also solve part of these drawbacks are introduced further below and described with exemplary detailed embodiments with reference to FIGS. 13*a-b* to 16.

According to the first approach, the inventors have contemplated allowing downlink RUs in the MU Downlink transmission to be addressed (assigned) to stations without using AIDs, for instance to stations deprived of AIDs such as unassociated stations.

A first novel idea relies on using a specific AID which has not been associated with a specific station when registering/associating, for instance an association identifier reserved for stations not associated with the access point such as AID=2045.

Thus, an AP willing to address stations having no AID may provide a plurality of downlink resource units in a multi-user downlink transmission from the access point within a transmission opportunity granted to the access point, wherein the plurality of downlink resource units comprises a downlink resource unit assigned to an association identifier not associated with a specific station (e.g. reserved for stations not associated with the access point). Next, the AP may send a frame to a station on such a downlink resource unit reserved for stations not associated with the access point.

It makes it possible for the addressee station or stations to simply determine a downlink resource unit assigned to an association identifier not associated with a specific station (e.g. reserved for stations not associated with the access point such as AID=2045), from a plurality of downlink resource units comprised in a multi-user downlink transmission from the access point within a transmission opportunity granted to the access point. Next, the station may receive a frame from the access point on the determined downlink resource unit.

A second novel idea relies on a matching in terms of RU profile between an uplink RU already used by a station in the MU Uplink transmission and a downlink RU the AP will use in the MU Downlink transmission to provide a frame to the same station.

Thus, when the station sends (or conversely the AP received) a frame (e.g. a request management frame of a not-yet-associated station) to the access point using an uplink resource unit of a plurality of uplink resource units provided in a multi-user uplink transmission towards the access point within a transmission opportunity granted to the access point, wherein the plurality of uplink resource units are distributed according to an allocation scheme (e.g. frequency-distributed), the AP may build a plurality of downlink resource units comprised in a multi-user downlink transmission from the access point within the same or a next transmission opportunity granted to the access point, the plurality of downlink resource units comprising a downlink resource unit having at least one matching allocation scheme feature with the uplink resource unit, and then send a frame (e.g. a response management frame) to the station on the downlink resource unit.

In this context, the station only has to determine the downlink resource unit, based on the allocation scheme feature of the uplink resource unit it has used, and then receives the frame from the access point on the determined downlink resource unit.

In embodiments, such determination by the station may depend on the number of downlink resource units assigned to the association identifier not associated with a specific station (e.g. reserved for stations not associated with the access point), in the multi-user downlink transmission. This is to provide the ability for the stations to switch between two behaviors.

For example, if only one downlink RU with a predefined identifier reserved for unassociated stations (e.g. AID=2045) is contained in a MU downlink transmission, each unassociated station may be considered as recipient of the downlink RU, i.e. the downlink RU may potentially contain a frame addressed to that station. For instance, the downlink RU may contain a frame for one of the unassociated stations or contain a broadcast frame for all unassociated stations. In this behaviour, the allocation scheme of the MU uplink transmission is not taken into account.

Each recipient station may check the RA field (receiver or destination address) of the (MAC) frame(s) contained in that downlink RU in order to keep ("receive") only that(those) for which the station is the addressee.

On the other hand, if more than one downlink RU with a predefined identifier reserved for unassociated stations (e.g. AID=2045) is contained in a MU downlink transmission, an unassociated station has to determine its assigned downlink resource unit, if any, based on the allocation scheme feature of the uplink resource unit it has used. If such downlink RU matching the allocation scheme feature is found, the unassociated station receives the frame from the access point on that determined downlink resource unit.

In that case, each downlink RU has only one recipient station. Thus, the unassociated station may optionally check the RA field of the (MAC) frame(s) contained in that downlink RU to confirm that the frames are indeed addressed to it.

Even when implementing the checking step, the unassociated station takes benefit from the uplink signalling to determine which downlink RU to decode. Advantageously, in either cases (one downlink RU or a plurality of downlink RUs not assigned to a specific station), each unassociated station does not have to decode more than one downlink RU.

Thus, an unassociated non-AP station that receives a MU DL frame (e.g. an HE MU PPDU) containing RUs with the STA-ID equal to 2045, shall be considered as the recipient of a RU with the STA-ID equal to 2045 if one of the following conditions occurs:

There is only one RU with the STA-ID equal to 2045 in the MU DL frame; and

The STA has previously sent a management request frame in response to a Trigger frame containing Random Access-RU(s) with AID set to 2045, and the RU with STA-ID equal to 2045 has the same RU allocation as the RU allocation of the RA RU carrying the request in the previously sent MU UL frame (e.g. an HE TB PPDU according to 802.11ax).

Note that a MU DL RU with AID=2045 may also be referred to as a "broadcast RU". With this naming, a broadcast RU may contain a unicast MAC frame (RA field corresponding to a unicast MAC address) or a broadcast MAC frame (RA field corresponding to a broadcast MAC address).

Note also that providing multiple RUs with the STA-ID equal to 2045 in an HE MU PPDU may be viewed as an exception to a general requirement of not having more than one downlink RU addressed to an associated STA. In other words, if the list of STAs that are recipients of the transmitted HE MU PPDU are represented by an array STA_ID_LIST, a STA_ID_LIST element with a particular (AID) value shall not appear more than once in the array except if:

the value identifies an unallocated RU (e.g. 2046); or the value is 2045, which identifies a broadcast RU destined to an unassociated STA.

Figure 9C:
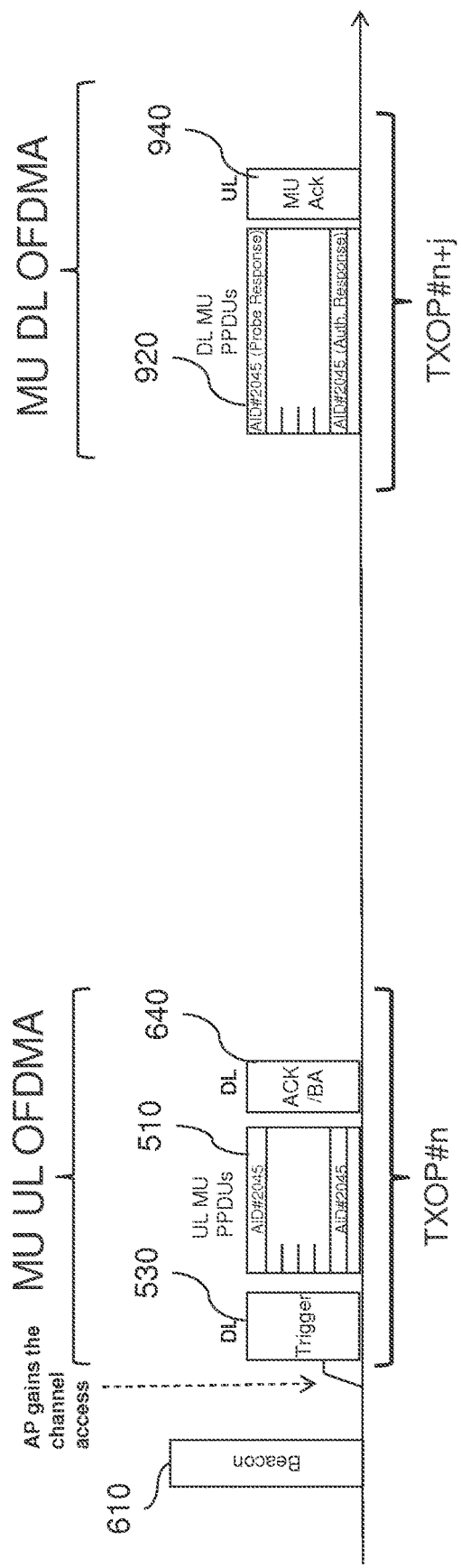
FIG. 9c illustrates another alternative to FIGS. 9a and 9b.
Figure 9D:
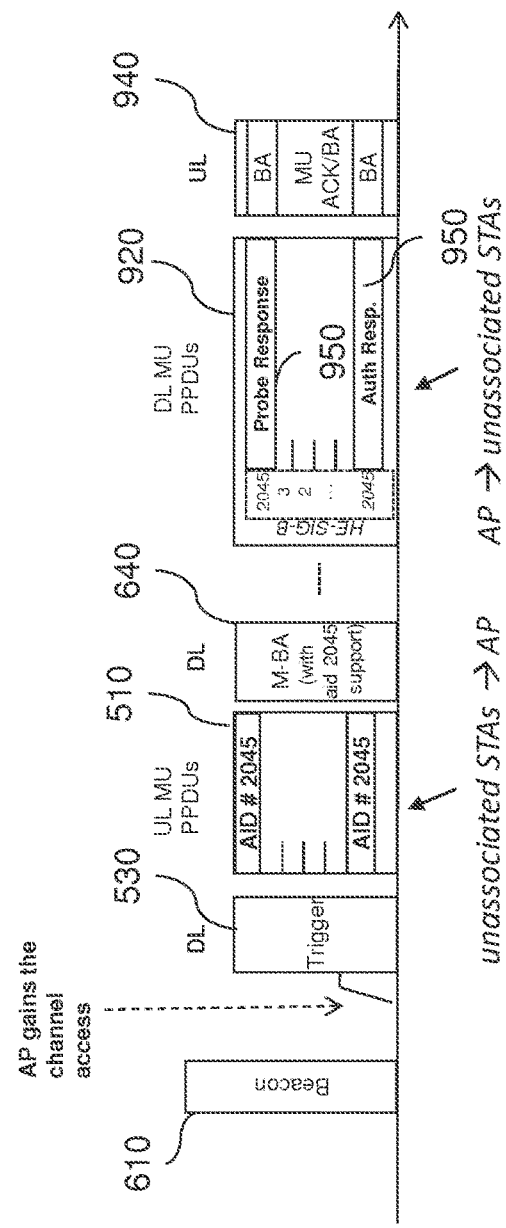
FIG. 9d illustrates a general embodiment in which a plurality of downlink resource units are allocated to multiple unassociated stations.
Figure 12A:
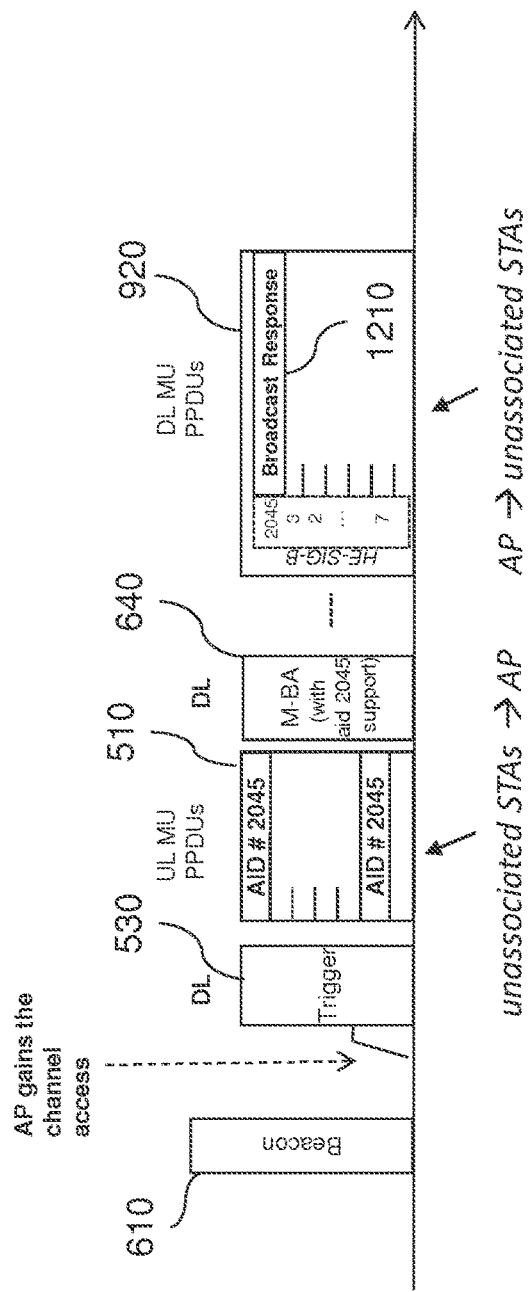
FIGS. 12a and 12b illustrate, through two exemplary situations of data transmission in a WLAN, embodiments of the invention in which one MU Downlink resource unit is used by the AP to send data to unassociated stations.
Figure 12B:
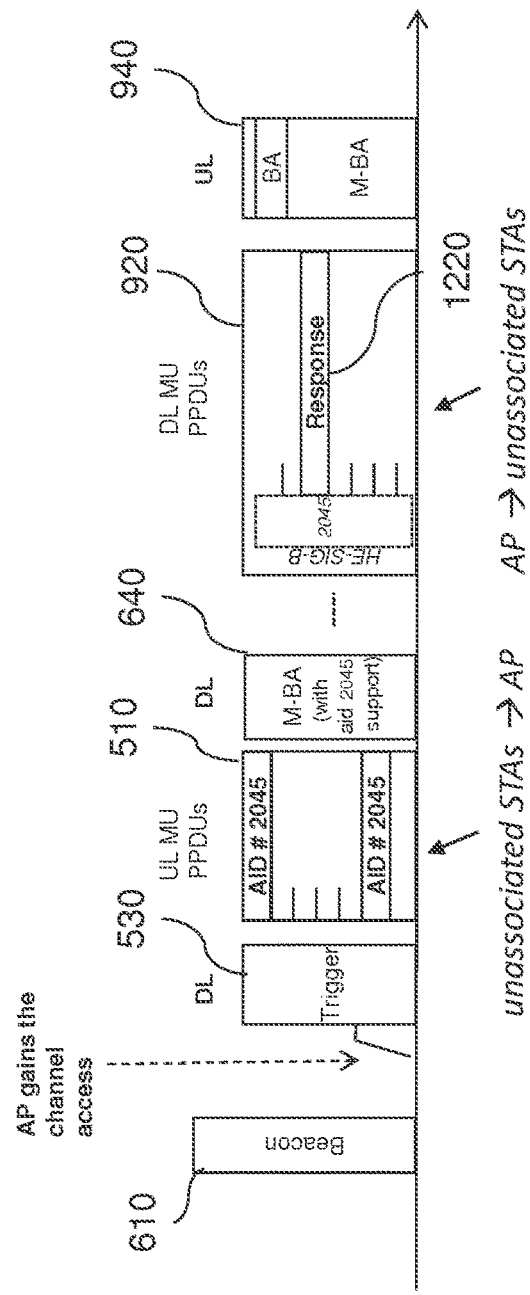

According to embodiments, and from the AP perspective, the AP sends to an unassociated STA an association response frame in a broadcast RU (e.g. with AID=2045) considering the following constraints:

multiple broadcast RUs (AID=2045) may be inserted in a HE MU PPDU;

if only one broadcast RU (AID=2045) is inserted in a HE MU PPDU, the broadcast RU can be addressed to one or all unassociated STAs;

if multiple broadcast RUs (AID=2045) are inserted in a HE MU PPDU, each broadcast RU is addressed to only one unassociated STA;

to send an association response frame to an unassociated STA;

the AP may use the same RU allocation for the broadcast RU (AID=2045) as the RU allocation of the RA RU (AID=2045) used by the unassociated STA to send the corresponding association request frame (cf. FIG. 9d);

the AP may use a single broadcast RU (AID=2045) embedding a broadcast MAC frame to broadcast an association response frame to all unassociated STAs (cf. FIG. 12a); or the AP may use a single broadcast RU (AID=2045) embedding a unicast MAC frame addressed to the unassociated STA (cf. FIG. 12b).

A broadcast RU containing a unicast MAC frame addressed to an unassociated station may include an information item identifying an uplink resource unit to be used by the unassociated station in a multi-user uplink transmission opportunity following the multi-user downlink transmission opportunity to provide an acknowledgement to the access point. The UMRS control field as defined in draft 2.1 of standard IEEE 802.11ax may be used to indicate which UL RU must be used by the unassociated STA to acknowledge the MPDU.

It results from these ideas that MU Downlink transmission can be efficiently extended to unassociated stations, and more generally to any stations without using an AID assigned to a specific station. Preferably an AID reserved for stations not associated with the access point is used.

MU Downlink transmission is thus significantly improved compared to known current 802.11ax requirements.

For these novel ideas, the additional block 805 may act as an RU profile management module for controlling usage of Downlink OFDMA resource units (sub-channels).

For instance and not exhaustively, the operations for the AP may include determining an uplink RU used by a station in MU Uplink transmission for which no AID is available (e.g. an AID reserved for unassociated stations), storing RU allocation scheme features related to the used uplink RU, building an MU Downlink transmission with downlink RUs including a downlink RU that matches the stored RU allocation scheme features and sending a response to the station within such matching downlink RU. The operations for a station different from the AP may include keeping track of RU allocation scheme features of an uplink RU used to transmit data (e.g. request) to the AP in MU Uplink transmission, determining a downlink RU in MU Downlink transmission that matches the RU allocation scheme features of the RU used in order to read the response provided by the AP on this matching downlink RU.

In that case, MAC 802.11 layer 804, RU Profile management module 805 and PHY layer block 803 interact one with the other in order to process accurately communications over Downlink OFDMA RU addressed to a station without using an AID associated with said station.

Embodiments of these ideas are now illustrated using various exemplary embodiments in the context of IEEE 802.11ax by considering OFDMA RUs.

Although the proposed examples are also mainly described with reference to the management frames of the 802.11 association process, the first approach is not limited to such management frame transmission but may apply to any 802.11 data or control frame.

FIG. 9a illustrates the impact of some embodiments of the first approach on the exemplary situation of FIG. 6 described above for not-yet-associated stations STA1 and STA6 in the process of associating with the AP.

The AP 110 is granted TXOP #1 and sends the same trigger frame 530 as in FIG. 6 to reserve a MU UL transmission opportunity. This trigger frame 530 defines at least one random RU with AID=2045 (here two such random RUs). Not-yet-associated stations STA1 and STA6 send request management frames to the AP in the random RUs 510 with AID=2045 (the other RUs are used by other stations).

The AP acknowledges the received frames using a Multi-STA BlockAck frame 640.

During this sequence, both AP and stations perform specific operations in order to save one or more allocation scheme features that define the uplink RUs used by STA1 and STA6.

This includes one or more of the following information: a position of the uplink resource unit in the allocation scheme used (i.e. in the corresponding entry of FIG. 2f); a frequency band of the uplink resource unit in the allocation scheme used (i.e. which tones in the 20 MHz channel according to the corresponding entry of FIG. 2f); a size of the uplink resource unit in the allocation scheme used (i.e. in the number of tones as shown in the corresponding entry of FIG. 2f).

Figure 10B:
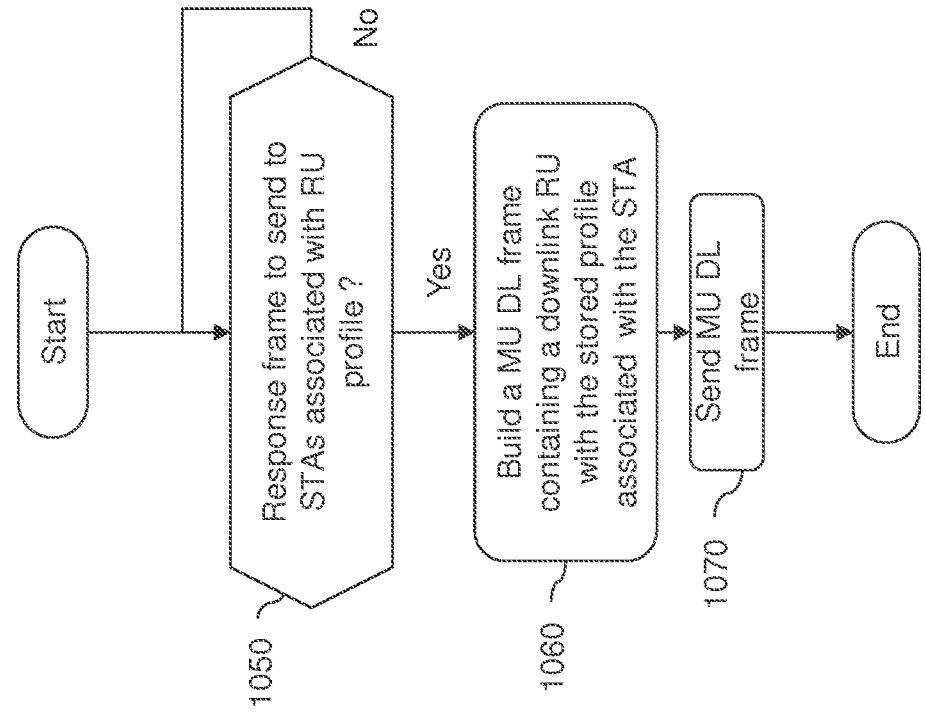
FIGS. 10b and 10c illustrate, using flow charts, main steps at the access point in relation with an MU Downlink transmission it triggers when implementing embodiments of the present invention.
Figure 10A:
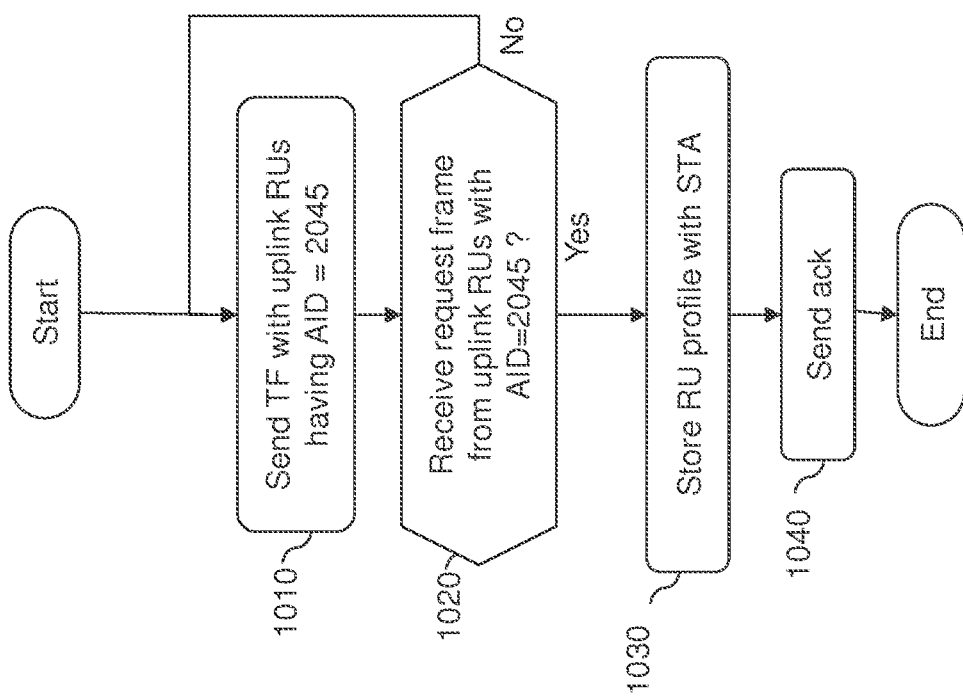
FIG. 10a illustrates, using a flow chart, main steps at the access point in relation with an MU Uplink transmission it triggers, implementing teachings of the present invention.

For instance, FIG. 10a illustrates, using a flow chart, main steps at the AP in relation with an MU Uplink transmission it triggers.

At step 1010, the MU Uplink transmission is initiated with trigger frame 530.

If the AP receives a frame from a not-yet-associated station on a random RU with AID=2045 (test 1020), the AP stores the RU profile, i.e. relevant allocation scheme features, of the uplink RUs used and associates each of them with the transmitted not-yet-associated station, at step 1030. The frame is for example a request management frame.

For instance, the AP may store the MAC address of the not-yet-associated station (which is obtained in the request management frame received) together with the 8-bit index corresponding to the allocation scheme used (FIG. 2f) and the position of the uplink RU used from amongst the list defined by the allocation scheme used. These three items of information make it possible for the AP to retrieve any of the above-mentioned allocation scheme features.

In case of negative test 1020, the algorithm loops back to step 1010, waiting for the transmission of a new trigger frame.

Next to step 1030, the AP sends, at step 1040, acknowledgments to the transmitting stations, including the not-yet-associated stations having sent e.g. request management frames.

Figure 11B:
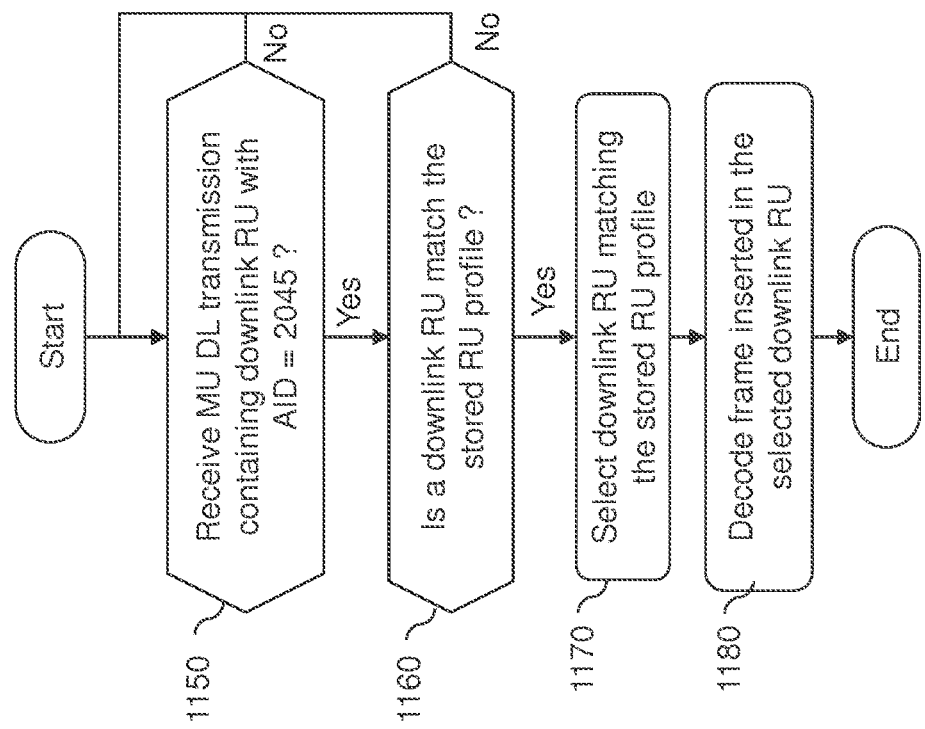
FIGS. 11b and 11c illustrate, using flow charts, main steps at an unassociated station in relation with an MU Downlink transmission triggered by an access point according to embodiments of the invention.
Figure 11A:
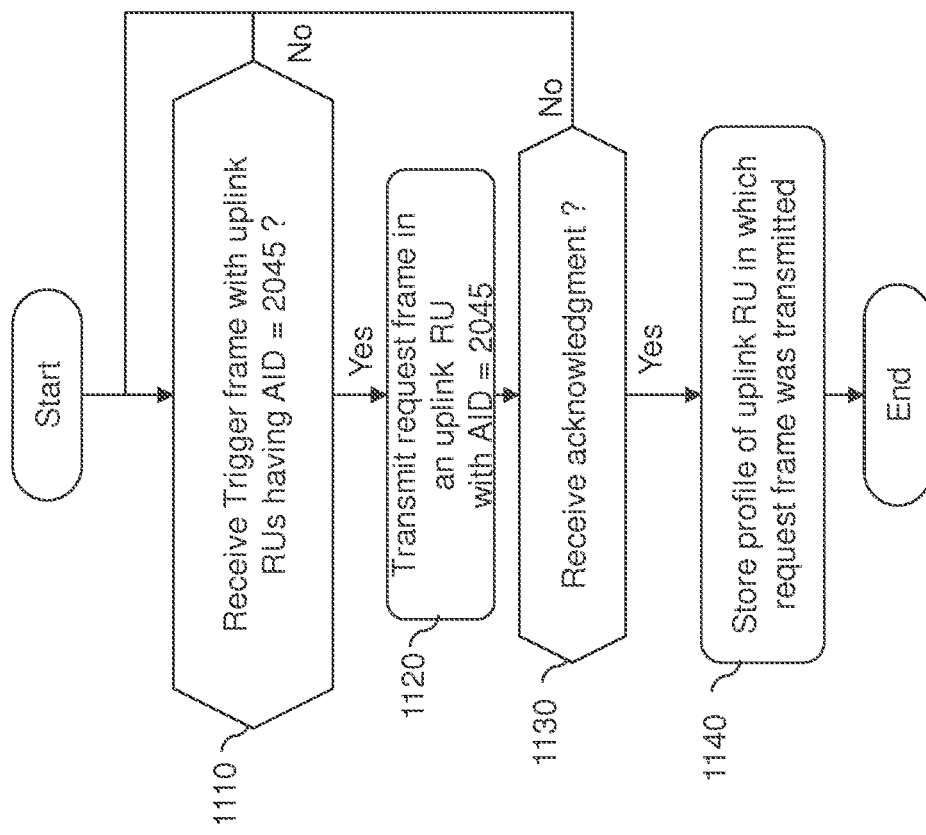
FIG. 11a illustrates, using a flow chart, main steps at an unassociated station in relation with an MU Uplink transmission triggered by an access point.

Correspondingly, FIG. 11a illustrates, using a flow chart, main steps at a not-yet-associated station in relation with an MU Uplink transmission triggered by the AP.

The process starts at step 1110 where the not-yet-associated station detects a trigger frame 530 sent by the AP, that includes one or more random RUs with AID=2045.

In that case, the not-yet-associated station willing to register/associate with the AP contends for access to such a random RUs with AID=2045. When such a random RU is granted to the not-yet-associated station, the latter transmits a request frame such as a request management frame (310, 340, 360 depending on which phase of the association procedure the station is entering) in the accessed random RU 510 with AID=2045. This is step 1120.

If an acknowledgment is received from the AP (test 1130) meaning that the AP will respond to the request in the future, the not-yet-associated station stores the RU profile, i.e. relevant allocation scheme features, of the random RUs used. This is step 1140.

For instance, the not-yet-associated station may store the 8-bit index corresponding to the allocation scheme used (FIG. 2*f*) and the position of the uplink RU used from amongst the list defined by the allocation scheme used.

Turning back to FIG. 9*a*, the AP initiates a MU Downlink transmission in the same TXOP #1. This is possible thanks to the cascading option provided by 802.11ax (the AP may enable a cascading field in the header of trigger frame 530 in order to warn the stations that it will cascade several MU transmissions, either Downlink or Uplink, during the granted TXOP). Alternatively, after the Multi-STA Block-Ack frame 640, the AP may preempt the medium by waiting less than the DIFS period (the other station will thus no have time to start decrementing their backoff counter to contend for access to the medium).

In this example, the AP will respond to the received frames, e.g. request management frames, during the MU Downlink transmission using the teachings of embodiments.

To do so, the AP builds the MU Downlink transmission with a particular RU allocation profile that takes into account the stored RU profiles of the uplink RUs (with AID=2045) used by STA1 and STA6. In particular, the AP provides, in the MU Downlink transmission, a first downlink RU with AID=2045 having the same allocation scheme feature (for instance same position) as the uplink RU used by STA1, and a second downlink RU with AID=2045 having the same allocation scheme feature as the uplink RU used by STA6.

It means that the various resource units for the not-yet-associated stations in both MU Downlink and Uplink transmissions, are signalled using the same predefined association identifier not associated with any particular station, in particular reserved for unassociated stations, here AID=2045.

In the example of the Figure, STA1 has transmitted its probe request frame 310 in the uplink RU at position #1 during the MU Uplink transmission 510. In that case, the AP builds the MU Downlink transmission with a downlink RU at position #1 which also has AID=2045.

Similarly, STA6 has transmitted its authentication request frame 340 in the uplink RU at position #6 during the MU Uplink transmission 510. In that case, the AP builds the MU Downlink transmission with a downlink RU at position #6 which also has AID=2045.

Of course, another allocation scheme feature than the uplink RU position can be used, as introduced above.

Thanks to this approach, not-yet-associated stations STA1 and STA6 knows that the first and sixth resource units in the MU Downlink transmission are destined to them, provided they are assigned to AID=2045. It means that, in this embodiment, two criteria are combined for the not-yet-associated station to identify a downlink RU addressed to it: first, the downlink RU may be assigned with AID=2045; second, the relevant allocation scheme features must match with the uplink RU used in the MU Uplink transmission when sending a previous frame, e.g. the request management frame.

The AP 110 thus sends the responses to the not-yet-stations using the downlink RUs 920 with AID=2045 so built (the other downlink RUs are used conventionally). In the present example, the AP sends the probe response frame 320 to STA1 using the first downlink RU (position #1) and sends the authentication response frame 350 to STA6 using the sixth downlink RU (position #6).

Finally, the not-yet-associated stations STA1 and STA6 receive and decode the response frames sent by the AP on these two downlink RUs in response to their previous request frames, and acknowledge good reception by an uplink transmission 940.

As it is readily apparent from this Figure compared to FIG. 6, successive SU transmissions (630-1 and 630-2) for management frames are now avoided, resulting in a simplification of the association procedure for not-yet-associated STAs and a more efficient usage of the network. This is particularly advantageous to manage the association of new stations in dense networks as 802.11ax.

FIG. 10*b* illustrates, using a flow chart, main steps at the AP in relation with an MU Downlink transmission it triggers when implementing some embodiments. These operations follow the reception of one or more request management frames from not-yet-associated stations, and describe how the AP transmits response frames thereto using a MU DL transmission.

At step 1050, the AP determines whether or not one or more response management frames are ready to be sent in response to request management frames received from not-yet-associated stations during a previous MU Uplink transmission.

In the affirmative, at step 1060, the AP builds a MU Downlink frame (i.e. a plurality of downlink resource units assigned to downlink transmission from the access point within a transmission opportunity granted to the access point) comprising, for each response frame to send, a downlink resource unit that matches the allocation scheme feature stored for the corresponding not-yet-associated station (i.e. that matches the allocation scheme feature of uplink resource unit used by said station to send its request frame in the MU Uplink transmission). For instance, the downlink and uplink RUs may have the same position in the allocation scheme used. Each such downlink resource unit is declared in HE-SIG-B in association with AID=2045.

Next, at step 1070, the AP 110 sends each response management frame on the corresponding downlink RU with AID=2045, to the appropriate not-yet-associated station.

Correspondingly, FIG. 11*b* illustrates, using a flow chart, main steps at a not-yet-associated station in relation with an MU Downlink transmission triggered by the AP according to some embodiments. These operations describe how such a station decodes a response management frame received from the AP in a MU Downlink transmission.

The not-yet-associated station has already sent a request management frame to the AP using an uplink RU with AID=2045 in a previous MU Uplink transmission and is waiting for a response thereof.

The process starts when a MU Downlink frame is received to determine, at step 1150, whether or not the frame includes downlink resource units with AID=2045.

In the negative, the not-yet-associated station waits for a next MU Downlink frame.

In the affirmative, the station determines, at step 1160, whether or not one of the downlink RUs with AID=2045 has allocation scheme features matching those stored at step 1140. This may simply consist in verifying whether or not a downlink RU with AID=2045 has the same position as the one (uplink RU) used in the previous MU Uplink transmission.

In case a matching downlink RU with AID=2045 is found, the not-yet-associated station selects this downlink RU to read the frame sent by the AP (step 1170). Optionally, the station may further read and check a MAC address specified in the frame before processing it.

The response management frame is thus decoded from this downlink RU and forwarded for instance to the MAC 802.11 layer block 804 (step 1180).

While FIG. 9*a* illustrates a situation where the downlink resource units of the MU Downlink transmission to provide the response directly follows the uplink resource units of the MU Uplink transmission by which the request has been sent, within the same transmission opportunity granted to the access point, other embodiments may provide that the uplink resource units assigned to uplink transmission by which the request has been sent and the downlink resource units assigned to downlink transmission to provide the response are separated by one or more other MU transmissions, either Downlink or Uplink, within the same transmission opportunity granted to the access point.

This is illustrated in FIG. 9*b* which shows that one or more MU transmissions can be inserted between transmission 510 and transmission 920.

This embodiment gives time to the AP to prepare the response management frames.

Another situation is illustrated in FIG. 9*c* where the downlink resource units of the MU Downlink transmission to provide the response and the uplink resource units of the MU Uplink transmission by which the request has been sent belong to two separate transmission opportunities granted to the access point.

Between the two separate TXOPs, any station may contend and access to the medium to send data.

This embodiment also gives time to the AP to prepare the response management frames.

In the embodiments of FIGS. 9*b* and 9*c*, the AP may avoid inserting, between the two transmissions, "intermediary" MU Downlink frames containing a downlink resource unit with AID=2045 matching the relevant allocation scheme feature or features of an uplink RU previously used by an unassociated station to send a request frame to the AP and that is now waiting for a response (management) frame from the AP. This advantageously avoids the unassociated station to read a downlink RU which eventually does not contain a frame addressed to it.

It should be noted however that avoiding such "intermediary" MU Downlink frame(s) is(are) not mandatory. If "intermediary" MU Downlink frame(s) are inserted between the two transmissions, an unassociated station that reads a downlink RU with AID=2045 (matching its relevant allocation scheme feature or features) which contains a frame not addressed to it will simply ignore the frame (by determining for instance whether or not the RA field 203 is its own MAC address) and continue monitoring for another MU Downlink frame containing a downlink resource unit with AID=2045 matching its relevant allocation scheme feature or features.

FIG. 9*d* illustrates the general embodiment in which a plurality of downlink resource units (950) are allocated to multiple unassociated stations within the MU DL frame. In the illustrated embodiment, several RUs with AIDs equal to 2045 are signalled in the HE-SIG-B at locations corresponding to UL requests. The AP may use these downlink RUs with AID=2045 to send response frames to unassociated stations, such as a probe response and an authentication response.

Another embodiment is illustrated in FIG. 12*a* in which a unique downlink resource unit (1210) is allocated to unassociated stations (i.e. with AID=2045) within the MU DL frame. The AP may use this single downlink RU with AID=2045 to send a response frame to unassociated stations as a broadcast frame (i.e. with RA field 203 set to broadcast address).

As explained below, as a single downlink RU with AID=2045 is provided, the unassociated stations do not check the matching with their relevant allocation scheme feature or features. They all read the frame(s) of this single downlink RU with AID=2045. Due to the absence of allocation scheme feature check, the position of this downlink resource unit with AID=2045 within the MU DL frame can be anywhere. FIG. 12*a* illustrates steps 1058 and 1054 at the AP side of the flowchart of FIG. 10*c* described below.

A variation is illustrated in FIG. 12*b* in which a unique downlink resource unit (1220) is allocated to unassociated stations within the MU DL frame. This may be because the AP decides sending a unique response to a specific unassociated station. In that case, the RA field 203 of the frame sent through the unique downlink resource unit with AID=2045 (1220) is set to the MAC address of the destined unassociated station. FIG. 12*b* illustrates steps 1053 and 1054 at the AP side of the flowchart of FIG. 10*c* described below.

These illustrations show that, depending on the number of downlink RUs defined in the MU DL transmission, the unassociated stations may switch from a first behaviour where they check the matching of the downlink RUs with AID=2045 with their relevant allocation scheme feature or features (e.g. if there are more than a single downlink RU with AID=2045) before accessing/reading the matching downlink RU and a second behaviour where they do not perform the check (e.g. if there is a single downlink RU with AID=2045) and directly access/read the downlink RU.

In the second behaviour, it is unassociated stations' responsibilities to check whether the frame(s) sent over the unique downlink RU is addressed to them or not, e.g. by checking the RA field 203 (broadcast address or the MAC address specific to the station). Such check of the RA field 203 may optionally be done by the unassociated stations with the first behaviour.

Thanks to some embodiments, several RUs with AID=2045 can be used in the same MU Downlink transmission to send response management frames to respective not-yet-associated stations. This is advantageous in dense and active networks (e.g. rail stations where a lot of stations connect and disconnect the network in a short time).

Advantageously, the AP may regularly provide a trigger frame with a lot of (possibly only) random RUs with AID=2045. Preferably the allocation scheme of the first entry of FIG. 2*f* is used to offer a maximum number of opportunities for the not-yet-associated stations to perform their association procedure. The AP may thus provide, quickly after, a MU Downlink transmission matching the same allocation scheme, to provide the response management frames.

Figure 10C:
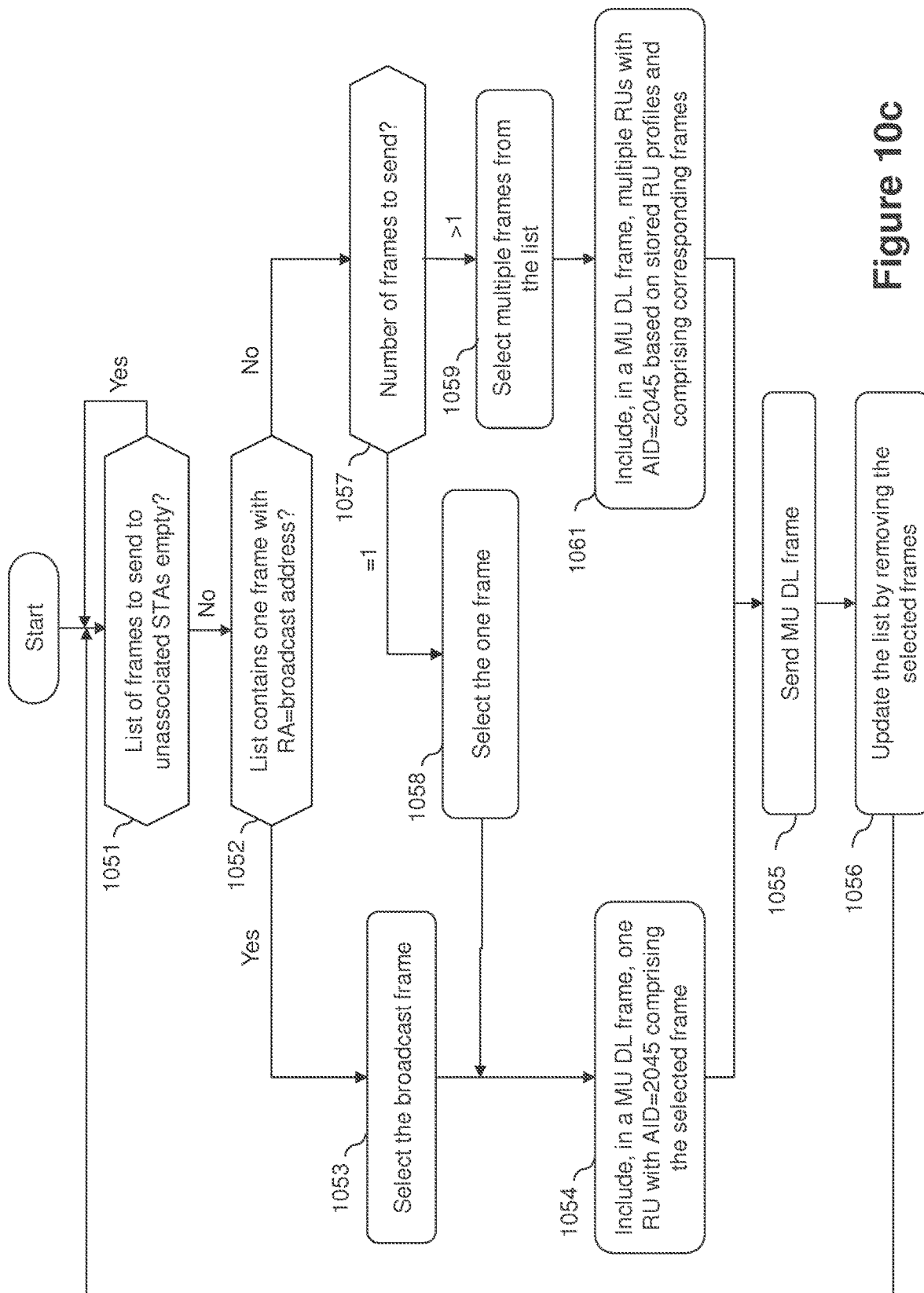

FIG. 10c illustrates, using a flow chart, main steps at the AP in relation with one or more MU Downlink transmissions embedding frames destined to unassociated stations according to some other embodiments. Note that the MU Downlink transmission may also embed frames intended to already-associated stations, but these transmissions may use conventional methods and are not further described here.

In the following description a predefined identifier value of 2045 is chosen to designate MU DL RUs reserved for unassociated stations. Of course this value is given for illustration only and any other predefined value or signalling means may be adopted.

At step 1051, the AP determines whether there is a list of pending frames (e.g. response management frames or any other type of frames) waiting for transmission to unassociated stations. Again, other frames intended for associated stations may also be handled in parallel or sequentially by the AP.

If the list of pending frames is not empty, it is determined at step 1052 whether the list contains a broadcast frame (i.e. a MPDU packet with a RA field 203 set to the broadcast value FF:FF:FF:FF:FF:FF). If a broadcast frame is found, it is selected at step 1053 for transmission. A single downlink RU with AID=2045 is included in a MU DL frame comprising the selected frame (step 1054). The downlink RU can be located anywhere within the MU DL frame (an example is illustrated in FIG. 12a). The MU DL frame may be built at the time of inclusion of the downlink RU with AID=2045, or may be formed earlier by module 805 of the AP, for example at the time other downlink RUs destined for already-associated stations are defined.

If the list does not contain a broadcast frame (test 1052 negative), the number of frames pending for transmission is determined at step 1057. If only one frame is present in the list, that frame is selected (step 1058) and included in the MU DL frame (step 1054). Similarly as for step 1053, only one downlink RU with AID=2045 is included in the MU DL frame (as shown for instance in FIG. 12b).

If multiple frames are present in the list (number of frames to send greater than one at test 1057), multiple frames are selected from the list at step 1059. Preferably, all response frames that follow the reception of request frames received on uplink RUs from unassociated stations (e.g. according to flowchart of FIG. 10a) are selected in order to be transmitted to the corresponding unassociated stations. The design of the downlink RUs with AID=2045 for the response frames can be based on at least one allocation scheme feature of the uplink RUs used by the unassociated stations. Of course, the response frame for a specific unassociated station will be sent over the downlink RU matching the allocation scheme feature of the uplink RU used by the same station when requesting the AP.

The number of frames selected at step 1059 may be limited to a number of downlink RUs available, for instance of downlink RUs available to be assigned to AID=2045. This may be the case if some downlink RUs are already assigned to specific already-associated stations.

At step 1061, multiple downlink RUs with AID value 2045 are included in the MU DL frame. The MU DL frame is previously built or is built at the time of the inclusion. The included downlink resource units with AID=2045 match the allocation scheme features stored for the corresponding unassociated stations respectively (i.e. each downlink RU matches the allocation scheme feature of the uplink resource unit used by said station to send a frame in the MU Uplink transmission).

For instance, the AP, that received a RA RU carrying a management request frame from an unassociated STA, may transmit a management response frame in HE MU PPDU (i.e. MU DL frame) using a broadcast RU identified by a STA_ID (AID) equal to 2045 and having the same RU allocation as the RU allocation of the received RA RU.

At step 1055, the MU DL frame is transmitted by the AP. Finally, at step 1056, the list of pending frames is updated by removing the selected frames that have been transmitted (and acknowledged), and the steps of the flowchart are repeated from step 1051.

The flowchart illustrated in FIG. 10c describes one possible implementation for handling the transmission of frames for unassociated stations according to some embodiments. However other implementation variants may be contemplated.

For example, the broadcast frame may be given a lower priority relatively to other frames in the list, meaning one or more frames may be selected first for transmission although a broadcast frame is present in the list. The broadcast frame is then only transmitted after all or a certain number of frames (based on age or other criteria) are transmitted from the list.

In another variant, instead of selecting multiple frames at step 1059, the AP may decide to select only one frame among the list of multiple frames to send. In this case, the MU DL frame will contain only one downlink RU with AID=2045 comprising the selected frame. Step 1061 is cancelled in this variant. The selected frame is included in a MU DL frame as described at step 1054.

Figure 11C:
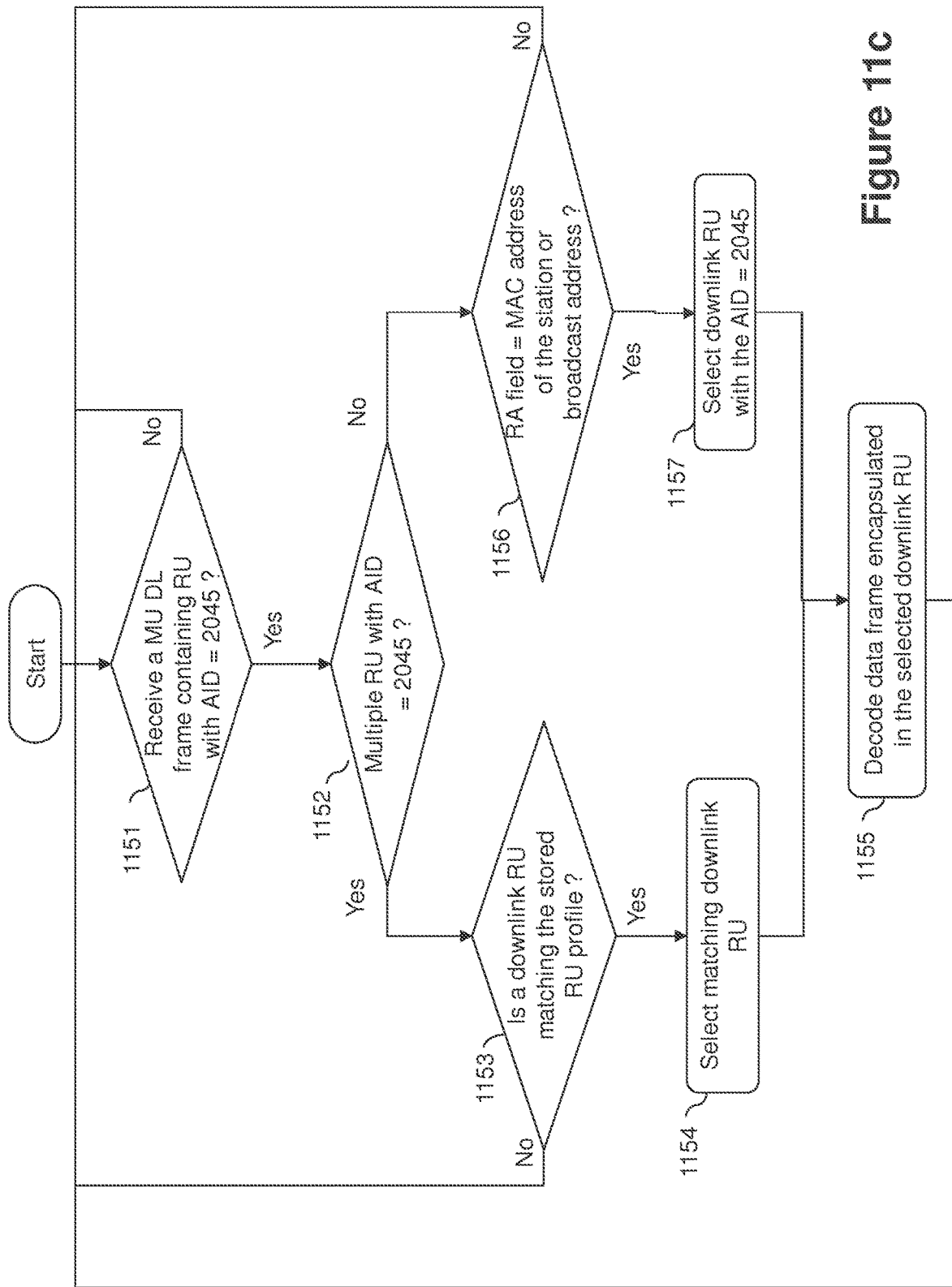

Correspondingly, FIG. 11c illustrates, using a flow chart, main steps at an unassociated station in relation with an MU Downlink transmission triggered by the AP. These operations describe how such an unassociated station decodes a frame received from the AP in a MU Downlink transmission.

The process starts by checking when a MU Downlink frame (HE MU PPDU) is received by the station (step 1151). This is similar to step 1150 at FIG. 11b.

If a MU Downlink frame is received (test at step 1151 positive), the station determines at step 1152 whether multiple downlink RUs with AID equal to 2045 are included in the received MU DL frame.

If multiple downlink RUs with an AID value 2045 are found (test at step 1152 positive), the unassociated station enters a first behavior where it checks whether a previously stored RU profile matches with the RU allocation of one of the downlink resource units having AID=2045 contained in the just received MU DL frame (step 1153). A RU profile may be previously stored by the station following the execution of flowchart of FIG. 11a for example (e.g. transmission of a request frame in a MU UL RU with AID=2045 and storing the profile of the uplink RU as described in step 1140). Thus, a RU profile is stored if the unassociated station has already sent a request frame to the AP using an uplink RU with AID=2045 in a previous MU Uplink transmission.

The matching test at step 1153 may simply consist in verifying whether or not a downlink RU with AID=2045 has the same position as the one used in the previous MU Uplink transmission.

The matching test at step 1153 may also be that the STA has previously sent a management request frame in response to a Trigger frame containing RA-RU(s) with AID set to 2045, and the broadcast RU with STA-ID (AID) equal to 2045 has the same RU allocation as the RU allocation of the RA-RU carrying the request in the previously sent HE TB PPDU.

If the test at step 1153 is positive, the unassociated station is considered as recipient of the matching downlink RU, which means that the matching downlink RU potentially contains a MAC frame destined to the unassociated station. The matching downlink RU is then selected at step 1154 for decoding. Optionally, the unassociated station checks whether the RA field 203 of the MAC frame conveyed in the selected matching downlink RU corresponds to the unassociated station MAC address prior to decoding.

If the test at step 1153 is negative, the unassociated station is the recipient of no downlink RU. The unassociated station waits for the reception of new MU DL frames with AID=2045 at step 1151.

At step 1155, the frame encapsulated in the selected downlink RU with AID=2045 is decoded, and forwarded for instance to the MAC 802.11 layer block 804. The encapsulated frame may be a response frame.

If a single downlink RU with an AID value 2045 is found at step 1152 (test negative), the unassociated station enters a second behavior where it does not check any matching between a stored RU profile and the single downlink RU. The unassociated station is (automatically) considered as recipient of that downlink RU. The unassociated station then checks at step 1156 whether the RA field 203 of the MAC frame corresponds to the unassociated station MAC address or to a broadcast address. In the affirmative, the downlink RU is selected at step 1157 and the frame contained therein decoded at step 1155. In the negative, the unassociated station waits for the reception of new MU DL frames with AID=2045 at step 1151.

Note that in any case, and in particular when multiple downlink RUs with AID=2045 are determined at step 1152, the unassociated station eventually decodes at most one downlink RU with AID=2045. This makes it easy for the unassociated station to determine whether it is recipient of a downlink RU or not and, in the affirmative, to locate the downlink RU for which the unassociated station is the recipient.

Note also that an unassociated station that receives a MU DL frame containing RUs with the STA-ID (AID) equal to 2045, is considered as the recipient of a RU with the STA-ID equal to 2045 if one of the following condition occurs:
- there is only one RU with the STA-ID equal to 2045 in the MU DL frame (test 1152 negative);
- the STA has previously sent a (e.g. management) request frame in response to a Trigger frame containing RA-RU(s) with AID set to 2045, and the broadcast RU with STA-ID equal to 2045 has the same RU allocation as the RU allocation of the RA-RU carrying the request in the previously sent MU UL frame (test 1153 positive).

According to second approaches that are based on aggregation, the inventors have contemplated using a RU in the MU Downlink transmission for multiple addressee stations, i.e. a resource unit intended for multiple stations (or dedicated to a plurality of stations in an equivalent wording). The access point can thus aggregate data frames addressed to two or more stations, and transmit the aggregated data frames over such a resource unit dedicated to a plurality of stations, from amongst a plurality of resource units forming the multi-user downlink transmission opportunity (MU Downlink OFDMA TXOP) granted to the access point for downlink communication to the stations. The aggregated data frames may contain only individually addressed data frames, i.e. data frames each with an RA addressing a single station. The aggregated data frames may contain a combination of an individually addressed data frame (i.e. with RA of a single station) and a group addressed data frame (i.e. with RA corresponding to a multicast or broadcast address).

Such RUs intended for groups of stations may be signaled using "group AIDs", contrasting with current requirements that allows only individual AIDs (i.e. associated with a single station) to be used for MU Downlink transmission. In particular, the resource unit intended for a plurality of stations may thus be assigned in the downlink transmission opportunity to a predefined (group) association identifier not associated with a specific station.

As a consequence, any station (concerned by such a group) may determine (e.g. using group AIDs) a "group" resource unit intended for a plurality of stations, from amongst a plurality of resource units forming a multi-user downlink transmission opportunity granted to the access point for downlink communication to the stations, receive aggregated data frames over the determined resource unit; and retrieve one or more data frames addressed to the station, from amongst the received aggregated data frames.

In fact, where any station registering with the access point being associated with a unique association identifier used by the access point to assign, to the station, a resource unit in a transmission opportunity granted to the access point, an idea proposed by the inventors consists for the AP to build a plurality of resource units forming a multi-user downlink transmission opportunity granted to the access point for downlink communication to the stations, the plurality of resource units comprising a "group" resource unit assigned to an association identifier not associated with a specific station; and then transmit one or more data frames to a station on the resource unit assigned to an association identifier not associated with a specific station.

So the station only determines a "group" resource unit assigned to an association identifier not associated with a specific station, from a plurality of resource units forming a multi-user downlink transmission opportunity granted to the access point for downlink communication to the stations; and thus receives one or more data frame from the access point on the determined downlink "group" resource unit.

By aggregating data frames to be addressed to several stations within the same dedicated group RU, the proposed idea makes it possible for the AP to efficiently target a large number of stations, thereby using more efficiently each RU (and thus reducing padding bits), avoiding duplicating the same payload over several RUs (by grouping the stations targeted by the same multicast frame) and efficiently (i.e. at a higher bit rate) providing response management frames to the not-yet-associated stations (thus forming a group of not-associated stations).

Also, by using AID not associated with stations during MU Downlink transmissions, the proposed idea offers the AP with the opportunity to address one or more stations deprived of AID. A group RU assigned to an association identifier not associated with a specific station may thus be dedicated to a plurality of stations. The stations may thus easily identify, in a Downlink transmission, which RU to listen to.

MU Downlink transmission is thus significantly improved compared to known current 802.11ax requirements.

To achieve that, the additional block 805 may act as a multiple station RU management module for controlling usage of OFDMA resource units (sub-channels).

For instance and not exhaustively, the operations for the AP may include generating and sending MU Downlink frames as defined below, which MU Downlink frames identify, using specific AIDs, at least one RU intended for a plurality of stations instead of a single station per RU as currently done; and then managing the aggregation of MAC frames to be addressed to stations of the plurality inside such resource unit.

The operations for a station different from the AP may include analyzing received MU Downlink frame to determine if the station is allowed to access an RU for itself or an RU dedicated to a plurality of stations (group RU), and in the context of such an RU dedicated to a plurality of stations, processing the MAC frames aggregated therein to retrieve the or those MAC frames addressed to it.

However, some issues may arise regarding the acknowledgment, by the stations, of the data frames sent over the DL group RUs.

In the current 802.11ax scheme, the acknowledgment of data frames received over an RU is made by the addressee station to which the RU has been specifically assigned. This acknowledgment is sent over a response RU in the following MU Uplink OFDMA transmission 625 as indicated in the received UMRS information 264.

However, this scheme cannot operate for DL group RUs, as no specific station is designated as the RU assignee. Furthermore, even if one station would be so designated, it should not be allowed to acknowledge the data frames addressed to other stations of the DL group RU.

An enhanced idea of the inventors to overcome these acknowledgment issues relies on the signalling of different UMRS information within different data frames conveyed over the DL group RU. For example if the group RU carries two aggregated data frames addressed to two respective stations, respective response resource unit information is signalled to identify a response resource unit to be used by the addressee station in the MU Uplink OFDMA transmission 625 that follows the MU Downlink OFDMA transmission 620 to provide a response (or acknowledgment) to data frames to the access point.

As a consequence, an addressee station (addressed through the DL group RU) may:

obtain, from data frames retrieved over the group RU, response resource unit information identifying one response resource unit in the MU Uplink OFDMA transmission 265, and then send to the access point a response (such as acknowledgment) to the retrieved data frames over the identified response resource unit.

Contrary to the 802.11ax requirements limiting a single value of UMRS per RU, this enhanced idea allows the various addressee stations (via the same group RU) to efficiently acknowledge receipt of data frames.

As the AP is able to schedule more RUs in the MU Uplink OFDMA transmission 625 than in the MU Downlink OFDMA transmission 620, it is possible to provide an opportunity for all the addressee stations to acknowledge their received data frames. Retransmission of data frames by the AP is thus avoided, thereby saving channel bandwidth.

Also, this is the addressee station as specified in the RA field 210 (MAC address) of the frame MAC header that can use the response RU indicated in the UMRS information specified in the HT Control field 250 of the same MAC header. As a consequence, even the addressee stations which are not yet associated with the AP can acknowledge data frames. The association procedure can thus be simplified for the stations (using random RU with AID=2045, receiving responses from the AP during MU Downlink transmission 620, and acknowledging the response during subsequent MU Uplink transmission 625).

To achieve that, the operations of the multiple station RU management module 805 at the AP may also include the signalling, in the aggregated MAC frames, of respective response resource unit information (e.g. UMRS values) identifying response resource units to be used by the addressee stations in a multi-user uplink transmission opportunity following the multi-user downlink transmission opportunity to provide their response to the received data frames to the access point.

The operations for a station different from the AP may also include obtaining, from the retrieved data frames, response resource unit information (e.g. an UMRS value) identifying one response resource unit in the multi-user uplink transmission opportunity, and sending to the access point a response to the retrieved data frames over the identified response resource unit.

In the description, the terms "multi-destination" RU, "multi-station" RU, "multi-STA" RU, "multicast" RU and "broadcast" RU are equivalent to "group" RU discussed above and are meant to refer to a resource unit intended for multiple stations. Note that "broadcast RU" does not mean that the RU has to carry a broadcast data frame, but refers to the plurality of stations to which the RU is intended.

Embodiments of the aggregation-based approaches are now illustrated using various exemplary embodiments in the context of IEEE 802.11ax by considering OFDMA RUs dedicated to multiple stations.

Although proposed examples below are described with reference to management frames of the 802.11 association process, their teachings are not limited to such management frame transmission but can also be applied to any 802.11 data frame such as those addressed to various stations.

Figures 13A, 13B:
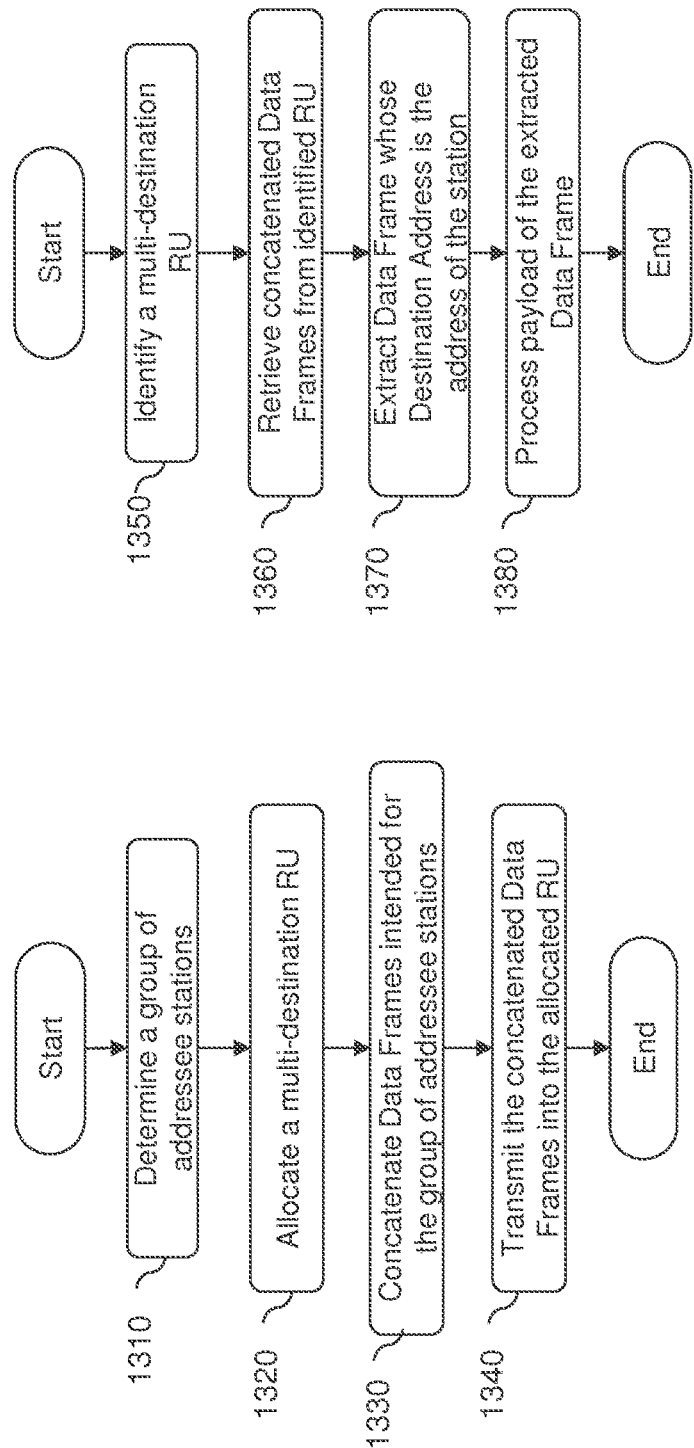
FIG. 13a illustrates, using a flowchart, embodiments of the invention implemented at a physical access point when preparing and performing a MU Downlink transmission.
FIG. 13b illustrates, using a flowchart, embodiments of the invention implemented at a non-AP station to handle RUs dedicated to groups of stations in MU Downlink transmissions from the AP.

FIG. 13a illustrates, using a flowchart, embodiments implemented at a physical access point when preparing and performing a MU Downlink transmission.

At step 1310, the AP first determines if it is willing to group several addressee stations for a Downlink transmission.

Three exemplary situations are proposed here.

In the case of station association procedure, stations may send request management frames to the access point within procedures of associating (i.e. registering) the station with the access point. In other words, the access point may receive request management frames (310, 340, 360) from stations willing to associate (i.e. register) with the access point, and intends to answer to those stations by grouping together the response management frames (320, 350, 370) in the same group RU intended for a plurality of addressee stations.

The request management frames may have been received either or both via previous Single User communications or via a previous Trigger Frame emitted by the AP (typically the TF 530 as regards to the FIG. 6), such trigger frame allocating some random RUs with an AID equal to 2045 value in order that some request management frames are sent by not-yet-associated stations in corresponding RU or RUs during the Uplink transmission phase 510.

Also, the AP may group stations with regards to a common interest to receive data frames. For instance, the access point receives a multicast frame (e.g. from an upper OSI layer) to be addressed to a plurality of addressee stations, and may thus consider forwarding the multicast frame to the addressee stations using a group RU dedicated to this plurality of stations.

Another example is the case where the access point determines there are small data frames to be transmitted to stations, given a size of the downlink transmission opportunity and a size threshold (and possibly the size of RUs), that could be grouped into a single RU to reduce padding bits. More generally, the AP may consider using a special group to convey any MAC frame (to be transmitted) which does not belong to an existing individual transmission of the MU Download transmission. The AP may for instance seek to use the individual RUs to convey the largest MAC frames, in order to fill an "MPDU collector" RU or "collecting RU" (thus a group RU) with the maximum of remaining MAC frames (that are smaller).

As example, the collecting RU may collect any pending MAC frame stored in an EDCA buffer of the AP, and for which an assignment of an individual RU is not efficient (too much padding needed—for instance STA3 and STA8 in FIG. 6).

Once the AP has determined one or more groups of addressee stations with the corresponding MAC frames to be transmitted, an RU (thus named group RU, broadcast RU, multicast RU or multi-station RU) is assigned to each group so determined, at step 1320.

For instance, a group RU may be allocated to convey the response management frames (320, 350 or 370) in response to requests previously received from not-yet-associated stations.

In a preferred embodiment, the AID value assigned to this group RU for multiple stations takes the predefined value 2045 (known by all 802.11ax nodes compliant with the present idea). One may note that this value is the same value as the one used to indicate the RU dedicated or assigned to not-yet-associated stations in the MU Uplink transmission (510 in FIG. 6), to speed up their association procedure.

As a consequence, if a request management frame is sent (by a station) in a prior resource unit forming part of an uplink transmission opportunity granted to the access point for multi-user uplink communication from the stations, the prior resource unit being assigned to stations not yet associated with the access point, the group resource unit assigned at step 1320 and the prior resource unit used are signalled in the downlink and uplink transmission opportunities respectively, using the same prefixed association identifier (not provided to a specific station by the AP), here AID=2045.

One may note that, even without aggregating MAC frames in the RU dedicated to not-yet-associated stations, the sole idea of providing an RU with an AID reserved for not-yet-associated stations for Downlink transmission improves (speeds up) the association procedure for such stations. Such RU may be used for a single not-yet-associated station.

A group RU may also be assigned to convey the multicast frame intended to several addressee stations. A predefined AID may be used in this respect, for instance AID=2042 known by all the 802.11ax nodes compliant with the present idea.

Also, the collecting RU to collect small pending MAC frames may be signaled using AID=0.

Other variants may be proposed. For instance, in the context of multiple BSSs ("virtual APs") managed by a single physical AP, the AP may assign a unique AID value to respectively each of the BSSs it manages, meaning each BSS has a unique AID value not associated with a specific station (but with the whole BSS). For instance, the AID value may be the index of each BSS: if 'n' is the maximum number of virtual APs managed by the physical AP (as example, this value is specified in the MaxBSSID Indicator in the Multiple BSSID element of beacon and probe response frames), then AIDs 1 to n are assigned to respectively BSSs 1 to n.

Each non-representative AP can use only its own AID. However, the representative AP can use any AID of the VAPs.

In this context, the representative AP may provide, in a MU Downlink transmission, one or more collecting RUs specific to one or more respective BSSs, by using the respective AIDs. The AP may thus select the AID of the BSS for which it is about to transmit frames.

Also, the representative AP may signal random RUs in a TF (MU Uplink transmission) assigned respectively and individually to specific BSSs: first random RUs are assigned to AID=i to restrict the access to not-yet-associated stations willing to register with VAP i, while second random RUs are assigned to AID=j to restrict the access to not-yet-associated stations willing to register with VAP j. RUs having the same AIDs can be used in the MU Downlink transmission to transmit the response management frames related to each BSS.

Once the one or more group RUs dedicated to groups of stations have been determined, step 1330 consists for the AP in concatenating or aggregating, for each group RU, all the pending MPDU frames for the corresponding group of stations. For the following, the term "Data frames" in further illustration of steps 1330 and 1340 is well understood to correspond to any frame pending in the outbound MAC transmission queue (that is to say including, without restriction, any Data frame coming from application layer 801 and any 802.11 management frame useful for the MAC layer 804 like those of 802.11 association procedure).

For the management frames, all the response MAC management frames prepared by the AP for the not-yet-associated stations can be aggregated together into an HE-MU PPDU (up to the size of the PPDU given the reserved TXOP).

For the multicast frame, responsive to the multicast frame reception, the access point may generate a plurality of data frames including payload of the multicast frame, to be each individually addressed to a respective one of the addressee stations. The AP thus aggregates the generated data frames including payload of the multicast frame (up to the size of the PPDU given the reserved TXOP). Of course, if the TXOP does not provide enough space to transmit all the generated data frames, the remainder may be transmitted during one or more next MU Downlink transmissions.

Also, the AP may aggregate together (and up to the size of the PPDU given the reserved TXOP) the MAC frames stored in its EDCA buffers for stations that have not yet been addressed by other RUs of the same MU Downlink transmission. Given this constraint, the aggregation for the collecting RU is processed at the end (as the last RU).

The AP may follow the principle of 802.11ax A-MPDU aggregation for classical RU, but slightly modify it to allow MPDUs of the same A-MPDU to be addressed to different stations. In other words, aggregation rules are slightly modified for a group RU ("broadcast RU" according to the 802.11ax standard terminology) in order to support addressing several stations inside a single A-MPDU. This does not mandate any modification of the 802.11 baseline, as this mechanism is only limited to 802.11ax stations of the invention involved in the restricted context of group RU.

For example, when transmitted by a 802.11ax AP in a RU intended for multiple STAs (e.g. Broadcast RU), the MPDUs within an A-MPDU may have different RAs. The RA may be the MAC address of one of the multiple STAs or a broadcast MAC address. Address type (individually addressed or group addressed) and address values of MPDUs may be different inside an A-MPDU in an RU intended for multiple STAs.

Any other aggregation mechanism (MAC Service Data Unit (MSDU) aggregation, MAC Protocol Data Unit (MPDU) aggregation, concatenation of A-MPDU frames, or any combination of those schemes) can be used to concatenate MAC frames for various stations.

To make it possible for the stations to efficiently retrieve their own MAC frames, the access point sets, in each data frame to be aggregated, a MAC address field 210 to a MAC address of the addressee station.

If the MAC address field contains a broadcast address, the MAC frame may be retrieved by all stations that belong to the group RU. Note that the MAC frame with a broadcast address may be retrieved by all stations of the BSS if the group RU is dedicated to a group to which all stations of the BSS belong to, or a group defined to be accessible to all stations of the BSS.

If the MAC address field contains a multicast address (i.e. defining a multicast group of stations), the MAC frame may be retrieved by all stations that belong to both the group RU and the multicast group.

Next at step 1340, the MU Downlink PPDU formed of each RU is sent by the AP on the corresponding RU of the communication channel.

Regarding the groups of stations, it means that the aggregated response management frames are transmitted on the group RU with AID=2045 or on each group RU with AID=i for the response management frames related to BSS i (in case of multi-BSSs); the aggregated generated frames including the payload data of the multicast frame are transmitted over the group RU with AID=2042 as example; and the aggregated collected frames are transmitted over the last RU of the channel, the group RU with AID=0 (possibly with AID=j for collected frames related to specific BSS i in case of multi-BSSs).

The other RUs (assigned to individual stations) are handled conventionally.

To ensure efficient processing by the stations, the downlink transmission opportunity may include an ordered signalling (in the HE-SIG-B preamble of 802.11ax MU DL frame) of assignments of resource units of the plurality to one or more stations, the ordered signalling first defining each assignment of a resource unit to an individual station (RU with an AID associated with a single station), next defining each assignment of a resource unit to a group of stations (AID=2042 or 2045 or i in case of multi-BSSs, in the examples above), then defining an assignment of the collecting resource unit (AID=0) to any station not yet associated with a resource unit. This advantageously allows a station to disregard any further RU analysis in the same HE MU PPDU once it has found one RU (individual or group) addressed to it.

One may note that the aggregation-based approach advantageously keeps the strict usage of a unique AID presence in the RU Allocation of the HE-SIG-B preamble, despite the use of groups of stations or the transmission to (not-yet-associated) stations having no AID.

The Downlink transmission opportunity thus includes resource units that the stations may read using a conventional 802.11ax scheme (e.g. by identifying the RU linked with their AID) or by using the newly proposed scheme (e.g. by identifying a RU linked to a group AID) as now described with reference to FIG. 13*b*.

FIG. 13*b* illustrates, using a flowchart, embodiments implemented at a non-AP station to handle group RUs dedicated to groups of stations in MU Downlink transmissions from the AP.

The non-AP station can be any station already associated with the AP emitting the MU Downlink PPDUs, or any not-yet-associated station which is in the process of associating with the AP emitting the MU Downlink PPDUs.

At step 1350, a MU Downlink frame made of per-RU PPDUs is received from the physical access point, and the station determines which RU is addressed to it. RUs assigned to individual stations are processed conventionally.

Specific processing is required for the situation where the station is involved in a group RU conveying data for a group of stations. In that case, the station determines such a group resource unit dedicated to a plurality of stations, from amongst a plurality of resource units forming the downlink transmission opportunity granted to the access point for downlink communication to the station.

For a not-yet-associated station, it means determining a group resource unit assigned to stations not yet associated with the access point. This is to retrieve a response management frame from the access point to the sent request management frame. This may be simply performed by searching in the HE-SIG-B preamble of the received MU Downlink frame for an RU with an AID equal to 2045 or an RU with an AID equal the BSSID (in case of multi-BSSs).

If no group RU is found, the process ends and the not-yet-associated station sets its NAV (duration is obtained from L-SIG field of the received frame).

If such group RU with AID=2045 is found, next step is step 1360.

Optionally, the not-yet-associated station may analyze the received MU Downlink frame, and thus determine a resource unit assigned to stations not yet associated, only if a request management frame sent by the station is pending (i.e. no response has been received from the AP). This request may have been previously transmitted during a prior MU Uplink transmission (for instance during 510). In particular, an unassociated STA may disregard any RU with a STA-ID set to 2045 in a HE MU PPDU received from a HE AP for which this STA is not in a pre-association context (which means that the unassociated STA has not sent any association request to that AP).

For an already-associated station, the operations may be different. The station may first scan through resource units assigned to individual stations to verify whether a resource unit in the received MU Downlink frame is individually assigned to the station or not, and in case of negative verification only, the station determines a group resource unit dedicated to a plurality of stations from the not-yet scanned resource units of the plurality.

Such processing order derives from the order of declaring the RUs in the MU Downlink frame as indicated above with reference to FIG. 13*a*: the individual RUs are first declared, followed by the group RUs (AID=2042 for instance for multicast), followed by the collecting group RU (AID=0). In this situation, if the station detects a single RU addressed to it, the process of FIG. 13*b* ends and the station analyzes the corresponding RU in a conventional 802.11ax way. Otherwise, the station searches between the group RUs if one of them is addressed to it. This may be performed using bit masking on the AID (for instance if group AID have the same most significant bits) and/or by detecting predefined AIDs. Thus, the station scans through group resource units assigned to lists (groups) of stations to verify whether the station belongs to a list associated with one of the scanned group resource units.

This makes it possible for the station to stop analyzing the MU Downlink frame as soon as a group RU dedicated to a group to which the station belongs it is detected. For instance, if the station knows it is involved in a multicast communication (e.g. due to exchange at an application layer—see module 801), the station may scrutinize any group RU dedicated to multicast (AID=2042 in the example here).

In case of positive verification (the station belongs to a list), the determined group resource unit to retrieve the data frames is the one assigned to the list that includes the station (e.g. with AID=2042).

On the other hand, in case of negative verification only, the determined group resource unit is the collecting resource unit (AID-=0) used to convey data frames for any station not assigned, individually or through a list, to another resource unit forming the downlink transmission opportunity. The station will thus monitor the collecting RU.

Of course, any other order for considering the RUs may be implemented, so that the station may decide to stop its analysis upon either the detection of a single RU addressed to it or a group RU dedicated to a group to which the station belongs.

Finally, if a group RU is found (AID=2042, 2045 or 0 in the above examples), step 1360 is executed where the station reads the determined group RU and thus receives aggregated data frames from the AP. All the MPDUs forming the A-MPDU received on the determined group RU are provided to the MAC layer (process 805) for further analysis.

At step 1370, the station compares a MAC address of each aggregated data frame (the RA field 210 of each MPDU forming the A-MPDU) with its own MAC address. This is to retrieve one or more data frames, if any, addressed to the station, from amongst the received aggregated data frames. The STA may thus retrieve one or more frames, carried in a RU intended for multiple STAs, that are addressed to this STA based on the RA field of each MPDU frame.

Symmetrically to what has been made at the AP, the principle of 802.11ax A-MPDU disaggregation for classical RU is slightly modified at the station to analyze the MAC address of each MPDU. This is to avoid stopping the de-aggregation process as soon as one MPDU not matching the receiver station address is found, as done with legacy A-MPDU processing. In other words, aggregation/de-aggregation rules are slightly modified for a group RU ("broadcast RU" according to the 802.11ax standard terminology) in order to support addressing several stations inside a single A-MPDU. This does not mandate any modification of the 802.11 baseline, as this mechanism is only limited to 802.11ax stations of the invention involved in the restricted context of group RU.

The station then keeps only the MPDU or MPDUs having a MAC address 210 equal to the station's MAC address, a multicast MAC address of a group the station belongs to, or a broadcast MAC address. In other words, unassociated stations (e.g. which have sent requests to that AP) will decode that group RU (or broadcast RU according to the 802.11ax standard terminology), then de-aggregate and filter association management response frames according to RA MAC addresses.

Next, at step 1380, all extracted MPDUs addressed to the stations are forwarded to upper layer stacks (for instance to the application layer 801).

The station may not acknowledge receipt of the retrieved data frames, to the access point (no additional step is shown in the Figure). Thus, all MU Downlink MPDU transmitted in the RU dedicated to a group of stations contain a No-Ack indication.

In some cases, it would be worth having an acknowledgment of the data frames sent over the group RU. However the conventional 802.11ax mechanisms allow a single station per RU (thus also per group RU) to acknowledge receipt of data. This cannot meet the requirements of multiple acknowledgments for group RUs. Thus, an acknowledgment policy may be implemented in which the station sends an acknowledgment of the retrieved data frames only if the retrieved data frames include the last received aggregated data frame. It means that only the last MPDU in the A-MPDU is explicitly acknowledged by its addressee station (according to 802.11ax standard, in an RU of MU ACK following the MU Downlink frame in the same TXOP). As a consequence, the other MPDUs may be implicitly acknowledged by the acknowledgment of the last MPDU. This may be an incorrect acknowledgment as some stations may not have actually received their data frames from the AP.

In the specific case of not-yet-associated stations receiving a response from the AP, an acknowledgment of the retrieved response may be sent by the receiving station, in a next resource unit forming part of a next uplink transmission opportunity granted to the access point for uplink communication from the stations, the next resource unit being assigned to stations not yet associated with the access point (i.e. a next random RU with AID=2045 in an MU Uplink TXOP). This acknowledgment scheme is also not really efficient as the not-yet-associated stations may not actually access a random RU in a short delay. As a consequence, the AP is not aware of the correct reception of the data frames and may schedule their retransmission, thereby wasting channel bandwidth.

To improve network efficiency, this acknowledgment may further be aggregated in this next RU (with AID=2045 for instance) with any further request management frame. For instance, if a probe response frame 320 is received in the MU Downlink frame according to the approach, then the station may provide the acknowledgement 330 corresponding to 320 together with the next request management frame (here authentication request frame 340), in an RU with AID=2045 in the next MU Uplink transmission 510. This is to make the association procedure progressing faster for the station. Again, it may require a lot of time (because of contention) before the not-yet-associated stations access the medium with a new random RU.

Figure 14:
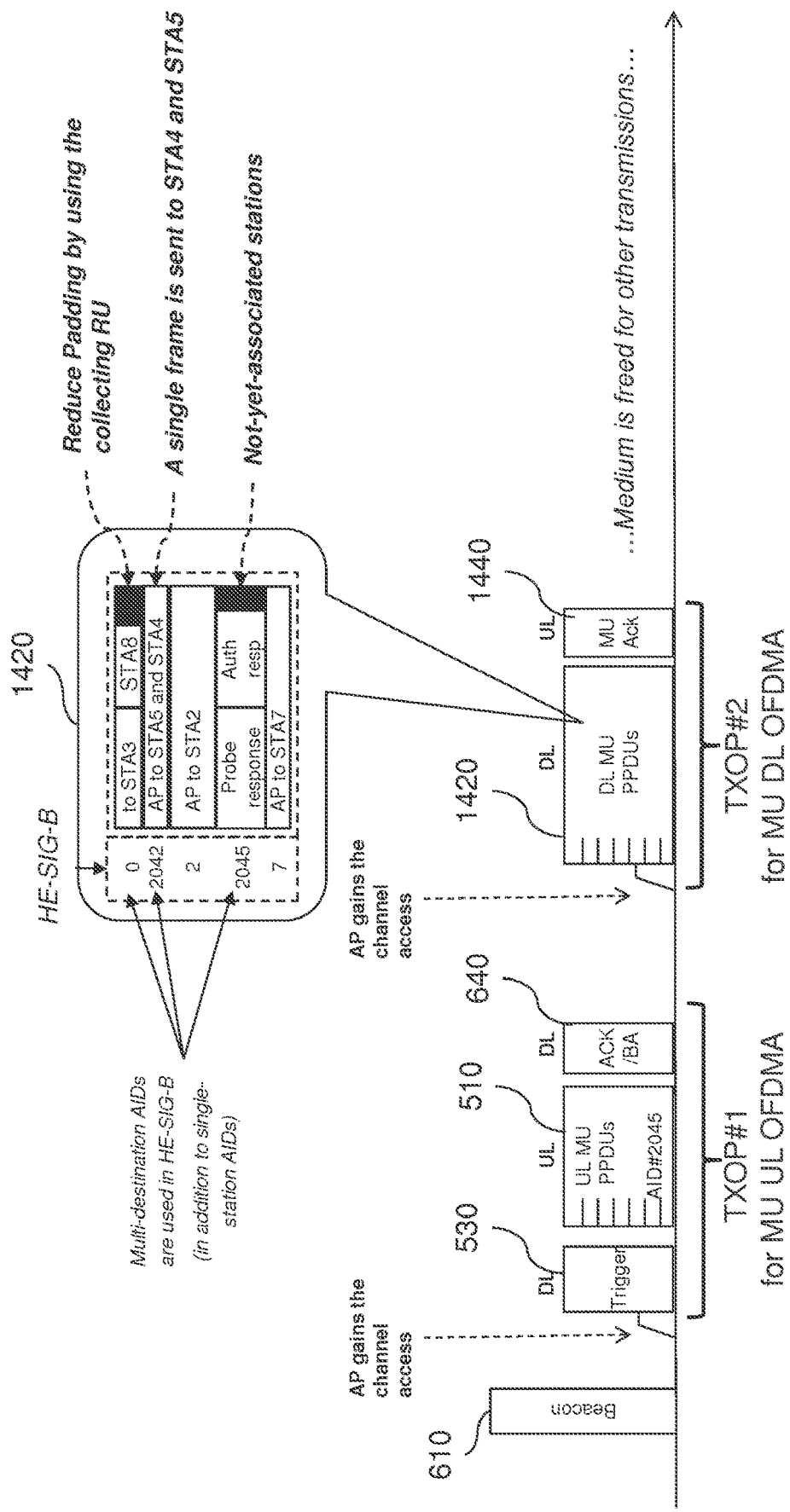
FIG. 14 illustrates the benefits of using group RUs with reference to the exemplary situation of FIG. 6 described above.

FIG. 14 illustrates the benefits of using group RUs with reference to the exemplary situation of FIG. 6 described above.

TXOP #1 is the same as in FIG. 6 with not-yet-associated stations STA1 and STA6 sending request management frames to the AP in the RU with AID=2045.

As readily apparent from the HE-SIG-B preamble of MU Downlink frame 1420, group AIDs are used, in particular AID=0 (for collecting small frames), 2042 (for multicast) and 2045 (for not-yet-associated stations). As indicated above, the HE-SIG-B preamble may declare first the RUs for individual stations (here 2 and 7), followed by the group RUs (here 2042 and 2045), followed by the group collecting RU (here 0) which is dedicated to "all other" associated stations.

The group RU with AID=2045 is used to convey concatenated MPDU frames addressed to one or multiple not-yetassociated stations, here a probe response frame intended to STA1 and an response authentication frame intended to STA6. In other words, a single RU with AID=2045 inside a 802.11ax Multi-User frame (HE MU PPDU) concatenates association responses to several unassociated STAs. As a consequence, successive SU transmissions (630-1 and 630-2 in FIG. 6) for management frames are avoided, resulting in a simplification of the association procedure for not-yet-associated STAs and a more efficient usage of the network. This is particularly advantageous to manage the association of new stations in dense networks as 802.11ax.

The group RU with AID=2042 is used to convey concatenated MPDU frames addressed to stations belonging to a multicast group, here stations STA5 and STA4. A single 802.11 A-MPDU frame is used and conveyed inside a single RU. This avoids RU duplication compared to conventional 802.11ax scheme.

The group RU with AID=0 is used to convey concatenated MPDU frames dedicated to a plurality of associated stations, for instance small MPDU frames which individually would not efficiently fill an entire RU (even if of smallest band, e.g. 26 tones) or when the limitation of number of RUs (maximum 9 per 20 Mhz band) is already reached. Such concatenation allows limiting padding in the RUs and thus reduces latency of small frames compared to conventional 802.11ax scheme.

As shown in the Figure, the MU Downlink transmission 1420 is followed by an MU ACK period 1440 belonging to the same TXOP #2. For instance, an acknowledgment frame 1440 according to the 802.11ax standard may be used, in which no acknowledgment is provided for group AIDs or an acknowledgment is provided by the station to which the last transmitted MPDU is addressed).

In some embodiments, the MU Downlink frame 1420 is followed by individual immediate acknowledgment frames according to FIG. 15 described below.

In these embodiments, each of the stations addressed through a group RU (during MU Downlink transmission 1420) obtains, from its retrieved data frames, an individual UMRS Control field 264 identifying which response resource unit (1440-A/B/C/D) to be used during the MU Uplink transmission 1440, and then sends to the access point the acknowledgment frame over the identified response resource unit.

This requires for the AP to signal, in two (or more) aggregated data frames addressed to two respective stations, a respective UMRS Control field identifying a response resource unit to be used by the addressee station in the MU Uplink transmission 1440 following MU Downlink transmission 1420 to provide a response to data frames to the access point.

Thanks to this approach, different UMRS Control fields are conveyed within (aggregated) MPDUs over the same DL group RU.

Figures 16A, 16B:
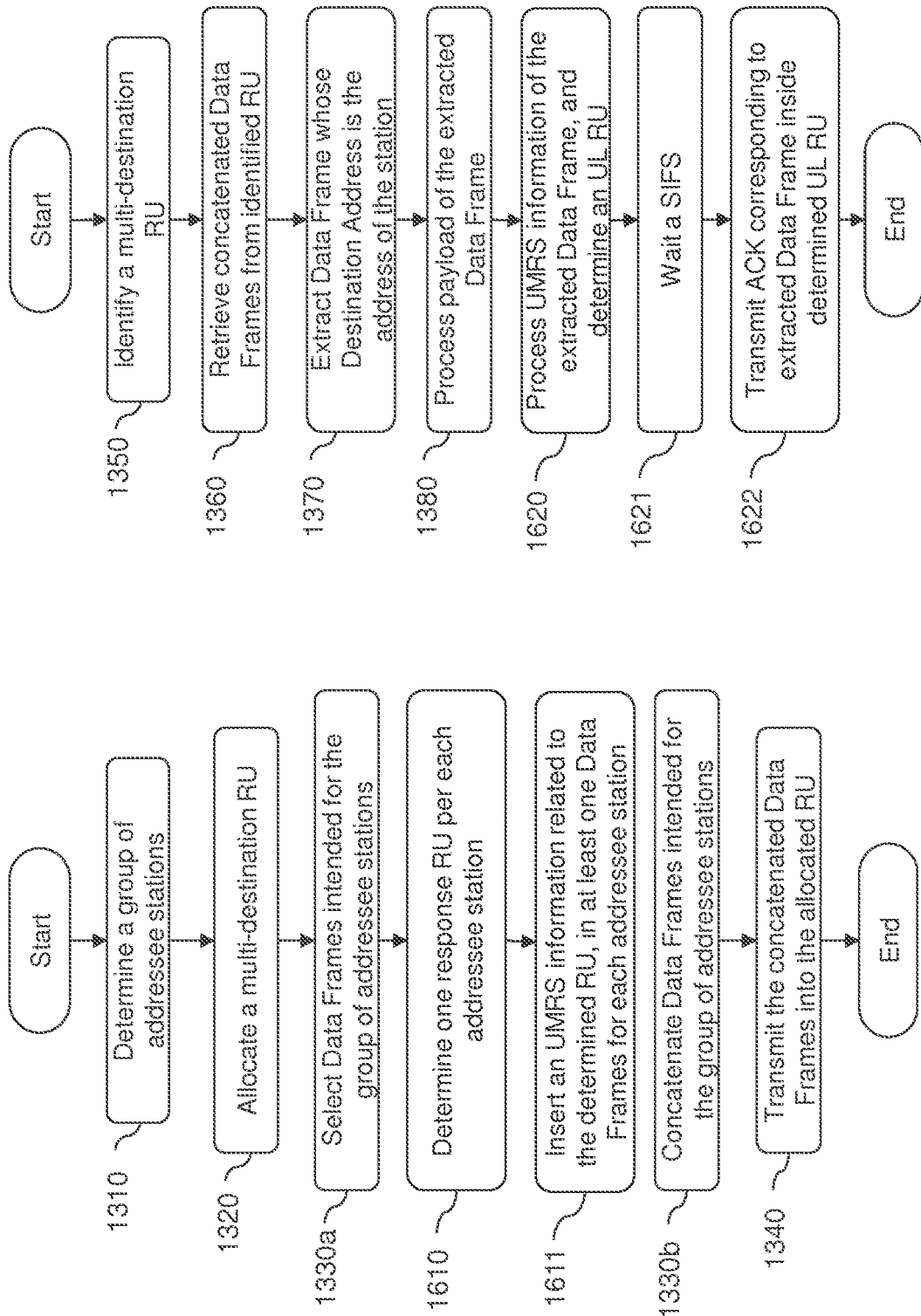
FIG. 16a illustrates, using a flowchart, an improvement of the process of FIG. 13a (at the access point) to provide efficiently frame acknowledgment in case of group RUs.
FIG. 16b illustrates, using a flowchart, an improvement of the process of FIG. 13b (at a station) to perform efficient and immediate frame acknowledgment in case of group RUs.

FIG. 16*a* illustrates, using a flowchart, an improvement of the process of FIG. 13*a* (at the access point) to provide efficiently frame acknowledgment in case of group RUs. The same step references as FIG. 13*a* are used when unmodified.

Thus, as described above, initially the AP determines one or more groups of addressee stations with the corresponding MAC frames to be transmitted (step 1310), and a group RU of the MU Downlink transmission 1420 is assigned to each determined group of stations (step 1320).

As already disclosed, a group RU may be used to convey the association request/response frames intended to at least one non-associated stations (group RU with AID=2045), or to convey the multicast frame intended to several addressee stations (group RU with AID=2042), or any packet collection for several stations (group collector RU with AID=0).

In embodiments, the AP may consider the total number of stations to be addressed in the MU Downlink transmission 1420 (through individual RUs and group RUs) when selecting the groups. In particular, this total number may be less or equal to the maximum number of response RUs that the AP may define in the MU Uplink transmission 1440 for acknowledgment. Preferably, the AP only takes into account the stations that will have to (that is to say, are solicited to) acknowledge receipt of the data frames. This is to provide a response or ack RU for each station.

Once a group has been selected, the MAC frames to be transmitted for the group are gathered (step 1330*a*).

Next, the AP has to signal using UMRS Control fields 264 which response RU each station of the group has to use to acknowledge its data frames. This is made through steps 1610 and 1611 to signal, in two (or more) aggregated data frames addressed to two respective stations, a respective UMRS Control field identifying a response resource unit to be used by the addressee station in the MU Uplink transmission 1440 following MU Downlink transmission 1420 to provide a response to data frames to the access point.

First, the AP determines at step 1610 the number of scheduled RUs required for the next MU Uplink communication 1440 based on the number of stations addressed by the frames conveyed in the group RU and the other RUs of MU Downlink transmission 1420.

The number of response RUs for the current group in MU Uplink communication 1440 equals at most the number of stations of the group.

This complies with the requirement that a given addressee station has only one response RU to use for its next MU Uplink transmission.

This also allows a given addressee station not to be assigned a response RU in case of no response (acknowledgment) is expected by the AP. As a consequence, the AP may only take into account the addressee stations that have to provide a response or acknowledgment: i.e. the stations supporting the UMRS signalling (i.e. if the station has set the UMRS Support subfield to 1 in the HE MAC Capabilities Information field of the HE Capabilities element it has exchanged with the AP during its association procedure, usually within the probe request frame) and for which the AP expects a response or acknowledgment. This approach reduces the amount of response RUs necessary. Furthermore, as the number of response RUs is limited, it may help increasing the number of addressee stations for the MU Downlink transmission 1420.

As the number of relevant addressee stations (that have to respond) may vary, the configuration by AP of the next MU Uplink transmission 1440 in terms of response RUs is directly impacted: the AP may have to provide a more or less large number of response RUs (one response RU for each DL individual RU, several response RUs for a DL group RU).

Thus, the access point may configure the MU Uplink transmission 1440 in such a way it includes a number of response resource units based on a number of stations addressed in the MU Downlink transmission 1420. In particular, this number of response RUs may be at least, but also the same as, a number of stations that have to provide a response to data frames addressed to them over any resource unit of the MU Downlink transmission 1420.

Also the AP may design the MU Uplink transmission 1440 so that the required response RUs encompass the whole 20 MHz channel.

Figure 15:
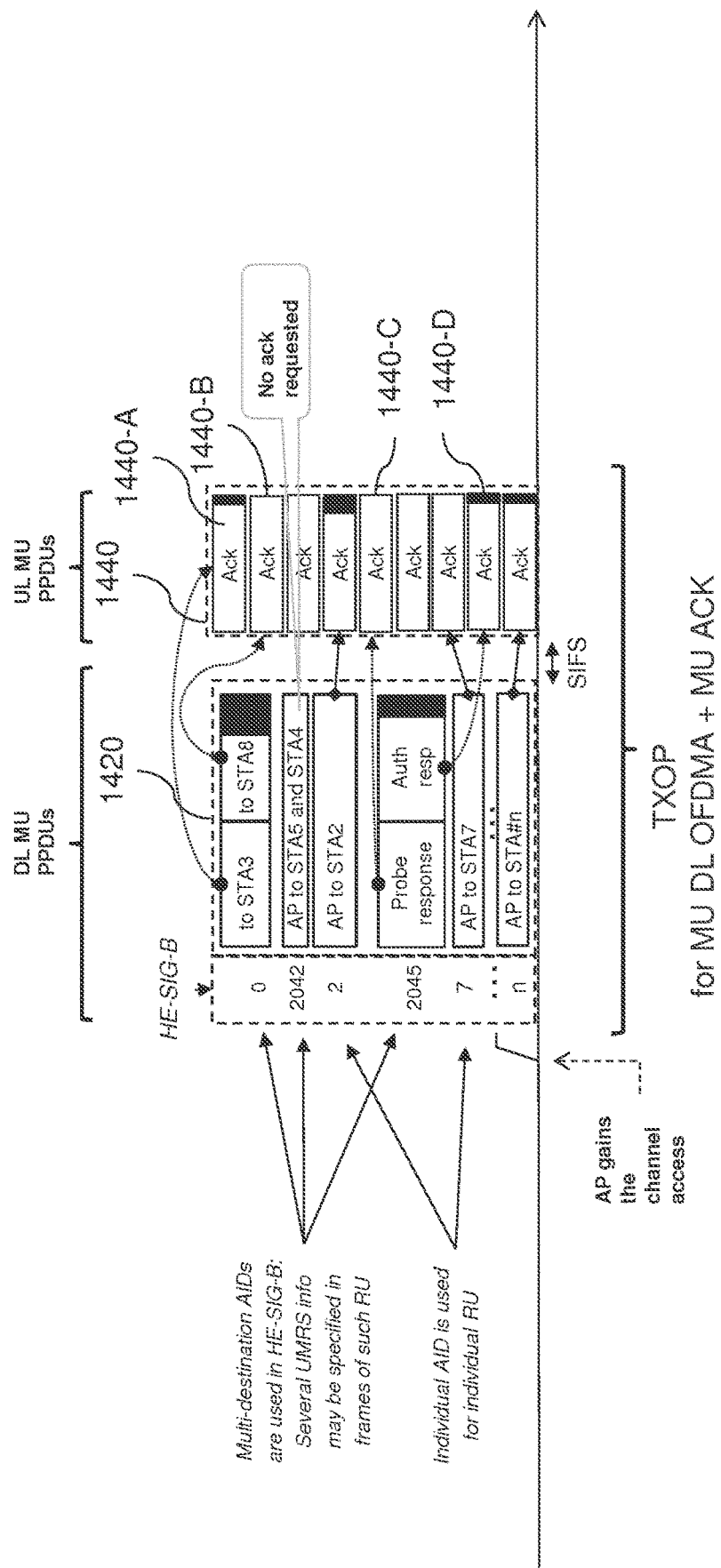
FIG. 15 illustrates the benefits of using a newly proposed scheme for acknowledgment of a grouped multi-user downlink transmission.

FIG. 15 shows an example of variation in the RU configuration between MU Downlink transmission 1420 and MU Uplink transmission 1440. Some DL RUs are wider than the next UL response RUs.

For instance, 802.11ax supports a maximum number of nine RUs per 20 MHz channel: an elementary RU is thus 26-tone width. As a consequence there cannot be more than nine 26-tone response RUs per 20 MHz channel of the MU Uplink transmission 1440. If a group RU is addressing two stations (with acknowledgment support for all stations), then the maximum number of DL RUs is reduced by one (that is to say only eight RUs in MU Downlink direction, which then triggers nine response RUs in MU Uplink direction). As a result, one of the eight DL RU can be widened to fulfil the 20 MHz band.

This consideration has less or no impact for the sake of the present embodiments, because the group RU is intended to address several addressee stations and embeds more data frames than a conventional individual RU. In other words, making a group RU wider than an individual RU is somewhere useful.

In some embodiments, the AP may decide not to use one or more DL RU in MU Downlink direction (for instance to avoid widening some RUs to cover the full band). Unused RUs in MU Downlink transmission 1420 may be indicated using a specific AID in the HE-SIG-B PHY header, for instance 2046. Based on this AID, the stations can avoid considering such RUs. This usage may be useful for the AP to avoid emitting padding, and thus saves its power consumption. As a result, the AP may schedule one used group RU and unused RU(s) in DL transmission such as to encompass the whole frequency band (e.g. 40 MHz) of the response RUs specified with regards to the group RU.

Next, once the AP has determined a set of available response RUs for the current group, it signals such response RUs to the stations concerned using UMRS Control fields 264. This is step 1611. The assignment of the available response RUs to the stations of the group may be made using any assignment scheme (random, according to AID order and RU order, etc.).

In this step, for each addressee station of the group from which a response is desired, the UMRS Control field set with the corresponding assigned response RU is inserted in the HE MAC header of at least one data frame addressed to this station (i.e. one MPDU having its RA field 210 set to the MAC address of the addressee station). When two or more individually addressed MPDU frames are received over a group RU, the UMRS Control fields within MPDUs carried in the A-MPDU have the same value per given addressee station. That is to say, if several frames addressed to a same STA (identified by RA field set to the STA MAC address) have a UMRS Control field, they all have the same UMRS Control field value.

Thus, in two data frames addressed to two respective stations of the group, there is inserted two respective response resource unit information items identifying respective response RUs to be used by each addressee station in MU Uplink transmission 1440 following MU Downlink transmission 1420. This is for the stations to provide a response/acknowledgment to data frames to the access point.

Once the UMRS information items have been inserted in various data frames intended for the stations of the group, step 1330b consists for the AP in concatenating or aggregating all the pending MPDU frames selected at step 1330a into a single A-MPDU to be sent over a group RU during MU Downlink transmission 1420. This is for example the case for group RU with AID=0 in FIG. 15.

Due to above-mentioned constraints on the number of addressee stations during MU Downlink transmission 1420 and the number of response RUs, step 1330b may thus aggregate data frames to be addressed to a number of stations in such a way a total number of stations addressed over the plurality of resource units forming MU Downlink transmission 1420 does not exceed a determined maximum number of stations, such maximum number depending on or being a maximum number of elementary (26-tone) resource units that can be defined within MU Uplink transmission 1440.

Next, step 1340 ensures the A-MPDU to be transmitted over the allocated group RU.

FIG. 16b illustrates, using a flowchart, an improvement of the process of FIG. 13b (at a station) to perform efficient and immediate frame acknowledgment in case of group RUs. The same step references as FIG. 13b are used when unmodified.

After the station has determined (step 1350) a group resource unit dedicated to a plurality of stations, from amongst a plurality of resource units forming MU Downlink transmission 1420 granted to the access point for downlink communication to the stations, has received (1360) aggregated data frames over the determined group resource unit, and has retrieved (1370) one or more data frames addressed to it, from amongst the received aggregated data frames, the station processes the payload of the retrieved data frames, for instance by forwarding them to upper layer stacks (step 1380).

Next the station has to respond to the received data frames. This may be a sole acknowledgment or response data as provided by the upper layer stacks as the outcome of the payload processing. The responding process is made through steps 1620-1622.

In step 1620, the station retrieving personal data frames over the group RU during MU Downlink transmission 1420 obtains an UMRS Control field 264 from the MAC header of at least one of the retrieved data frames.

Thanks to this information, the station now knows which response RU to be used in the next MU Uplink transmission opportunity 1440.

Note that the station may read only the first UMRS Control fields found within the received and retrieved data frames intended for it. However, in some embodiments, in particular when the various data frame may include data from different traffic classes or queues, the station may consider all the retrieved data frames to determine for which type of traffic data the station has to provide a response or acknowledgment. In this configuration, the station may thus build a multi-TID acknowledgment.

Once the response RU is known from the UMRS information, the station may wait for a SIFS (step 1621). This is implemented when an immediate acknowledgement is required.

Next, the station transmits its response or acknowledgment over the response RU identified at step 1620. This is step 1622.

As a consequence, the AP receives, over the various response RUs of MU Uplink transmission 1440, various acknowledgment from the stations addressed during MU Downlink transmission 1420, including those addressed over individual RUs and those addressed over group RUs.

One can note that this acknowledgment scheme is extremely suitable for non-yet-associated stations. In details, the UMRS Control field 264 does not require any AID because each addressee station knows this information retrieved from a personal data frame is targeted to it only. This is fully suitable for the non-yet-associated stations that have not yet assigned AIDs. The proposed approach thus advantageously takes advantage of the UMRS format which does not require any AID, with a view of supporting acknowledgment of association frames exchanged via MU communications.

Back to FIG. 15, some benefits of the proposed acknowledgment in case of group RUs are explained.

Conventional acknowledgment through UMRS signalling makes it possible for the stations STA2, STA7 and STAn receiving data frames over DL individual RUs to send their acknowledgment over respective response RUs. The link between UMRS signalling and the response RUs is shown using plain arrows.

Thanks to the aggregation-based approach, two or more stations addressed through the same group RU are provided with respective UMRS Control fields in order for them to find their response RUs.

In the proposed example, STA3 and STA8 are addressed through group RU having AID=0. One MPDU addressed to STA3 has an UMRS Control field 264 identifying UL RU 1440-A, and one subsequent MPDU addressed to STA8 has its UMRS Control field 264 indicating UL RU 1440-B. The link between UMRS signalling and the response RUs is shown here using dotted arrows.

As shown, the group RU with AID=0 can be larger (e.g. 56-tone RU) in comparison to the two UL response RUs 1440-A and 1440-B (e.g. 26-tone each).

The same situation appears for group RU with AID=2045 which conveys AP response data frames to not-yet-associated stations. As shown by the dotted arrows, the AP response data frames trigger two UL response RU 1440-C and 1440-D. In the figure, the AP has decided to allocate these two UL response RUs as non-contiguous. In addition, they do not necessarily overlap the same frequency band as the DL group RU.

In fact, the assignment of the response RUs may be totally decorrelated from the assignment of the DL individual or group RUs. One constraint is that the response RUs be within the same composite channel (as indicated in the HE-SIG-A field: 20 MHz, 40 MHz, 80 MHz) for MU Downlink OFDMA transmission as the DL individual or group RUs, but not necessarily within the same 20 MHz channel.

Yet another example regards group RU with AID=2042 to transmit a multicast data frame to STA4 and STA5. The AP may decide to not include an UMRS Control field in the data frame, as the latter is multicast and thus does not require to be acknowledged.

Embodiments of the present invention may be implemented in all 802.11ax compliant AP and non-AP stations. Alternatively, 802.11ax compliant AP and non-AP stations may optionally implement features of embodiments of the present invention. For this purpose, supported features may be declared by a station and/or an AP and execution of flowcharts according to embodiments of the invention may be adapted or made conditional to the supported features.

For example, supported features may be declared by means of management frames exchanged during the discovering phase (cf. FIG. 3). For instance, amongst the 802.11 capabilities exchanged between the AP and a station through the probe request frame 310 (or beacon) and the probe response frame 320, one or more capability bits are added for signaling whether or not a feature, a set of features or an embodiment is/are supported by a 802.11ax device. Request management frames may have been received by any previous MU or SU communications.

In an implementation, allowing aggregated MPDUs in a same A-MPDU to be addressed to different stations is considered as an optional feature. It is thus subject to the implementation of an 802.11 ax compliant device to have this feature supported or not. Still, the device has to declare the status of its capabilities, for example during discovering phase. For the feature discussed in this implementation, one capability bit is added. This informs the HE AP of which STAs to consider in the multi-STA A-MPDU aggregation scheme. The capability bit is referred to as "*Multi-STA Aggregation In Broadcast RU Support*". Alternate naming may also be used for this capability bit such as "*Multi-STA Aggregation In Group RU Support*", "*Multi-STA Aggregation Support*", or MSAS capability bit for short.

Figure 17:
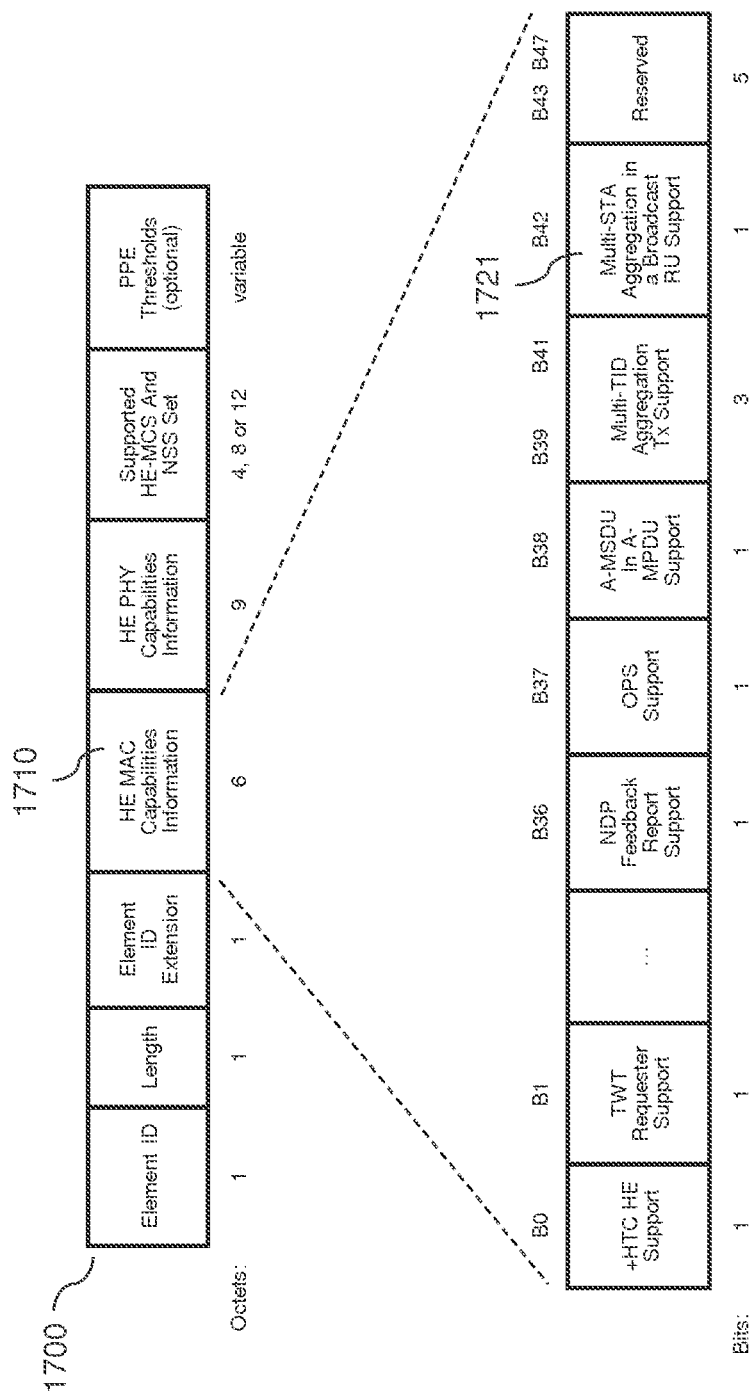
FIG. 17 shows an example format of an HE Capabilities element exchanged between a station and an AP.

FIG. 17 shows an example format of an HE Capabilities element 1700 exchanged between a station and an AP and including the capability bit according to one implementation variant of the invention.

According to 802.11ax, a 802.11ax compliant station (also referred to as High Efficiency station, or simply as HE STA) declares that it is an HE STA by transmitting the HE Capabilities element. The HE Capabilities element contains a number of fields that are used to advertise the HE capabilities of an HE STA that are not all detailed here. Among the fields there is a HE MAC Capabilities Information field 1710 that contains a number of subfields and reserved bits.

A capability bit is added in the HE MAC Capabilities Information field according to an implementation variant. Proposal is thus to add the "Multi-STA Aggregation In Broadcast RU Support" capability bit in a subfield 1721 of the HE MAC Capabilities Information field 1710. The subfield 1721 may use for example bit position B42 declared as reserved in 802.11ax standard Draft v. 2.2. It is of course understood that any other position for the subfield 1721 may be considered, either within the HE MAC Capabilities Information field 1710, or within other fields of the HE Capabilities element 1700.

The "Multi-STA Aggregation In Broadcast RU Support» (MSAS) subfield may have different interpretations depending on whether the subfield is set by the AP or a non-AP station.

In case the capabilities are those declared by the AP:
If the MSAS capability subfield is set to 1, the AP (identified by the BSSID value used in the management response frame or beacon frame that conveys the capabilities) supports the capability to generate an A-MPDU that contains frames addressed to several (distinct) stations when the A-MPDU is directed to be transmitted in a downlink RU intended to several stations (group RU); and
If the MSAS capability subfield is set to 0, the AP does not support the capability to aggregates within an A-MPDU frames addressed to multiple stations (unless broadcast MAC MPDUs are aggregated).

In case the capabilities are those declared by a station:
If MSAS capability subfield is set to 1, the station supports the receiving of an A-MPDU that contains frames addressed to several stations in a downlink RU intended to several stations (group RU); and
If MSAS capability subfield is set to 0, the station does not support the capability to receive a MPDU addressed to it within an A-MPDU containing frames addressed to multiple stations (unless broadcast MAC MPDUs are aggregated).

Table below summarizes the definition and the encoding of the subfield MSAS 1721.

| Subfield | Definition | Encoding |
|---|---|---|
| Multi-STA Aggregation In Broadcast RU Support | For an AP, indicates support for generating an A-MPDU that contains frames addressed to several stations, in a DL Broadcast RU. | Set to 1 if the STA supports the Multi-STA aggregation functionality in a DL Broadcast RU. |
| | For a non-AP STA, indicates support for receiving an A-MPDU that contains frames addressed to several stations, in a DL Broadcast RU. | Set to 0 otherwise. |

Figure 18:
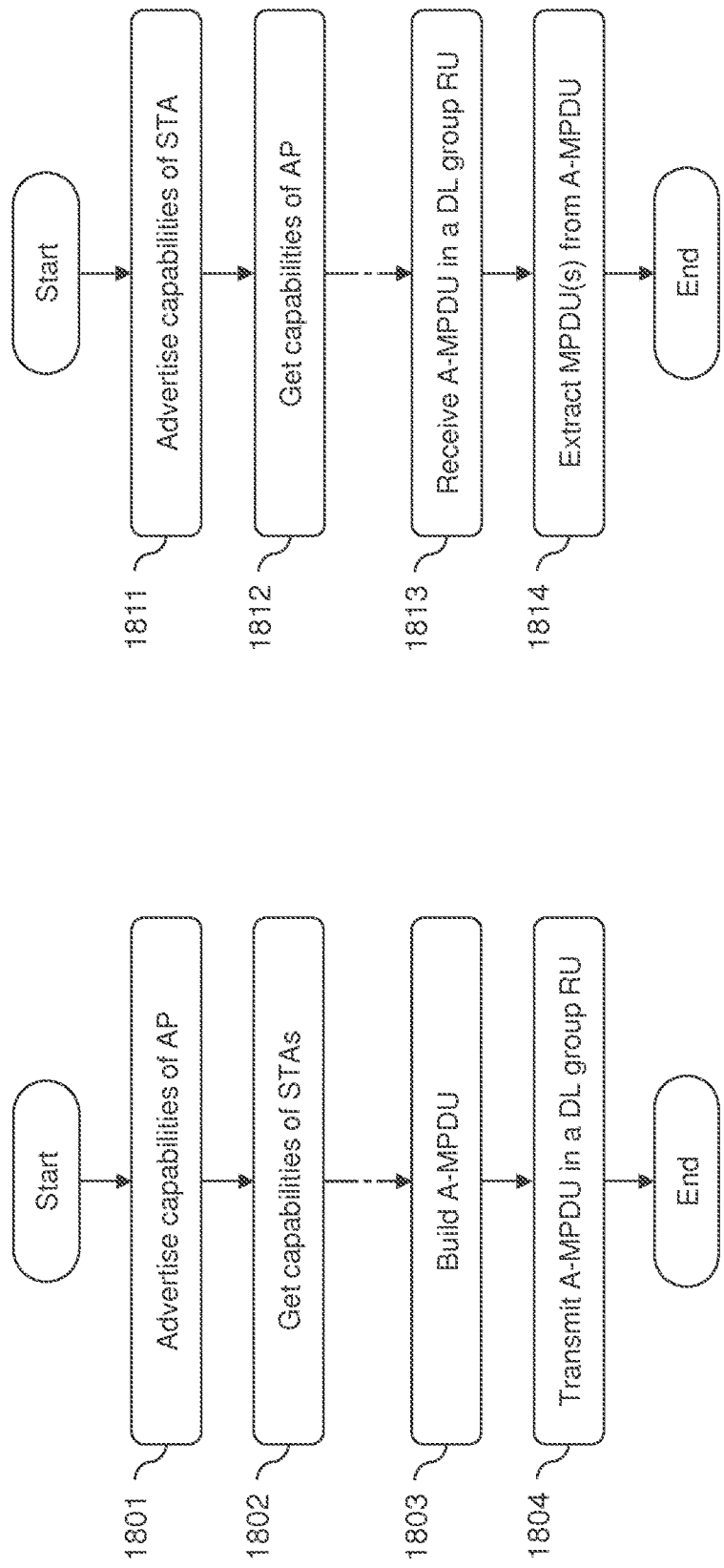
FIGS. 18a and 18b illustrate, using flowcharts, steps performed, respectively, by an AP and a station when exchanging data.

FIG. 18a illustrates, using a flowchart, steps performed by an AP when transmitting data to stations.

Steps 1801 and 1802 concern, respectively, advertising the capabilities of the AP to the stations and receiving the advertised capabilities from stations. These steps can be executed in any order and may be performed at an early stage such as the discovering phase as discussed above.

At step 1803, the AP builds an A-MPDU of one or more MAC frames for transmission in a group RU. Here the building of the A-MPDU depends on the capabilities of the AP and/or the capabilities of the addressee stations of the MAC frames to be sent. This means that certain rules need to be followed by the AP for the building of the A-MPDU.

If the AP supports generating an A-MPDU that contains frames addressed to several stations, the Address type (individually addressed or group addressed) and address values of MPDUs may be different inside an A-MPDU in an RU intended for multiple STAs. In such a case, for constructing an A-MPDU with MPDU frames addressed to several receivers and carried in broadcast RU of an HE MU PPDU, the HE AP shall only consider those receiver STAs that set the "Multi-STA Aggregation In Broadcast RU Support subfield" to 1 in the HE MAC Capabilities Information field.

An HE AP may still consider separately transmitting an A-MPDU with only MPDU frames addressed to the STA, in a DL MU PPDU or in a DL SU PPDU for a STA that sets the "Multi-STA Aggregation In Broadcast RU Support" subfield to 1. An HE AP still considers separately transmitting an A-MPDU with only MPDU frames addressed to the STA, in a DL MU PPDU or in a DL SU PPDU for a STA that sets the "Multi-STA Aggregation In Broadcast RU Support" subfield to 0.

If the AP doesn't support generating an A-MPDU that contains frames addressed to several stations, HE AP has to consider separately transmitting an A-MPDU with only MPDU frames addressed to a single STA in a DL MU PPDU, or with only broadcast MAC frames in a group RU. This applies even if a STA has set its "Multi-STA Aggregation In Broadcast RU Support" subfield to 1.

At step 1804, the AP transmits the built A-MPDU in a DL group (broadcast) RU.

FIG. 18b illustrates, using a flowchart, steps performed by a non-AP station when receiving data from the AP.

Steps 1811 and 1812 concern, respectively, advertising the capabilities of the station to the AP and receiving the advertised capabilities of the AP. These steps can be executed in any order and may be performed at an early stage such as the discovering phase as discussed above.

At step 1813, the station receives an A-MPDU in a DL group (broadcast) RU and at step 1814 the station extracts MPDU(s) addressed to it from the A-MPDU depending on the capabilities of the AP and/or the capabilities of the station.

In one implementation of step 1814, if both the AP and the station have set their "Multi-STA Aggregation In Broadcast RU Support" subfield to 1, the station compares a MAC address of each aggregated data frame (the RA field 210 of each MPDU forming the A-MPDU) with its own MAC address. This is to retrieve one or more data frames, if any, addressed to the station, from amongst the received aggregated data frames. The STA may thus retrieve one or more frames, carried in a RU intended for multiple STAs, that are addressed to this STA based on the RA field of each MPDU frame.

If at least one of the AP and the station have set their "Multi-STA Aggregation In Broadcast RU Support" subfield to 0, the A-MPDU shouldn't contain MPDUs for different stations (unless broadcast MAC frames). In this case, the station may compare a MAC address of one, preferably the first, MPDU of the A-MPDU, with its own MAC address. If the MAC address matches its own MAC address (or if the MAC address is a broadcast address), the one or more MPDUs contained in the A-MPDU may all be considered to be addressed to the station. They are thus all extracted for processing by the station. If the MAC address does not match its own MAC address (and the MAC address is not a broadcast address), the extraction of MPDUs (de-aggregation) is stopped as it is assumed that no further MPDUs are destined for the station.

Note that in an implementation variant, the feature of allowing aggregated MPDUs in a same A-MPDU to be addressed to different stations is considered as optional only for a non-AP station and mandatory for an AP. In other words, a non-AP station still has to indicate support for receiving an A-MPDU that contains frames addressed to several stations in a DL Broadcast RU, whereas the AP does not have to advertise about its capability regarding this feature as the AP would support the feature by default. In this variant, the MSAS subfield is added only in the capabilities advertised by a station. This variant is advantageous because it provides a good trade-off between efficiency and cost of the system. In fact, it is preferable that the AP implements the feature to make it effective for all the stations of the managed cell, while a station may not implement the feature without impacting the usage of the feature for other stations of the same cell.

Figure 19:
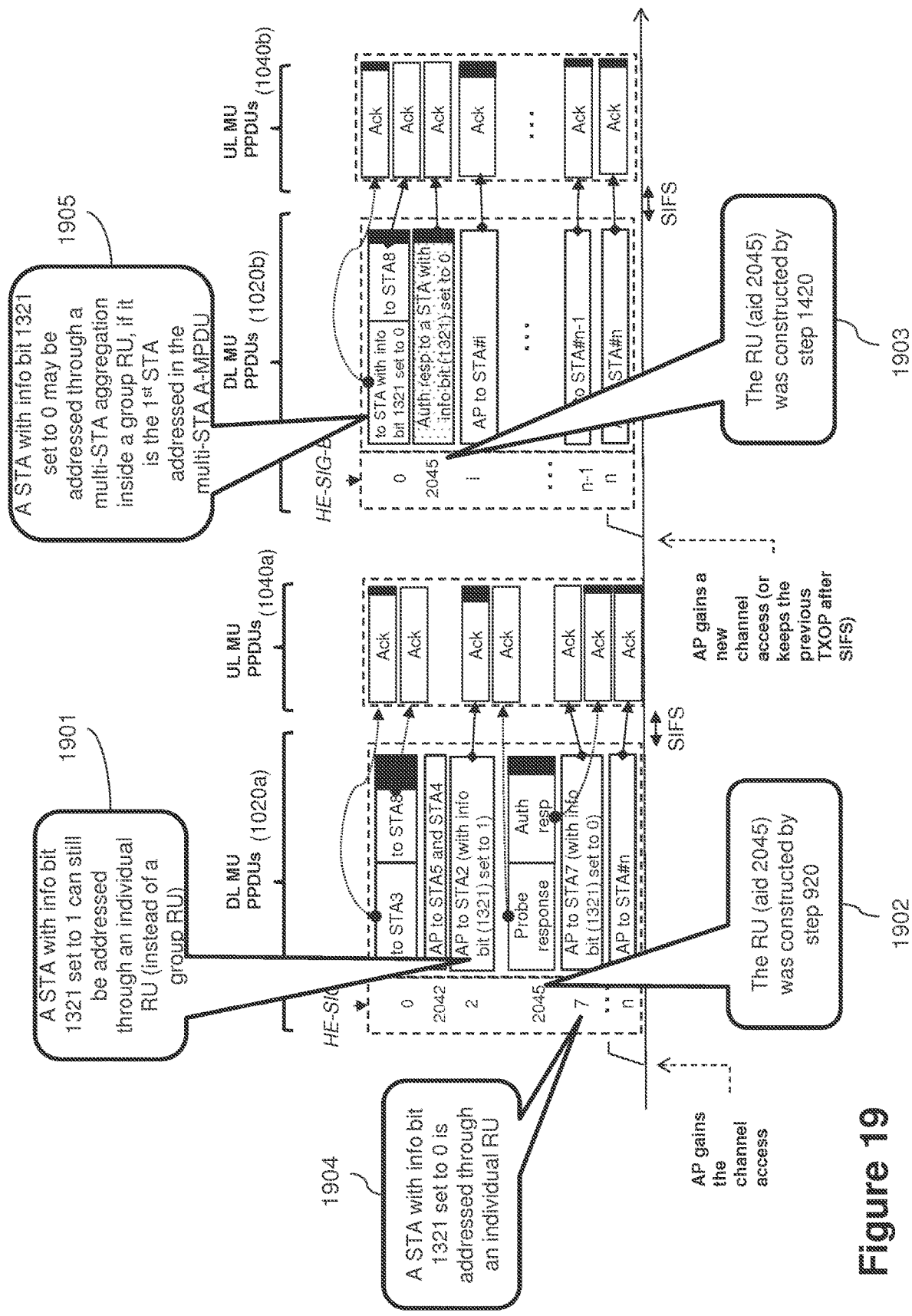
FIG. 19 shows RU configuration examples between MU Downlink transmission and MU Uplink transmission.

FIG. 19 shows examples of RU configuration between MU Downlink transmission 1420 and MU Uplink transmission 1440 (cf. FIG. 14).

The configuration example identified by 1904 shows a case in which the AP considers separately transmitting an A-MPDU with only MPDU frames addressed to the STA7 in a DL MU PPDU, since STA7 had set the "Multi-STA Aggregation In Broadcast RU Support" subfield to 0.

The configuration example identified by 1901 shows a case in which the AP considers separately transmitting an A-MPDU with only MPDU frames addressed to the STA2 in a DL MU PPDU, although STA2 had set the "Multi-STA Aggregation In Broadcast RU Support" subfield to 1.

The configuration examples identified by 1902 and 1903 show a case in which the AP always make one group RU with a given AID appearing once. In the examples, the group RU with AID=2045 is sent first in a DL MU PPDU 1020a, then the group RU with AID=2045 is sent further in a subsequent DL MU PPDU 1420b.

The configuration example identified by 1905 shows an alternate implementation to the above description with regards to FIGS. 18*a* and 18*b*. In this alternate implementation, the AP aggregates MPDUs in a same A-MPDU to be addressed to different stations while one of the addressee stations does not support the aggregation feature (the station MSAS capability subfield is set to 0). For this implementation variant, the AP builds the A-MPDU by having the MPDU(s) for the station not supporting the optional first in the aggregation of the A-MPDU. As a consequence, the station that is recipient of the first MPDU(s) (and does not support the aggregation capability), will retrieve the first MPDU(s) as the comparison of the MAC addresses will result into a positive match; then the station may either stop retrieving following MPDUs as soon as an MPDU intended for a different station is found, or retrieve all following MPDUs and throw away later the MPDUs with a non matching address.

In the configuration example identified by 1905, the first MPDU frame(s) to appear in the multi-station A-MPDU according to an implementation of the invention can be destined to a station that has indicated no support of the multi-station aggregation capability by setting the bit 1721 set to 0. This station will handle decoding of those first MPDU frame(s), and then stops once it receives the MPDUs intended to station STA8. In the example, the station STA8 is a station that has indicated support of the multi-station aggregation capability by setting the bit 1721 set to 1, and is able to receive the subsequently aggregated MPDU frame(s).

When one or more MPDUs with different RA values are aggregated with other MPDUs in an A-MPDU, the following ordering rule applies: The MPDU(s) for one non-AP station that does not support of the "Multi-STA Aggregation In Broadcast RU" functionality (if any) shall be the first MPDU(s) in the A-MPDU.

Figure 20:
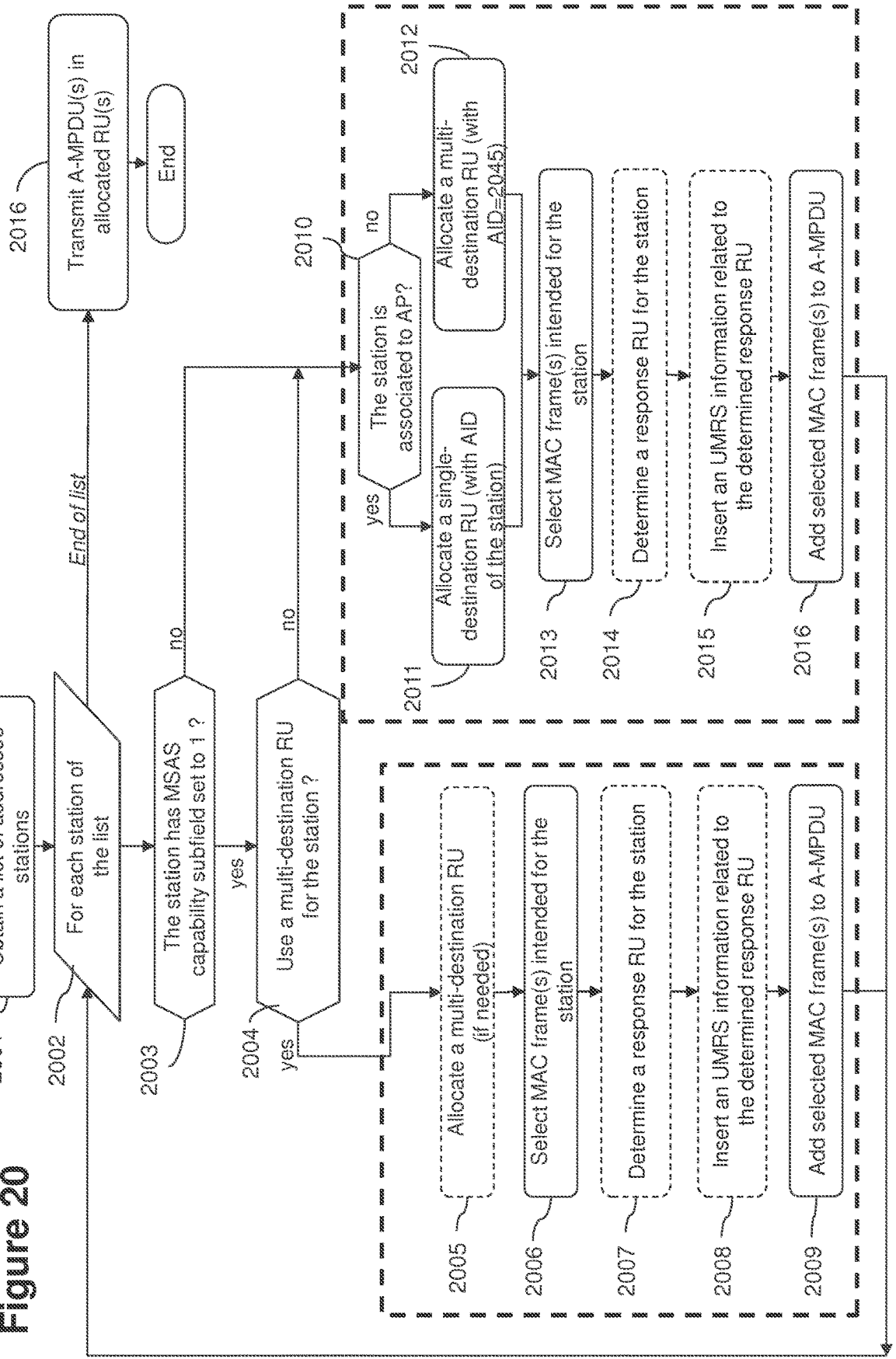
FIG. 20 illustrates, using a flowchart, an implementation example according to the invention taking into account the MSAS capability subfield values advertised by stations.

FIG. 20 illustrates, using a flowchart, an implementation example according to the invention of a process of building an A-MPDU executed by the AP (e.g. step 1803 of FIG. 18*a*) taking into account the MSAS capability subfield values advertised by stations. It is assumed in this example that the AP supports the feature of allowing aggregated MPDUs in a same A-MPDU to be addressed to different stations, either by default or after the AP has advertised to stations a MSAS capability subfield set to 1.

At step 2001, a list of addressee stations to which the AP has MAC frames to send in Downlink transmission is obtained, and then the addressee stations are processed sequentially (loop at step 2002). The loop may continue until all addressee stations have been processed (i.e. end of list reached), and then the one or more A-MPDUs built (embedding the MAC frames) are transmitted in respective one or more allocated DL RUs (step 2016). In a variant, the loop is stopped when one A-MPDU is built and can be transmitted in one allocated DL RU. The process then repeats with an updated list of addressee stations at step 2001, and other DL RUs are used for transmission.

At step 2003, it is checked if the station (currently selected in the list) has advertised a MSAS capability subfield set to 1.

If the checking is positive (yes to the test of step 2003), the AP (scheduler) determines at step 2004 whether to use a multi-destination RU for the station or not. This means that the AP determines if it is willing to group distinct addressee stations to which the AP has MAC frames to send in a same multi-destination RU (and hence an A-MPDU aggregating MPDUs for distinct addressee stations). Situations in which it may be advantageous to group distinct addressee stations may be similar to those exemplary situations described for step 1310 of FIG. 13*a*. For example, if a large amount of data is pending for transmission to a given station, it is preferable to allocate a dedicated RU for that station. Another example is the case where no more space is left in a group RU, then a dedicated RU is allocated to the station. By allocating the dedicated RU within the same HE MU PPDU, it avoids waiting for another HE MU PPDU and thus time is gained (particularly if it is not allowed to allocate a plurality of group RUs within a same HE MU PPDU).

If it is determined at step 2004 that a multi-destination RU is to be used for the station, then a multi-destination RU is allocated at step 2005, if needed. Step 2005 is optional because the multi-destination RU may have been already allocated. A new multi-destination RU may need to be allocated if there is not one already allocated or if a previously allocated multi-destination RU has no more space left.

At step 2006, one or more MAC frames intended for the station are selected for insertion in a current A-MPDU.

Optionally, the AP has to signal using UMRS Control field which response RU the station has to use to acknowledge its MAC frame(s). This is made through steps 2007 and 2008 to signal in a selected MAC frame addressed to the station a UMRS Control field identifying a response resource unit to be used by the station in the MU Uplink transmission following MU Downlink transmission to provide a response to data frames to the access point. Steps 2007 and 2008 are similar to steps 1610 and 1611 of FIG. 16*a*, and are not executed if for example no acknowledgment is required for none of the aggregated MAC frames.

The selected MAC frame(s) is(are) then aggregated at step 2009 with possibly other MAC frame(s) for distinct addressee stations in an A-MPDU. Possibly, the aggregation can be limited to one MPDU, i.e. the A-MPDU contains a single MPDU.

If the checking is negative (no in the test of step 2003), or if it is determined at step 2004 that a multi-destination RU is not to be used for the station, then step 2010 is executed.

At step 2010, it is determined if the station is already associated with the AP. If the station is already associated, a single-destination RU (with AID of the station) is allocated (step 2011). If the station is unassociated, a multi-destination RU (e.g. with AID=2045) is allocated (step 2012).

One or more MAC frames intended for the station are then selected (step 2013) and added to the A-MPDU (step 2016).

Similarly to steps 2007 and 2008, steps 2014 and 2015 can optionally be implemented for signaling using UMRS Control field which response RU the station has to use to acknowledge its MAC frame(s). This is particularly relevant for unassociated stations (no AID assigned yet).

Note that the branch of steps 2005-2009 and the branch of steps 2010-2016 may be executed in parallel. Note also that it is not necessary to have both branches in the process, and only one of them may be executed. For example, only branch of steps 2005-2009 can be executed if the AP uses a multi-destination RU for all stations, or only branch of steps 2010-2016 can be executed if the AP does not support the feature of allowing aggregated MPDUs in a same A-MPDU to be addressed to different stations.

When one or more MPDU Frames with different RA values are aggregated with other frames in an A-MPDU (steps 2009 and/or 2016), the following ordering rule may apply: The MPDU frame(s) for one non-AP station that does not support the "Multi-STA Aggregation In Broadcast RU" functionality (if any) is(are) the first MPDU frame(s) in the A-MPDU.

In an implementation, the matching in terms of RU profile between an uplink RU already used by a station in the MU Uplink transmission and a downlink RU the AP will use in the MU Downlink transmission to provide a frame to the same station (cf. FIGS. 10a to 10c) is considered as an optional feature.

For the feature discussed in this implementation, one capability bit is added to reflect the support of this feature. The capability bit is referred to as "UL/DL matching profile support", or UMPS capability bit for short.

The UMPS capability bit can be added in the HE MAC Capabilities Information field, similarly to the MSAS capability bit, e.g. in the reserved subfield of field 1710 (cf. FIG. 17).

Note that it may be envisaged that only one of the features "Multi-STA Aggregation In Broadcast RU Support" and "UUDL matching profile support" can be implemented in a 802.11ax station. In this case only one capability bit (e.g. bit B42) is added to signal the implemented one feature. Alternatively, it may be authorized to have both features implemented in a 802.11ax station. In this case, two capability bits are added (e.g. bits B42 and B43).

Thus, for example saving one or more allocation scheme features that define the uplink RUs in order to be used for identifying downlink RUs for unassociated stations is performed only by 802.11ax stations that advertised an UMPS capability bit set to 1.

Figure 21:
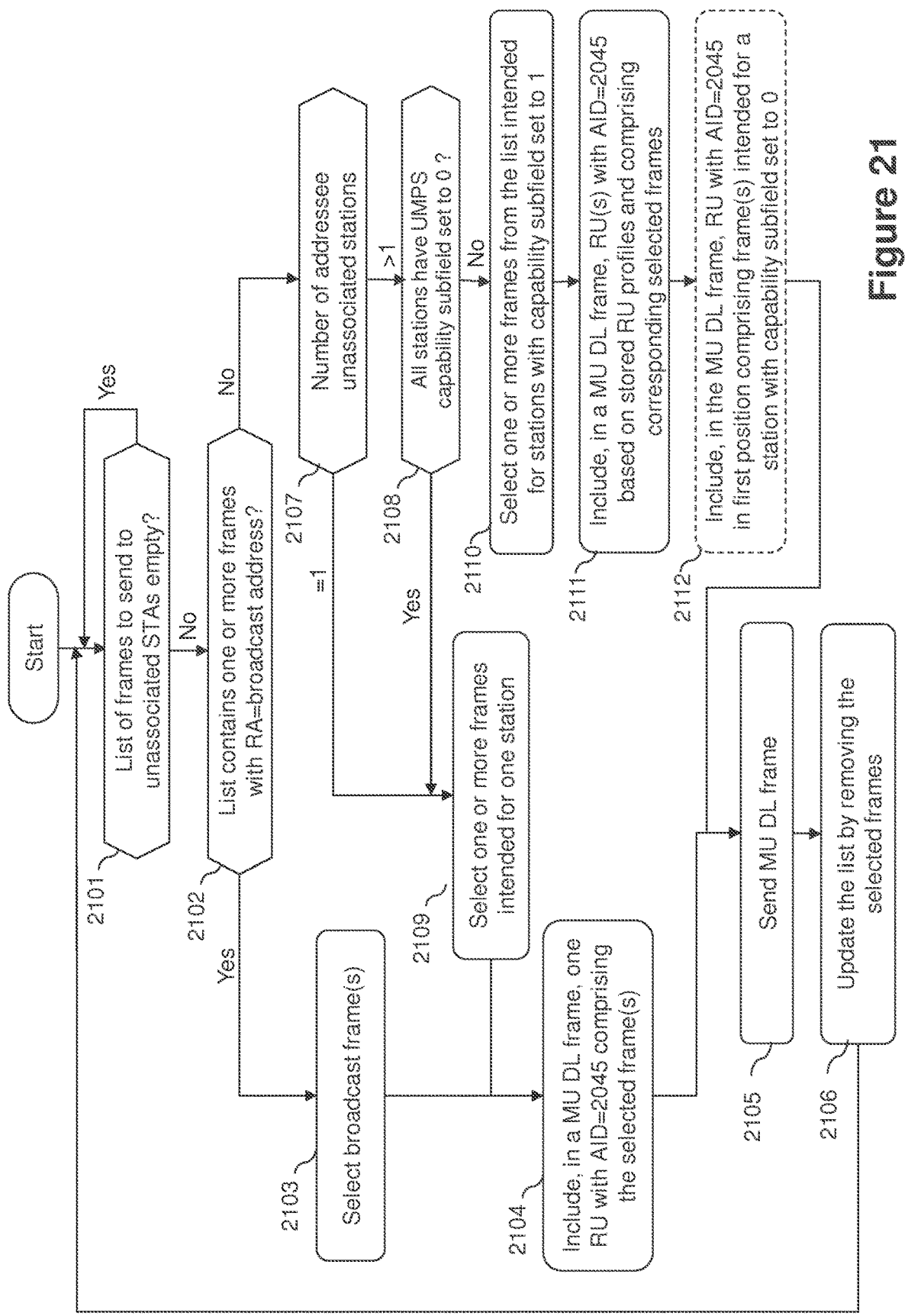
FIG. 21 illustrates, using a flowchart, an implementation example according to the invention taking into account the UMPS capability subfield values advertised by unassociated stations.

FIG. 21 illustrates, using a flowchart, an implementation example according to the invention of a process executed by the AP taking into account the UMPS capability subfield values advertised by unassociated stations during discovering phase. It is assumed in this example that the AP supports the UUDL matching profile feature, either by default or after the AP has advertised to stations a UMPS capability subfield set to 1.

In the following description a predefined identifier value of 2045 is chosen to designate MU DL RUs reserved for unassociated stations. Of course this value is given for illustration only and any other predefined value or signalling means may be adopted.

At step 2101, the AP determines whether there is a list of pending frames (e.g. authentication or association response management frames) waiting for transmission to unassociated stations.

If the list of pending frames is not empty, it is determined at step 2102 whether the list contains one or more broadcast frames. If at least one broadcast frame is found, it is selected at step 2103 for transmission (more broadcast frames may be selected for transmission in a same RU). A single downlink RU with AID=2045 is included in a MU DL frame comprising the selected frame (step 2104). The downlink RU can be located anywhere within the MU DL frame (HE MU PPDU). The MU DL frame may be built at the time of inclusion of the downlink RU with AID=2045, or may be formed earlier by module 805 of the AP, for example at the time other downlink RUs destined for already-associated stations are defined.

If the list does not contain a broadcast frame (test 2102 negative), the number of unassociated stations that are addressee of the frames pending for transmission is determined at step 2107. If only one unassociated addressee station is found, one or more frames intended for the station are selected (step 2109) and included in the MU DL frame (step 2104). If the number of unassociated stations is more than one (test 2107), further processing is performed based on the UMPS capability subfield advertised by the stations.

For example, if it is determined at step 2108 that all stations have an UMPS capability subfield set to 0 (do not support the feature), step 2109 is executed by considering frames from only one station amongst those stations (in current iteration of the flowchart).

If test 2108 is negative (at least one station supports the feature), one or more frames intended for stations with capability subfield set to 1 are selected from the list at step 2110. Preferably, all response frames that follow the reception of request frames received on uplink RUs from unassociated stations are selected in order to be transmitted to the corresponding unassociated stations. The design of the downlink RUs with AID=2045 for the response frames can be based on at least one allocation scheme feature of the uplink RUs used by the unassociated stations. Of course, the response frame for a specific unassociated station will be sent over the downlink RU matching the allocation scheme feature of the uplink RU used by the same station when requesting the AP.

The number of frames selected at step 2110 may be limited to a number of downlink RUs available, for instance of downlink RUs available to be assigned to AID=2045. In particular, amongst the RUs available to be assigned to AID=2045, one (e.g. first) may be reserved for a not-yet-associated station that does not support the feature, i.e. UMPS capability subfield set to 0 (cf. step 2112).

At step 2111, one or more downlink RUs with AID value 2045 are included in the MU DL frame and comprising the corresponding selected frames. The MU DL frame is previously built or is built at the time of the inclusion. The included downlink resource unit(s) with AID=2045 match the allocation scheme features stored for the corresponding unassociated stations respectively (i.e. each downlink RU matches the allocation scheme feature of the uplink resource unit used by said station to send a frame in the MU Uplink transmission).

Optionally, at step 2112, within the same MU DL frame, one RU with AID=2045 is allocated at a predetermined position, e.g. first, to comprise one or more frames, if any, intended to an unassociated station with capability subfield set to 0.

At step 2105, the MU DL frame is transmitted by the AP. Finally, at step 2106, the list of pending frames is updated by removing the selected frames that have been transmitted (and acknowledged), and the steps of the flowchart are repeated from step 2101.

In another implementation example according to the invention of a process executed by the AP (not illustrated), it is assumed that the UL/DL matching profile feature is supported by both the AP and all non-AP stations associated with the AP (either by default or determined following the advertised capabilities of the concerned 802.11ax devices).

In this implementation example, the flowchart of FIG. 21 may be modified by removing the test step 2108 and the optional step 2112, and modifying steps 2110 and 2111. If the number of unassociated stations is more than one (test 2107), then a plurality of frames intended for a plurality of unassociated addressee stations are selected from the list (modified step 2110). At a modified step 2111, a plurality of downlink RUs with AID value 2045 are included in the MU DL frame and comprising the corresponding selected frames. The MU DL frame is previously built or is built at the time of the inclusion. The included downlink resource units with AID=2045 match the allocation scheme features stored for the corresponding unassociated stations respectively (i.e. each downlink RU matches the allocation scheme feature of the uplink resource unit used by said station to send a frame in the MU Uplink transmission).

Although the present invention has been described hereinabove with reference to specific embodiments, the present invention is not limited to the specific embodiments, and modifications will be apparent to a skilled person in the art which lie within the scope of the present invention.

The description above focuses on RUs that are distributed in the frequency domain. Variants may contemplate having RUs distributed in the time domain, in replacement or in combination with a frequency-based distribution. In any case, the allocation scheme features describing a specific RU may be obtained from the allocation scheme used.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising an access point, the method comprising the following steps at a station not associated with the access point:
   receiving, from the access point, HE multi-user, MU, Physical layer Protocol Data Unit, PPDU, comprising HE-SIG-B field in which a plurality of downlink resource units used for MU downlink transmission from the access point within a transmission opportunity granted to the access point are allocated using association identifiers, AIDs;
   determining a downlink resource unit which has been allocated to a specific AID which is reserved for stations not associated with the access point, from the plurality of downlink resource units, wherein the specific AID does not identify individual one of the stations not associated with the access point and is equal to 2045; and
   receiving a frame from the access point on the determined downlink resource unit.

2. The method of claim 1, wherein the plurality of downlink resource units includes at least one downlink resource unit which has been allocated to an AID identifying a specific one of stations which has been associated with the access point.

3. The method of claim 1, wherein at most one of the plurality of downlink resource units can be allocated to an AID identifying a specific one of stations which has been associated with the access point.

4. The method of claim 3, wherein more than one of the plurality of downlink resource units can be allocated to the specific AID.

5. The method of claim 1, wherein the frame from the access point carries a probe response or an authentication response.

6. The method of claim 1, further comprising, at the station, checking whether the frame received on the determined downlink resource unit is addressed to the station, prior to decoding the frame.

7. A wireless communication method in a wireless network comprising an access point, the method comprising the following steps, at the access point:
   generating HE multi-user, MU, Physical layer Protocol Data Unit, PPDU, comprising HE-SIG-B field in which a plurality of downlink resource units used for MU downlink transmission from the access point within a transmission opportunity granted to the access point are allocated using association identifiers, AIDs, wherein the plurality of the downlink resource units includes a downlink resource unit which has been allocated to a specific AID which is reserved for stations not associated with the access point, and wherein the specific AID does not identify individual one of the stations not associated with the access point and is equal to 2045; and
   sending the generated HE MU PPDU.

8. The method of claim 7, wherein the plurality of downlink resource units includes at least one downlink resource unit which has been allocated to an AID identifying a specific one of stations which has been associated with the access point.

9. The method of claim 7, wherein at most one of the plurality of downlink resource units can be allocated to an AID identifying a specific one of stations which has been associated with the access point.

10. The method of claim 9, wherein more than one of the plurality of downlink resource units can be allocated to the specific AID.

11. The method of claim 7, wherein the frame from the access point carries a probe response or an authentication response.

12. A non-transitory computer-readable medium storing a program which, when executed by a microprocessor or computer system in a device, causes the device to perform the method of claim 1.

13. A non-transitory computer-readable medium storing a program which, when executed by a microprocessor or computer system in a device, causes the device to perform the method of claim 7.

14. A wireless communication device forming a station not associated with an access point in a wireless network, the device comprising at least one microprocessor configured for carrying out the steps of:
   receiving, from the access point, HE multi-user, MU, Physical layer Protocol Data Unit, PPDU, comprising HE-SIG-B field in which a plurality of downlink resource units used for MU downlink transmission from the access point within a transmission opportunity granted to the access point are allocated using association identifiers, AIDs;
   determining a downlink resource unit which has been allocated to a specific AID which is reserved for stations not associated with the access point, from the plurality of downlink resource units, wherein the specific AID does not identify individual one of the stations not associated with the access point and is equal to 2045; and
   receiving a frame from the access point on the determined downlink resource unit.

15. A wireless communication device forming an access point in a wireless network, the device comprising at least one microprocessor configured for carrying out the steps of:
   generating HE multi-user, MU, Physical layer Protocol Data Unit, PPDU, comprising HE-SIG-B field in which a plurality of downlink resource units used for MU downlink transmission from the access point within a transmission opportunity granted to the access point are allocated using association identifiers, AIDs, wherein the plurality of the downlink resource units includes a downlink resource unit which has been allocated to a specific AID which is reserved for stations not associated with the access point, and wherein the specific AID does not identify individual one of the stations not associated with the access point and is equal to 2045; and sending the generated HE MU PPDU.

* * * * *